(12) United States Patent
Chan et al.

(10) Patent No.: US 12,256,180 B1
(45) Date of Patent: Mar. 18, 2025

(54) DEVICE AND METHOD FOR ROUTING OPTICAL SIGNALS

(71) Applicant: OAM Photonics LLC, Albuquerque, NM (US)

(72) Inventors: Kam Wai Clifford Chan, Albuquerque, NM (US); Chung Ki Wong, Albuquerque, NM (US)

(73) Assignee: OAM Photonics LLC, Albuquerque, NM (US)

( * ) Notice: Subject to any disclaimer, the term of this patent is extended or adjusted under 35 U.S.C. 154(b) by 0 days.

(21) Appl. No.: 18/667,662

(22) Filed: May 17, 2024

Related U.S. Application Data

(60) Provisional application No. 63/594,337, filed on Oct. 30, 2023.

(51) Int. Cl.
*G02F 1/29* (2006.01)
*H04Q 11/00* (2006.01)

(52) U.S. Cl.
CPC . *H04Q 11/0005* (2013.01); *H04Q 2011/0039* (2013.01)

(58) Field of Classification Search
CPC ....................................................... G02F 1/29
See application file for complete search history.

(56) References Cited

U.S. PATENT DOCUMENTS

| 7,177,495 | B2 | 2/2007 | Mino et al. |
| 2018/0267250 | A1 | 9/2018 | Hosseini et al. |
| 2021/0141058 | A1 | 5/2021 | Piggott et al. |
| 2023/0367174 | A1* | 11/2023 | Izuhara ................. G02F 1/2955 |

OTHER PUBLICATIONS

European Patent Office, International Search Report and Written Opinion for PCT Application No. PCT/US2024/030031, dated Oct. 14, 2024.

* cited by examiner

*Primary Examiner* — Shi K Li
(74) *Attorney, Agent, or Firm* — Patterson + Sheridan, LLP

(57) ABSTRACT

The present disclosure describes an optical routing circuit (ORC) which may be used to route an input optical signal to one or more optical output channels of the ORC. The ORC comprises a network of nodes for carrying out the task of optical signal routing. The nodes may be controlled by a node control system through electrical node control channels. The ORC may simplify the electrical interface between the nodes and the node control system by sharing an electrical node control channel among a subset of nodes of the ORC. Nodes of the ORC may transmit electrical signals between the nodes. The present disclosure also describes a node which may be used to construct the ORC and a method of routing an optical signal. The present disclosure may enable a large ORC with many nodes to be practically implemented.

24 Claims, 21 Drawing Sheets

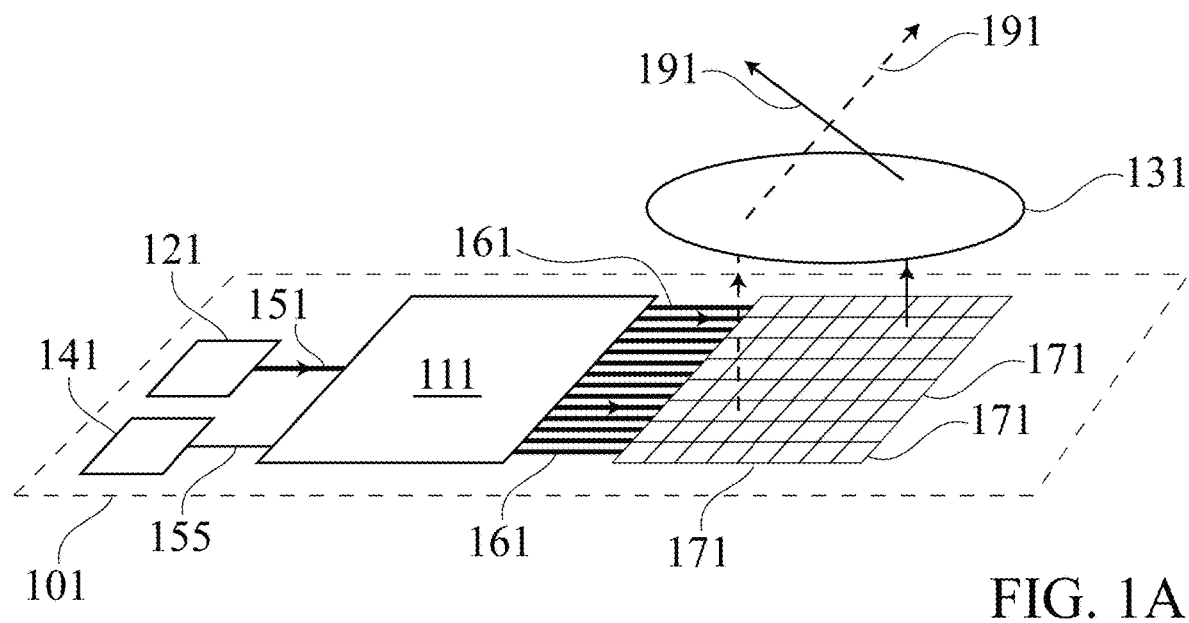
FIG. 1A
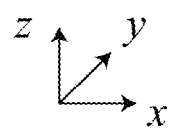
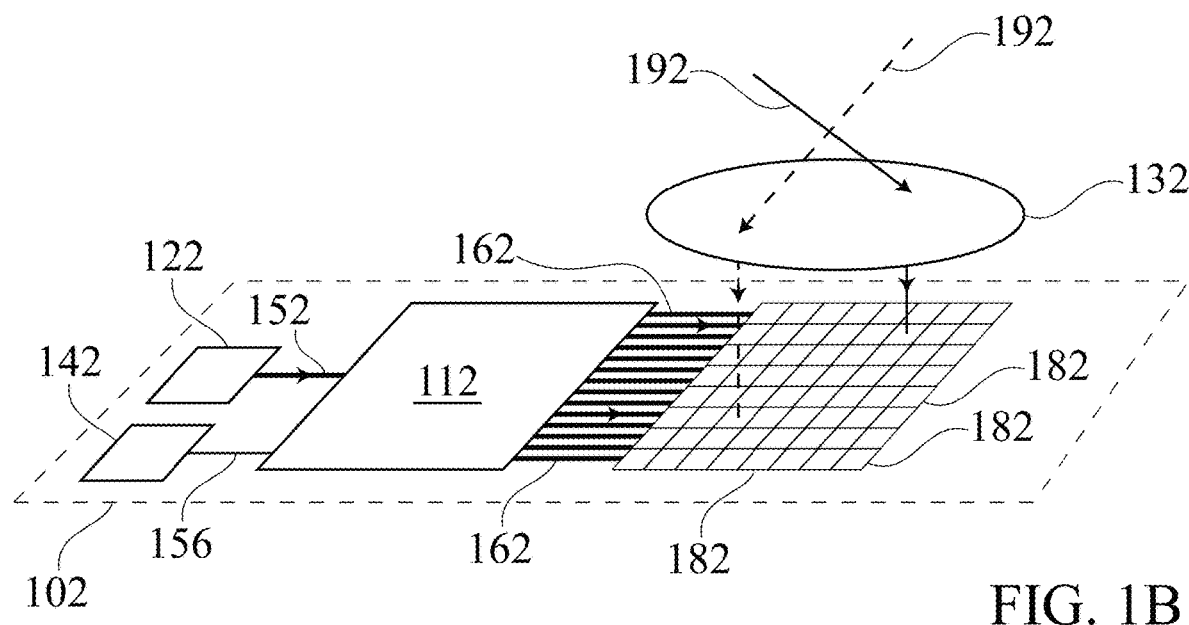
FIG. 1B

DEVICE AND METHOD FOR ROUTING OPTICAL SIGNALS

CROSS REFERENCE TO RELATED APPLICATIONS

This application claims priority to U.S. Provisional Patent Application No. 63/594,337, filed Oct. 30, 2023, which is hereby assigned to the assignee hereof and hereby expressly incorporated by reference herein in its entirety as if fully set forth below and for all applicable purposes.

STATEMENT REGARDING FEDERALLY SPONSORED RESEARCH OR DEVELOPMENT

This invention was made with Government support under Grant Number 2241921 awarded by the National Science Foundation. The Government has certain rights to this invention.

TECHNICAL FIELD

The present disclosure relates to routing of an optical signal in a photonic integrated circuit.

BACKGROUND

An optical routing circuit (ORC), also known as an optical switch circuit or photonic switch circuit, is an optical circuit that may route an optical signal received from a light source, through a number of nodes in the ORC, to one or more optical output channels of the ORC. The nodes of the ORC may carry out the tasks of routing and distributing the optical signal.

SUMMARY

The present disclosure describes optical routing circuits and methods of operating optical routing circuits. According to an embodiment, an optical routing circuit includes a first node, a second node, a third node, and a node control system. A first optical signal channel optically couples the first node to the second node. A second optical signal channel optically couples the first node to the third node. A first node control channel electrically couples the first node to the node control system. A second node control channel electrically couples both the second node and the third node to the node control system. When the second node is activated and the third node is deactivated: control of the second node by the node control system through the second node control channel is enabled, control of the third node by the node control system through the second node control channel is disabled, and control of the first node by the node control system through the first node control channel is enabled such that the first node directs an optical signal to the second node through the first optical signal channel rather than to the third node through the second optical signal channel.

According to another embodiment, a node of an optical routing circuit includes a node optical unit and a node electronic unit. The node optical unit comprises an optical switch. The node optical unit is electrically coupled to the node electronic unit. The node electronic unit is electrically coupled to a node control channel. When the node is activated, the node electronic unit enables control of the node optical unit by a node control system through the node control channel such that the optical switch directs an optical signal at the node optical unit to at least one of a first optical signal channel coupled to the node optical unit or a second optical signal channel coupled to the node optical unit. When the node is deactivated, the node electronic unit disables control of the node optical unit by the node control system through the node control channel.

According to another embodiment, a method for routing an optical signal includes configuring, through a first node control channel electrically coupled to a first node of an optical routing circuit (ORC) and a node control system, the first node to direct, through a first optical signal channel optically coupled to the first node and a second node of the ORC, an optical signal to the second node rather than to a third node of the ORC through a second optical signal channel optically coupled to the first node and the third node when the second node is activated and the third node is deactivated. The method also includes controlling, through a second node control channel electrically coupled to the second node, the third node, and the node control system, the second node when the second node is activated and the third node is deactivated and controlling, through the second node control channel, the third node when the third node is activated and the second node is deactivated.

BRIEF DESCRIPTION OF THE DRAWINGS

The skilled artisan will understand that the drawings are primarily for illustrative purposes and are not intended to limit the scope of the disclosed subject matter. The drawings are not necessarily to scale; in some instances, various aspects of the disclosed subject matter may be shown exaggerated or enlarged in the drawings to facilitate an understanding of different features.

FIGS. 1A and 1B illustrate example photonic systems.

DETAILED DESCRIPTION

Figure 2:
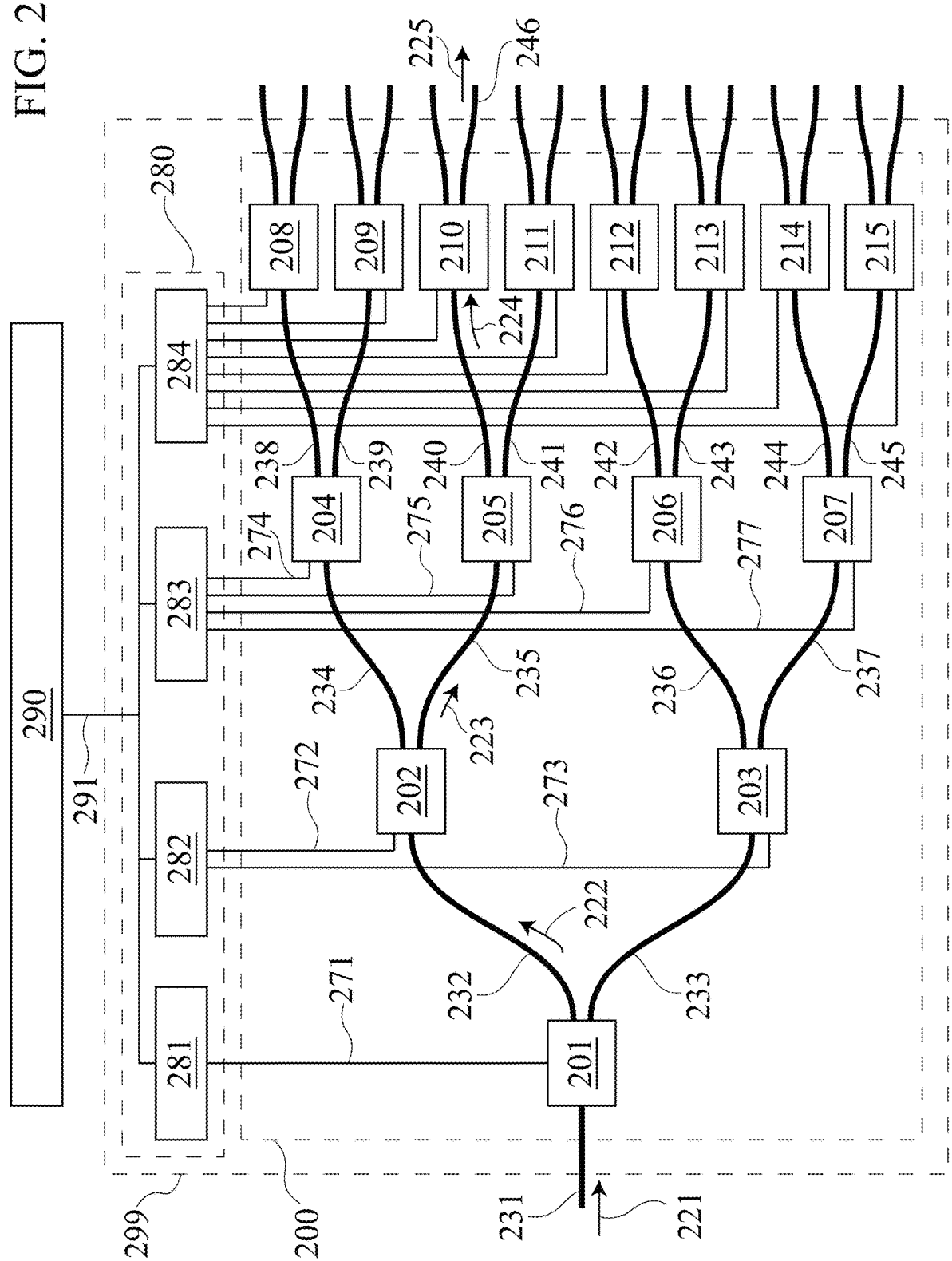
FIG. 2 illustrates an example ORC.

The following detailed description includes systems, devices, components, methods, techniques, and instruction sequences that illustrate embodiments of the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced with or without these specific details. In general, instruction instances, protocols, structures, and techniques well-known to those skilled in the art are not necessarily shown in detail.

An ORC is an optical circuit that routes an optical signal received from a light source through a number of nodes in the ORC to one or more optical output channels of the ORC. The nodes of the ORC may carry out the tasks of routing and distributing the optical signal. An ORC may be used for beam-steering in a Light Detection and Ranging (LiDAR) system, and a common configuration for an ORC is a Mach-Zehnder (MZ) switch tree, in which each node of the tree includes an MZ switch as an optical switch for routing optical signals. An ORC may be miniaturized by implementing as a photonic integrated circuit (PIC) on a PIC chip. In conventional ORCs, the optical switch in each node may be individually connected to an electrical node control system, which controls the operation of the optical switch. Thus, the number of electrical connections that interface the node control system with the nodes scales with the number of nodes in the ORC. Consequently, the complexity of the electrical interface between the nodes of an ORC and the node control system may limit the size of the ORC (e.g., the number of nodes in the ORC).

The present disclosure describes an ORC that routes an optical signal received from a light source to one or more optical output channels of the ORC through a number of nodes in the ORC. The ORC includes a network of nodes optically connected with optical signal channels, with a node of the network comprising an optical switch with electronic circuits. The nodes of the network may be controlled by a node control system which may be coupled to the nodes. The present disclosure is motivated by the fact that, even though an ORC may have many optical output channels for out-coupling optical signals from the ORC, the ORC may only need to route optical signals to a small subset of the optical output channels simultaneously at any given moment. For example, the number of optical output channels of the ORC may be, but is not limited to, more than 1000, but the subset may include, but is not limited to, one to eight optical output channels selected from any of the optical output channels of the ORC. In some embodiments, the ORC of the present disclosure may achieve a simpler interfacing circuitry for coupling the node control system to the nodes of the ORC by sharing an electrical channel among a subset of the nodes for the control of the nodes by the node control system. In some embodiments, the ORC of the present disclosure may achieve a simpler interfacing circuitry by additionally sending electrical signals between the nodes in the network.

In some respects, the ORC of the present disclosure may be used for light distribution and/or routing in photonic systems including but not limited to a LiDAR system and an optical communication system. FIGS. 1A and 1B illustrate example photonic systems in which the ORC of the present disclosure may be used.

FIG. 1A illustrates a perspective view of an example photonic subsystem 101. FIG. 1A also shows an optical system 131 that may or may not be part of the photonic subsystem 101. The photonic subsystem 101 may function as a transmitter (e.g., in a LiDAR system or an optical communication system). The portions of the photonic subsystem 101 may be implemented on the same platform (e.g., a monolithic electronic-photonic integrated circuit (EPIC) chip). The portions of the photonic subsystem 101 may be implemented on distinct platforms (e.g., a configuration in which the portions or components of the photonic subsystem 101 are implemented on one or more of electronic integrated circuit (EIC) chips, photonic integrated circuit (PIC) chips, and EPIC chips, with the chips coupled to each other through appropriate optical and/or electrical interfaces).

As seen in FIG. 1A, the photonic subsystem 101 includes an ORC 111 coupled to an optical input channel 151. The optical input channel 151 may be coupled to a light source 121. The light source 121 may be implemented on the same platform as the ORC 111. In some instances, the light source 121 may be implemented as an external light source that may be coupled to the optical input channel 151 through an optical interface. The optical interface may include a free-space-to-waveguide coupler and/or other components (e.g., an optical fiber and a fiber-to-waveguide coupler). As illustrated in FIG. 1A, the ORC 111 may further be coupled to a plurality of optical output channels 161. An optical output channel 161 may be coupled to one or more optical out-couplers 171, which may out-couple optical signals from the photonic subsystem 101 to free space. Examples of an optical out-coupler 171 may include, but are not limited to, a grating coupler, an edge coupler, an optical fiber, and any of other waveguide-to-free-space couplers that are known to those skilled in the art.

The light source 121 may produce an optical signal that is routed through the optical input channel 151 to the ORC 111. The ORC 111 routes the optical signal to one or more optical output channels 161. The routing of the optical signal within the ORC 111 may be controlled by an ORC controller 141, which may be electrically coupled to the ORC 111 through an electrical channel 155. The optical output channels 161 may out-couple optical signals 191 to free space through one or more optical out-couplers 171. An out-coupled optical signal 191 may or may not pass through the optical system 131. When an out-coupled optical signal 191 passes through the optical system 131, the out-coupled optical signal 191 may be transmitted to an angular position within the field of view of the optical system 131. Different optical signals 191 may be transmitted to different angular positions within the field of view of the optical system 131. The optical out-couplers 171 may be positioned on a focal plane of the optical system 131 or on a plane other than a focal plane of the optical system 131. In some embodiments, the optical out-couplers 171 are positioned on more than one plane, and each of the planes may or may not be a focal plane of the optical system 131.

As seen in FIG. 1A, the optical out-couplers 171 that are coupled to the optical output channels 161 are arranged as a two-dimensional configuration on a plane with respect to the optical system 131. The optical out-couplers 171 may or may not be regularly spaced in the two-dimensional configuration. In some embodiments, the optical out-couplers 171 that are coupled to the optical output channels 161 may be arranged as a one-dimensional configuration on a plane with respect to the optical system 131 or a three-dimensional configuration at a location with respect to the optical system 131. The optical out-couplers 171 may or may not be regularly spaced in the one-dimensional configuration or the three-dimensional configuration. An optical signal output from the light source 121 may be modulated in amplitude with respect to time (e.g., as a pulsed optical signal with a certain pulse width and a certain repetition rate or as an amplitude-modulated data stream with a certain data rate). The optical signal output from the light source 121 may be modulated in frequency with respect to time (e.g., as a linearly or nonlinearly frequency-chirped continuous-wave optical signal with a certain chirp profile and a certain repetition rate). The optical signal output from the light source 121 may be modulated in phase with respect to time.

The optical signal from the light source 121 may be modulated in any of amplitude, frequency, and phase with respect to time.

Due to the reversibility of light, the photonic subsystem 101 may function as a receiver (e.g., in a LiDAR system or an optical communication system) by replacing the light source 121 with a photodetector. Similar to the light source 121, the photodetector may be implemented on the same platform as the ORC 111 or be coupled to the optical input channel 151 through an optical interface. As a receiver, the optical couplers 171 of the modified photonic subsystem 101 may function as optical in-couplers to in-couple optical signals in reversed directions from free space to the modified photonic subsystem 101. The in-coupled optical signals received by the optical couplers 171 may be routed through the optical channels 161 and the ORC 111 in reversed directions to the optical channel 151. The optical signals may then be detected by the photodetector. In some respects, the photonic subsystem 101 may function as both a transmitter and a receiver by replacing the light source 121 with an assembly including a light source, a photodetector, and an optical circulator. The light source and the photodetector may be coupled to the optical channel 151 through the optical circulator. Similar to the light source 121, the assembly may be implemented on the same platform as the ORC 111 or be coupled to the optical channel 151 through an optical interface.

FIG. 1B illustrates a perspective view of an example photonic subsystem 102. The photonic subsystem 102 may function as a receiver (e.g., in a coherent LiDAR system or a coherent optical communication system). Similar to the photonic subsystem 101 in FIG. 1A, components or portions of the photonic subsystem 102 may be implemented on the same platform or on distinct platforms. Additionally, the optical system 132 may or may not be part of the photonic subsystem 102.

As seen in FIG. 1B, the photonic subsystem 102 includes an ORC 112 coupled to an optical input channel 152, which may be coupled to a light source 122. When the photonic subsystem 102 functions as a receiver in a coherent LiDAR system or a coherent optical communication system, the light source 122 may function as a local oscillator (LO) light source that may supply an LO signal to the photonic subsystem 102. The light source 122 may be implemented on the same platform as the ORC 112. The light source 122 may be implemented as an external light source that may be coupled to the optical input channel 152 through an optical interface. In the photonic subsystem 102, the ORC 112 may further be coupled to a plurality of optical output channels 162. An optical output channel 162 may be coupled to one or more coherent detection pixels 182.

The LO signal may be routed through the optical input channel 152 and the ORC 112 to one or more optical output channels 162. The routing of the LO signal within the ORC 112 may be controlled by an ORC controller 142, which may be electrically coupled to the ORC 112 through an electrical channel 156. LO signals received by one or more optical output channels 162 may be routed to one or more coherent detection pixels 182. The coherent detection pixels 182 may mix the LO signals with optical signals 192 received from free space by one or more coherent detection pixels 182. The photonic subsystem 102 may receive an optical signal 192 from free space through the optical system 132. The photonic subsystem 102 may receive an optical signal 192 from free space without the optical system 132. When the photonic subsystem 102 receives an incoming optical signal 192 from free space through the optical system 132, the coherent detection pixels 182 may be positioned with respect to the optical system 132 so that the incoming optical signal 192 is received at an angular position within the field of view of the optical system 132. Different optical signals 192 may correspond to different angular positions within the field of view of the optical system 132. The coherent detection pixels 182 may be positioned on a focal plane of the optical system 132 or on a plane other than a focal plane of the optical system 132. In some embodiments, the coherent detection pixels 182 may be positioned on more than one plane, and each of the planes may or may not be a focal plane of the optical system 132.

LO signals from the light source 122 may be coherent with the optical signals 192 that may be received from free space by the photonic subsystem 102. When the photonic subsystem 102 functions as a receiver in a coherent LiDAR system, the optical signals 192 may be reflected from an object, and the reflected optical signals may be originated from a transmitter in a LiDAR system. In some respects, the LiDAR transmitter may be the photonic subsystem 101 illustrated in FIG. 1A. The light source of the LiDAR transmitter, such as the light source 121 in FIG. 1A, and the light source 122 may be related (e.g., they may be originated from the same light source).

As seen in FIG. 1B, the coherent detection pixels 182 that are coupled to the optical output channels 162 are arranged as a two-dimensional configuration. In some embodiments, the coherent detection pixels 182 that are coupled to the optical output channels 162 may be arranged as a one-dimensional configuration or a three-dimensional configuration. The coherent detection pixels 182 may or may not be regularly spaced in the one-dimensional configuration, the two-dimensional configuration, or the three-dimensional configuration.

Embodiments of the present disclosure may allow a photonic system that includes an optical switch circuit to be scalable to have many optical output channels, while the interface between the optical switch circuit and an electrical control circuit for the control of the optical switch circuit may be made simple.

FIG. 2 illustrates an example ORC 299. The ORC 299 includes a photonic network circuit 200 and a node control system 280. In the example of FIG. 2, the photonic network circuit 200 includes a 4-level rooted binary tree, and the node control system 280 includes four node controls 281, 282, 283 and 284, with each node control 281, 282, 283, or 284 electrically coupled to nodes in a level of the binary tree of the photonic network circuit 200. An ORC controller 290 may determine an operational state of the ORC 299, which may govern how optical signals are routed through the ORC 299. The ORC controller 290 may be external to the ORC 299, or may be part of the ORC 299 (e.g., the ORC controller 290 and the node control system 280 may be a combined system). The ORC controller 290 may be coupled to the node control system 280 through an electrical ORC control channel 291.

The photonic network circuit 200 includes nodes 201, 202, 203, 204, 205, 206, 207, 208, 209, 210, 211, 212, 213, 214, and 215, and optical signal channels 232, 233, 234, 235, 236, 237, 238, 239, 240, 241, 242, 243, 244, and 245. Each of the nodes 201, 202, 203, 204, 205, 206, 207, 208, 209, 210, 211, 212, 213, 214, and 215 includes an optical switch, and each of the optical signal channels 232, 233, 234, 235, 236, 237, 238, 239, 240, 241, 242, 243, 244, and 245 may be optically coupled to the nodes 201, 202, 203, 204, 205, 206, 207, 208, 209, 210, 211, 212, 213, 214, and 215 for the transmission of an optical signal. An optical switch of a node

201, 202, 203, 204, 205, 206, 207, 208, 209, 210, 211, 212, 213, 214, or 215 may be coupled to one or more optical in-coupling channels and one or more optical out-coupling channels. An optical in-coupling channel may in-couple an optical signal into the optical switch of the node 201, 202, 203, 204, 205, 206, 207, 208, 209, 210, 211, 212, 213, 214, or 215. An optical out-coupling channel may out-couple an optical signal out of the optical switch of the node 201, 202, 203, 204, 205, 206, 207, 208, 209, 210, 211, 212, 213, 214, or 215. The optical switch may route or switch an optical signal received by the switch to one or more optical out-coupling channels of the switch. In FIG. 2, an optical switch in the photonic network circuit 200 may be coupled to one optical in-coupling channel and two optical out-coupling channels. Examples of an optical switch may include, but are not limited to, an MZ switch, a ring switch, a micro-electromechanical system (MEMS) switch, and any other electro-optical, thermo-optical, acousto-optical or mechanical-optical switch.

The optical signal channel 231 may be an optical input channel of the ORC 299 and may be used to optically in-couple an optical signal 221 to the root node 201. The optical signal 221 may be routed through the photonic network circuit 200 by controlling the optical switches at the nodes 201, 202, 203, 204, 205, 206, 207, 208, 209, 210, 211, 212, 213, 214 and 215. These optical switches may be controlled by the node controls 281, 282, 283, and 284. In the example of FIG. 2, the optical signal 221 is routed, as optical signals 222, 223, and 224 through the nodes 201, 202, 205, and 210 along an optical path that includes the optical signal channels 232, 235, and 240. The optical signal 221 is out-coupled from the ORC 299 as an optical signal 225 through the optical signal channel 246, which may serve as an optical output channel of the ORC 299.

Each node 201, 202, 203, 204, 205, 206, 207, 208, 209, 210, 211, 212, 213, 214, or 215 may be coupled to a node control 281, 282, 283, or 284 through a distinct electrical node control channel. The node 201 is electrically coupled to the node control 281 through an electrical node control channel 271. The nodes 202 and 203 are electrically coupled to the node control 282 through electrical node control channels 272 and 273, respectively. The nodes 204, 205, 206, and 207 are electrically coupled to the node control 283 through electrical node control channels 274, 275, 276, and 277, respectively. The nodes 208, 209, 210, 211, 212, 213, 214, and 215 are electrically coupled to the node control 284 through individual electrical node control channels. A node control 281, 282, 283, or 284 may simultaneously and individually control either all or a subset of the nodes 201, 202, 203, 204, 205, 206, 207, 208, 209, 210, 211, 212, 213, 214, and 215 that are coupled to the node control 281, 282, 283, or 284. It can be seen that the number of electrical node control channels coupled to the node control system 280 scales with the number of nodes in the photonic network circuit 200. Consequently, the interface between the node control system 280 and the photonic network circuit 200 may become complex when the size of the photonic network circuit 200 is large (e.g., when the number of nodes is $2^{n+1}-1$ with $n \geq 6$). Worse still, an electrical node control channel may include more than one physical electrical connection path. If the node control system 280 is to be implemented on an EIC chip that is distinct from a PIC chip that implements the photonic network circuit 200, the circuitry for the interface between the EIC chip and the PIC chip may become very complex and unwieldy.

The present disclosure describes an ORC that includes a photonic network circuit and a node control system and uses shared node control channels for levels, groups, or subsets of nodes in the photonic network circuit for interfacing the photonic network circuit with the node control system. Sharing the node control channels may reduce the complexity of the interface between the node control system and the photonic network circuit. The shared node control channels may allow resources in the node control system (e.g., power supply circuits for driving optical switches) to be shared among the nodes in the photonic network circuit for the control of the nodes. The photonic network circuit and the node control system may be implemented on the same platform (e.g., a monolithic EPIC chip) or on distinct platforms (e.g., a configuration in which the photonic network circuit may be implemented on an EPIC chip, and the node control system may be implemented on an EIC chip, with the EPIC and EIC chips coupled to each other through an electrical interface).

The photonic network circuit may include nodes arranged in any pattern or shape (e.g., conceptually as a graph, such as a binary tree, an H-tree, etc.). The nodes may be connected by optical signal channels. An optical signal channel that in-couples an optical signal to a node may be referred to as an optical in-coupling channel of the node, and an optical signal channel that out-couples an optical signal from a node may be referred to as an optical out-coupling channel of the node. An optical signal channel may be implemented as an optical waveguide, an optical fiber, a free-space optical path, etc. A node of the photonic network circuit of the ORC may be coupled to one or more optical signal channels for in-coupling optical signals to the node and be coupled to one or more optical signal channels for out-coupling optical signals from the node.

The photonic network circuit includes at least one input node and at least one output node. An input node of the photonic network circuit is a node that may receive an optical signal input to the photonic network circuit. An output node of the photonic network circuit is a node that may output an optical signal from the photonic network circuit. An optical signal may be input to an input node of the photonic network circuit through an optical input channel that is coupled to the input node, and the optical signal may be output from the photonic network circuit through an optical output channel that is coupled to an output node of the photonic network circuit. The optical signal that is input to the photonic network circuit may reach a node of the photonic network circuit through one or more optical paths in which an optical path includes a sequence of optical signal channels that join a sequence of nodes. Depending on the configuration of the photonic network circuit, an optical input channel and an optical output channel, and accordingly, an input node and an output node, of the photonic network circuit may be connected by one or more optical paths. Adjacent nodes are connected by an optical signal channel. For two adjacent nodes on an optical path, the node that sends an optical signal to the other node may be referred to as a parent node with respect to the other node, and the node that receives an optical signal from the other node may be referred to as a child node with respect to the other node. One of the nodes may always be a parent node of the other node, or one of the nodes may be both a parent node and a child node of the other node.

In the photonic network circuit, two adjacent nodes of the photonic network circuit may be connected by one or more electrical signal channels through which an electrical signal may be transmitted between the two nodes. Examples of an electrical signal that may be transmitted between two adjacent nodes may include, but are not limited to, an electrical activation signal to be described below. An electrical signal channel may include one or more physical electrical connection paths. Examples of a physical electrical connection path may include, but are not limited to, an electrical wire.

The nodes of the photonic network circuit may be grouped into subsets of nodes. Nodes in a subset in the photonic network circuit may or may not have the same design as each other. The node control system of the ORC may include one or more node control units, which may be referred to as node controls. A node control may include control electronics and power supply circuits that may be used to control one or more nodes through an electrical node control channel. A subset of nodes of the photonic network circuit may be electrically coupled to one or more node controls through one or more electrical node control channels. A node control may be electrically coupled to one or more subsets of nodes through one or more electrical node control channels. An electrical node control channel that is shared among more than one node may be referred to as a shared electrical node control channel. The node control system may control one or more nodes in a subset through a shared electrical node control channel. The node control system may include one node control so that the node control is equivalent to the node control system. Explicit descriptions of node controls for some embodiments in the present disclosure may be for the purpose of simplifying the descriptions of the embodiments.

A node in the photonic network circuit may be set in either an activated state (e.g., the node is activated) or a deactivated state (e.g., the node is deactivated). When the node is activated, it may be controlled by the node control system (or a node control of the node control system). When the node is deactivated, it may not be controlled by the node control system (or the node control).

Figure 11A:
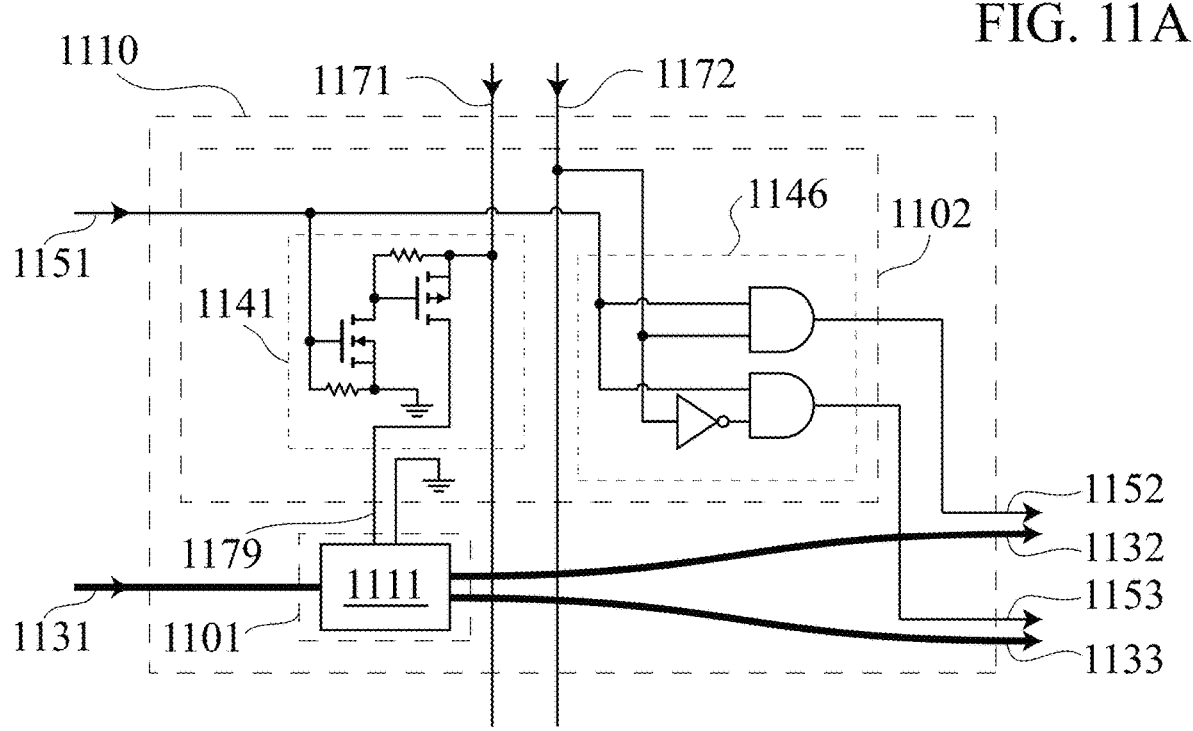
FIGS. 11A, 11B, 11C, 11D, 11E, and 11F illustrate example nodes.
Figure 16A:
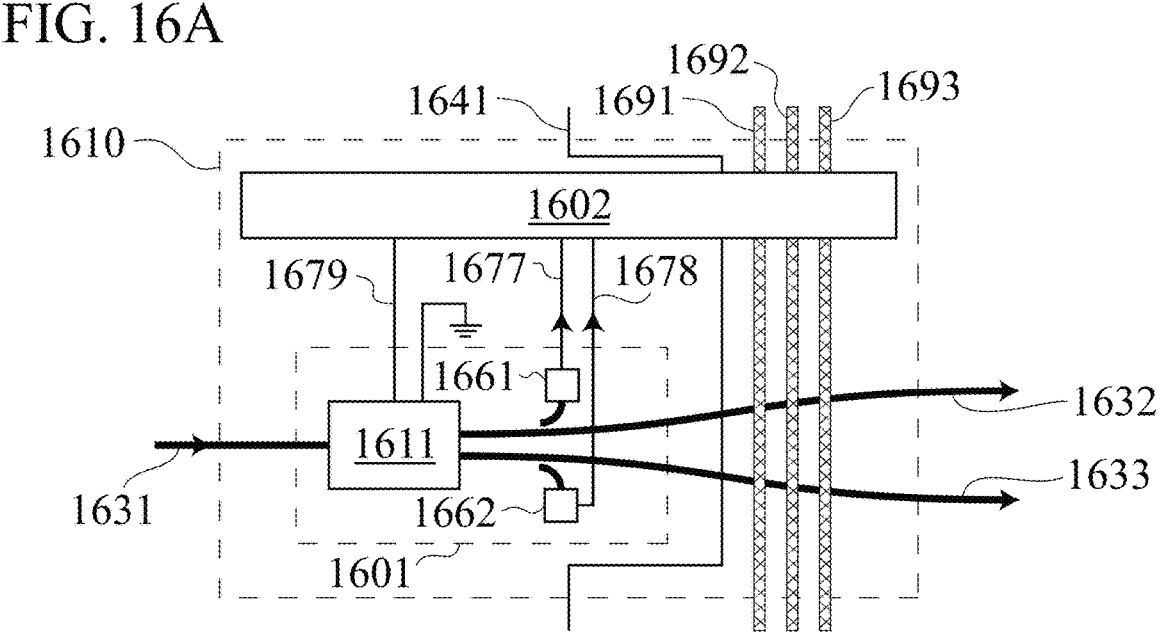
FIG. 16A illustrates an example node.

In some embodiments, a node in the photonic network circuit has a parent node, and the node and the parent node may be electrically coupled by an electrical signal channel. The node may be activated when it receives an electrical activation signal in an ON state (e.g., an electrical ON signal) from any of its parent nodes, whereas the node may be deactivated when it receives an electrical activation signal in an OFF state (e.g., an electrical OFF signal) from each of its parent nodes. An example of a node which may be activated by receiving an electrical activation signal from a parent node is illustrated in FIG. 11A. In some embodiments, a node in the photonic network circuit may be activated or deactivated by not receiving an electrical activation signal from a parent node. Examples of such a node may include, but are not limited to, an input node that has no parent node. In some instances, the node may be activated and remain activated without receiving an electrical activation signal. In other instances, the node may be activated or deactivated when it receives an electrical activation signal from a node control to which the node may be coupled. In further instances, the node may be activated or deactivated when it receives an electrical activation signal from an electrical activation circuit that may be implemented within or outside the node. An example of a node which may be activated and remain activated without receiving an electrical activation signal is illustrated in FIG. 11D, and an example of a node which may be activated by receiving an electrical activation signal from a node control is illustrated in FIG. 16A. The examples of FIGS. 11A, 11D, and 16A are described later in this disclosure. In some embodiments, a node may be set to be deactivated by default without receiving an electrical OFF signal, until it may be activated by receiving an electrical ON signal. In some embodiments, a node may be set to be activated by default without receiving an electrical ON signal, until it may be deactivated by receiving an electrical OFF signal.

When a node is in an activated state, a control of the node by a node control may be enabled by establishing an electrical connection between the node and the node control through an electrical node control channel. The control of an activated node by a node control may include controlling, by the node control, the operation of the optical switch of the node, which in turn may control the routing of an optical signal received by the activated node. When a node is activated, the node may perform additional tasks such as, but are not limited to, transmitting a first electrical feedback signal from the activated node to the node control. The node control may control the activated node based on the first electrical feedback signal received from the activated node. The node control system may control another activated node based on the first electrical feedback signal. If an activated node has a child node, the activated node may additionally send an electrical activation signal to the child node through an electrical signal channel that may be coupled to the node and the child node. The state of the electrical activation signal may be controlled or determined by the node control when the node is activated. The state of the electrical activation signal may be determined, either entirely or partially, by an electrical control signal sent by the node control and received by the activated node. The electrical control signal may be transmitted from the node control to the activated node through the electrical node control channel. An electrical activation signal that may be sent to a child node of an activated node may be an electrical ON signal if the child node may receive an optical signal from the activated node, whereas an electrical activation signal that may be sent to the child node may be an electrical OFF signal if the child node may receive no optical signal from the activated node. Here no optical signal refers to an optical signal with zero power, or, in some embodiments, a negligible power that is much smaller than, such as but is not limited to less than 2% percent of, the power of an optical signal that may be received by the activated node. In other embodiments, no optical signal may refer to an optical signal with an optical power less than a certain threshold level.

When a node is in a deactivated state, the node may be configured in such a way that a control of the node by a node control, which might control the node if the node would be activated, may be disabled. The control of a node by a node control may be disabled by cutting off an electrical connection between the node and the node control through an electrical node control channel, in which the node may be coupled to the node control through the electrical node control channel. When a node is deactivated, the node may perform additional tasks such as, but are not limited to, transmitting a second electrical feedback signal from the deactivated node to the node control. The second electrical feedback signal may be used for the control of other activated nodes. If a deactivated node has a child node, the deactivated node may additionally send an electrical activation signal to the child node through an electrical signal channel that may be coupled to the node and the child node. A deactivated node may be configured to send an electrical OFF signal to each child node of the deactivated node through an electrical signal channel.

A subset of nodes in the photonic network circuit may share an electrical node control channel for coupling to a node control. A group of nodes selected from the subset may be activated simultaneously. The group of activated nodes selected from the subset may be determined according to the operational state of the ORC. An operational state may indicate or control how an optical signal is routed through the ORC. The node control may simultaneously control all nodes in the group, which may be coupled to the node control through the shared electrical node control channel. The node control may additionally control each of the activated nodes in the group individually through the shared electrical node control channel. The node control may control, simultaneously and individually, each of the activated nodes in the group when the group size is smaller than or equal to a certain maximum number, which may be referred to as a maximum simultaneously-and-individually-activated (MSIA) group size. Because the nodes in the group are selected from the subset, the MSIA group size may be attributed to the subset. The MISA group size of a subset may be determined by a configuration of a shared electrical node control channel for coupling the nodes in the subset to a node control. More specifically, the shared electrical node control channel may allow or limit a maximum number of activated nodes that may be simultaneously and individually controlled by the node control. Thus, the MSIA group size may also be attributed to the shared electrical node control channel. A node may conform with the shared electrical node control channel to enable a maximum number of activated nodes to be simultaneously and individually controlled by a node control. Examples of the MSIA group size of a subset may include, but are not limited to, a number from one to eight. In some instances, the MSIA group size of a subset may depend on the number of nodes in the subset. For example, the MSIA group size of a subset may be set to be proportional to the number of nodes in the subset. In other instances, the MSIA group size of a subset may be independent of the number of nodes in the subset. For example, the MSIA group size of a subset may be set to a certain fixed number. The MSIA group size of a subset may be related to a maximum number of optical output channels of the ORC to which optical signals may be output simultaneously. FIGS. 11A-E, 12, 13A, and 16A illustrate examples of a node that may enable a group of activated nodes to be controlled simultaneously and individually by a node control up to an MSIA group size through a shared electrical node control channel. FIGS. 11A-E, 12, 13A and 16A are described later in this disclosure.

Figure 3:
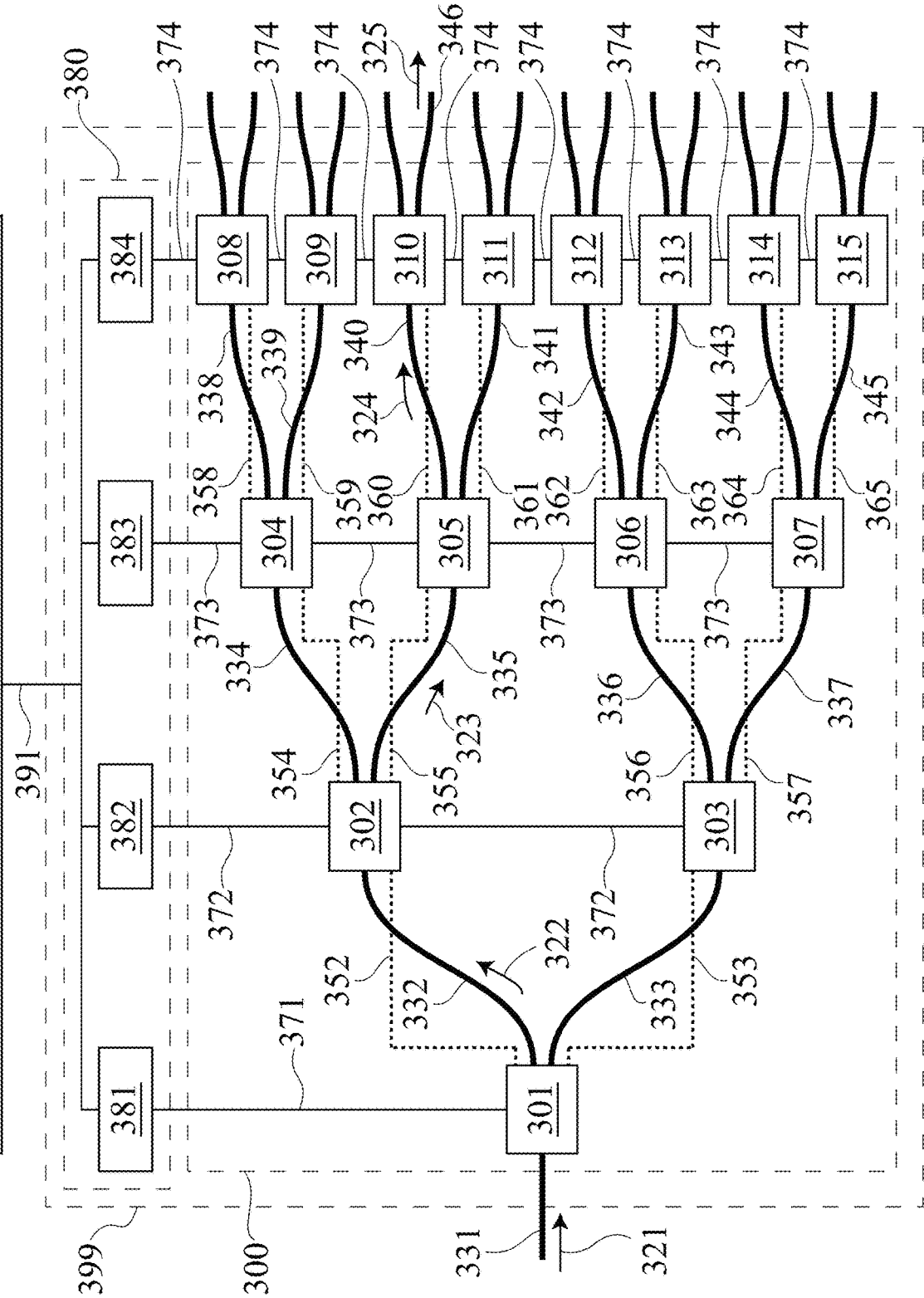
FIG. 3 illustrates an example ORC.

FIG. 3 illustrates an example ORC 399 that includes a photonic network circuit 300 and a node control system 380. In the example of FIG. 3, the photonic network circuit 300 is in a form of a 4-level rooted binary tree. In the photonic network circuit 300, nodes in a tree level form a subset of nodes that may share an electrical node control channel for coupling to the node control system 380 (e.g., to node controls 381, 382, 383, and 384 of the node control system 380). It should be understood that, even though the node controls 381, 382, 383, and 384 are depicted as separate entities in the node control system 380, they may or may not be coupled to each other by electrical connections, either directly or through an electrical circuit in the node control system 380. In some instances, the node control system 380 may not have explicitly-distinct node controls as shown in FIG. 3.

An ORC controller 390 may determine the operational state of the ORC 399. The ORC controller 390 may be external to the ORC 399, or may be part of the ORC 399 (e.g., the ORC controller 390 and the node control system 380 may be a combined system). The ORC controller 390 may be, but is not limited to, one or more of a computer, an electronic circuit, a field-programmable gate array (FPGA), or an application-specific integrated circuit (ASIC). The ORC controller 390 may be coupled to the node control system 380 through an electrical ORC control channel 391. The electrical ORC control channel 391 may include one or more physical electrical connection paths. The electrical ORC control channel 391 may include a wireless connection. The wireless connection may be, but is not limited to, a wireless RF connection or a wireless optical connection.

The ORC 399 may correspond to the ORC 111 in FIG. 1A or the ORC 112 in FIG. 1B, and the ORC controller 390 may correspond to the ORC controller 141 in FIG. 1A or the ORC controller 142 in FIG. 1B. In some embodiments, the ORC 111 in FIG. 1A or the ORC 112 in FIG. 1B may include the photonic network circuit 300 but not the node control system 380, whereas the ORC controller 141 in FIG. 1A or the ORC controller 142 in FIG. 1B may include the ORC controller 390 and the node control system 380.

The photonic network circuit 300 includes nodes 301, 302, 303, 304, 305, 306, 307, 308, 309, 310, 311, 312, 313, 314, and 315, optical signal channels 332, 333, 334, 335, 336, 337, 338, 339, 340, 341, 342, 343, 344, and 345 that may be optically coupled to the nodes 301, 302, 303, 304, 305, 306, 307, 308, 309, 310, 311, 312, 313, 314, and 315 in the photonic network circuit 300, and electrical signal channels 352, 353, 354, 355, 356, 357, 358, 359, 360, 361, 362, 363, 364, and 365 that may be electrically coupled to the nodes 301, 302, 303, 304, 305, 306, 307, 308, 309, 310, 311, 312, 313, 314, and 315 in the photonic network circuit 300. In FIG. 3, the node 301 serves as an input node and a root node to the photonic network circuit 300. The node 301 is coupled to an optical signal channel 331, which serves as an optical input channel of the photonic network circuit 300. The nodes 308, 309, 310, 311, 312, 313, 314, and 315 serve as output nodes and end nodes to the photonic network circuit 300. The nodes 308, 309, 310, 311, 312, 313, 314, and 315 are coupled to optical out-coupling channels, which serve as optical output channels of the photonic network circuit 300. In the example of FIG. 3, the node 310 is coupled to an optical output channel 346. Each node 301, 302, 303, 304, 305, 306, 307, 308, 309, 310, 311, 312, 313, 314, or 315 in the photonic network circuit 300 may include an optical switch. The nodes 301, 302, 303, 304, 305, 306, 307, 308, 309, 310, 311, 312, 313, 314, and 315 may also include other photonic and electronic components.

The ORC 399 provides certain features, including (1) the sharing of an electrical node control channel among a group or subset of nodes in the photonic network circuit 300 and (2) the sending of electrical signals from parent nodes to their child nodes. To realize either or both of these features, the nodes 301, 302, 303, 304, 305, 306, 307, 308, 309, 310, 311, 312, 313, 314, and 315 of the photonic network circuit 300 may be implemented with photonic and electronic components. The photonic and electronic components may be implemented on the same platform (e.g., a monolithic EPIC chip) or on distinct platforms (e.g., a configuration in which the photonic components may be implemented on a PIC chip and the electronic components may be implemented on an EIC chip, with the PIC chip and EIC chip coupled to each other by means of 2.5D or 3D electronic-photonic integration).

In the photonic network circuit 300, an optical signal 321 may be in-coupled to the node 301 through the optical input channel 331. The photonic network circuit 300 may route the optical signal 321 through various levels, groups, or subsets of the nodes 301, 302, 303, 304, 305, 306, 307, 308, 309, 310, 311, 312, 313, 314, and 315. For example, the photonic network circuit 300 may first route the optical signal 321 from the node 301 through a first level that includes the nodes 302 and 303. The photonic network circuit 300 may then route the optical signal 321 through a second level that includes the nodes 304, 305, 306 and 307. The photonic network circuit 300 may then route the optical signal 321 through a third level that includes the nodes 308, 309, 310, 311, 312, 313, 314 and 315. In the photonic network circuit 300, two of the nodes 301, 302, 303, 304, 305, 306, 307, 308, 309, 310, 311, 312, 313, 314, and 315 that are connected by an optical signal channel 332, 333, 334, 335, 336, 337, 338, 339, 340, 341, 342, 343, 344, or 345 are considered to be in different groups, subsets, or levels.

In the ORC 399, a node 302, 303, 304, 305, 306, 307, 308, 309, 310, 311, 312, 313, 314, or 315 may be activated or deactivated based on an electrical activation signal sent from a parent node through a respective electrical signal channel 352, 353, 354, 355, 356, 357, 358, 359, 360, 361, 362, 363, 364, or 365. A node 302, 303, 304, 305, 306, 307, 308, 309, 310, 311, 312, 313, 314, or 315 may be activated when the node 302, 303, 304, 305, 306, 307, 308, 309, 310, 311, 312, 313, 314, or 315 receives an electrical ON signal from its parent node. A node 302, 303, 304, 305, 306, 307, 308, 309, 310, 311, 312, 313, 314, or 315 may be deactivated when the node 302, 303, 304, 305, 306, 307, 308, 309, 310, 311, 312, 313, 314, or 315 receives an electrical OFF signal from its parent node. In the example of FIG. 3, the node 301 is electrically coupled to the nodes 302 and 303 by the electrical signal channels 352 and 353, respectively, for sending and receiving an electrical activation signal. The node 302 is electrically coupled to the nodes 304 and 305 by the electrical signal channels 354 and 355, respectively, for sending and receiving an electrical activation signal. The node 303 is electrically coupled to the nodes 306 and 307 by the electrical signal channels 356 and 357, respectively, for sending and receiving an electrical activation signal. The node 304 is electrically coupled to the nodes 308 and 309 by the electrical signal channels 358 and 359, respectively, for sending and receiving an electrical activation signal. The node 305 is electrically coupled to the nodes 310 and 311 by the electrical signal channels 360 and 361, respectively, for sending and receiving an electrical activation signal. The node 306 is electrically coupled to the nodes 312 and 313 by the electrical signal channels 362 and 363, respectively, for sending and receiving an electrical activation signal. The node 307 is electrically coupled to the nodes 314 and 315 by the electrical signal channels 364 and 365, respectively, for sending and receiving an electrical activation signal. The nodes 308, 309, 310, 311, 312, 313, 314 and 315 serve as output nodes that have no child nodes. These nodes 308, 309, 310, 311, 312, 313, 314 and 315 do not send an electrical activation signal to any child node. Also, the node 301 serves as an input node that does not have a parent node. In some embodiments, the node 301 may be activated and remain activated to be controlled by the node control 381 through an electrical node control channel 371. In other embodiments, the node 301 may be activated or deactivated by receiving an electrical activation signal from the node control 381 through the electrical node control channel 371, or from an electrical activation circuit that may be implemented within or outside the node 301.

When a node 301, 302, 303, 304, 305, 306, 307, 308, 309, 310, 311, 312, 313, 314 or 315 is in an activated state, the node 301, 302, 303, 304, 305, 306, 307, 308, 309, 310, 311, 312, 313, 314 or 315 may be controlled by a respective node control 381, 382, 383, or 384 through a respective electrical node control channel 371, 372, 373, or 374. When the node 301, 302, 303, 304, 305, 306, 307, 308, 309, 310, 311, 312, 313, 314 or 315 is in a deactivated state, the node 301, 302, 303, 304, 305, 306, 307, 308, 309, 310, 311, 312, 313, 314 or 315 may not be controlled by the respective node control 381, 382, 383, or 384. In the example of FIG. 3, the node 301 is electrically coupled to the node control 381 through the electrical node control channel 371. The nodes 302 and 303 are electrically coupled to the node control 382 through the shared electrical node control channel 372. The nodes 304, 305, 306, and 307 are electrically coupled to the node control 383 through the shared electrical node control channel 373. The nodes 308, 309, 310, 311. 312, 313, 314, and 315 are electrically coupled to the node control 384 through the shared electrical node control channel 374. It should be understood that the nodes in a group, subset, or level are illustrated to couple to a shared electrical node control channel in series for the sake of simplicity of illustration. Generally, nodes in a group, subset, or level may be coupled to a shared electrical node control channel in series, in parallel, or a combination of series and parallel. The node controls 381, 382, 383, and 384 may instruct activated ones of the nodes 301, 302, 303, 304, 305, 306, 307, 308, 309, 310, 311, 312, 313, 314, and 315 in a respective group, subset, or level how to route an optical signal. In the example of FIG. 3, the node controls 381, 382, 383, and 384 may instruct the optical switches in the activated nodes 301, 302, 305, and 310 to route optical signals 322, 323, 324 and 325 along the optical signal channels 332, 335, 340, and 346. The nodes 301, 302, 303, 304, 305, 306, 307, 308, 309, 310, 311, 312, 313, 314, and 315 in the same group, subset, or level may receive the same electrical node control signal from the respective node control 381, 382, 383, or 384. In some instances, a first node (e.g., the node 305) may modify an electrical node control signal received from a node control (e.g., the node control 383) and pass the modified electrical node control signal to a second node (e.g., the node 306), in which the first and second nodes are in the same group, subset, or level, and the first and second nodes are coupled to the node control in a serial configuration through a shared electrical node control channel (e.g., the shared electrical node control channel 373).

The number of electrical node control channels 371, 372, 373, and 374 in the ORC 399 may be proportional to the number of groups, subsets, or levels in the photonic network circuit 300, instead of the number of nodes 301, 302, 303, 304, 305, 306, 307, 308, 309, 310, 311, 312, 313, 314, and 315. The ORC 399 may thus include fewer electrical node control channels 371, 372, 373, and 374 than conventional ORCs. Consequently, the electrical interface between the photonic network circuit 300 and the node control system 380 may be significantly simplified.

An operational state of the ORC 399 may be determined by optical paths chosen to route an optical signal within the photonic network circuit 300 and the fractions of optical outputs designated for each node on the optical paths. In the photonic network circuit 300, the optical input channel 331 is the default input channel. Thus, there may be no need to select an optical input channel in determining the operational state.

In an example operation of the ORC 399, the optical signal 321 from a light source may be input to the ORC 399 through the optical input channel 331, and the optical output channel 346 may be selected to output the optical signal 325 from the ORC 399. An optical path that includes the optical signal channels 332, 335, and 340 that join the nodes 301, 302, 305, and 310 may be chosen to connect the optical input channel 331 and the optical output channel 346. The nodes 301, 302, 305, and 310 on the optical path may be activated to be controlled by the node control system 380. Other nodes 303, 304, 306, 307, 308, 309, 311, 312, 313, 314, and 315 that are not on the optical path may be deactivated. To control the nodes 301. 302, 305, and 310, the fractions of optical signals to be split from a received optical signal and be out-coupled to each of the optical out-coupling channels of the nodes may need to be determined. To maximize the optical power of the optical signal 325 to be output from the ORC 399, the node 301 may out-couple the received optical signal 321 maximally to the optical signal channel 332 as the optical signal 322. The node 302 may out-couple the received optical signal 322 maximally to the optical signal channel 335 as the optical signal 323. The node 305 may out-couple the received optical signal 323 maximally to the optical signal channel 340 as the optical signal 324. The node 310 may out-couple the received optical signal 324 maximally to the optical output channel 346 as the optical signal 325. Based on the selected optical signal channels 332, 335, 340, and 346, an operational state of the ORC 399 may be determined by incorporating the chosen optical path that includes the nodes 301, 302, 305, and 310, and the designated fractions of optical outputs for the nodes 301, 302, 305, and 310 on the optical path.

The photonic network circuit 300 may be configured by the node control system 380 according to the determined operational state of the ORC 399 to route an optical signal through the photonic network circuit 300. The optical signal 321 may be input to the node 301. When the node 301 is activated, the node 301 may be controlled by the node control 381 through the electrical node control channel 371. The node control 381 may control the node 301 to route the optical signal 322 through the optical signal channel 332 and to send an electrical ON signal through the electrical signal channel 352 to the node 302. As a result, the node 302 may be activated and thus be controlled by the node control 382 through the shared electrical node control channel 372. The node control 381 may also control the node 301 to route no optical signal through the optical signal channel 333 and to send an electrical OFF signal through the electrical signal channel 353 to the node 303. As a result, the node 303 may be deactivated and thus may not be controlled by the node control 382 through the shared electrical node control channel 372. Consequently, even though both the nodes 302 and 303 are coupled to the node control 382 through the shared electrical node control channel 372, the node control 382 may control the node 302 through the shared electrical node control channel 372 but not the node 303.

Similarly, the node control 382 may control the node 302 to route the optical signal 323 through the optical signal channel 335 and to send an electrical ON signal through the electrical signal channel 355 to the node 305. As a result, the node 305 may be activated and thus be controlled by the node control 383 through the shared electrical node control channel 373. The node control 382 may also control the node 302 to route no optical signal through the optical signal channel 334 and to send an electrical OFF signal through the electrical signal channel 354 to the node 304. As a result, the node 304 may be deactivated and may not be controlled by the node control 383 through the shared electrical node control channel 373. With the node 303 being deactivated and not controlled by the node control 382, the node 303 may send electrical OFF signals to the nodes 306 and 307 through the electrical signal channels 356 and 357, so that the nodes 306 and 307 may be deactivated and may not be controlled by the node control 383 through the shared electrical node control channel 373. Consequently, even though the nodes 304, 305, 306, and 307 are coupled to the node control 383 through the shared electrical node control channel 373, the node control 383 may control the node 305 through the shared electrical node control channel 373 but not the nodes 304, 306, and 307.

The node control 383 may control the node 305 to route the optical signal 324 through the optical signal channel 340 and to send an electrical ON signal through the electrical signal channel 360 to the node 310. As a result, the node 310 may be activated and be controlled by the node control 384 through the shared electrical node control channel 374. The node control 383 may also control the node 305 to route no optical signal through the optical signal channel 341 and to send an electrical OFF signal through the electrical signal channel 361 to the node 311. As a result, the node 311 may be deactivated and may not be controlled by the node control 384. With the nodes 304, 306, and 307 being deactivated and not controlled by the node control 383, the nodes 304, 306 and 307 may send electrical OFF signals to the nodes 308, 309, 312, 313, 314, and 315 through the electrical signal channels 358, 359, 362, 363, 364, and 365, so that the nodes 308, 309, 312, 313, 314, and 315 may be deactivated and may not be controlled by the node control 384 through the shared electrical node control channel 374. Consequently, even though the nodes 308, 309, 310, 311, 312, 313, 314, and 315 are coupled to the node control 384 through the shared electrical node control channel 374, the node control 384 may control the node 310 through the shared electrical node control channel 374 but not the nodes 308, 309, 311, 312, 313, 314, and 315. The node control 384 may control the node 310 to route the optical signal 325 to the optical signal channel 346, which may serve as an optical output channel of the ORC 399.

Generally, the activation of nodes and the control of activated nodes by node controls may take place separately at different time scales. For example, the activations of the nodes of the photonic network circuit 300 may be completed before the designated fractions of optical outputs for the activated nodes may be attained to result in the optical signal 325 being output from the optical output channel 346.

The role of a node being an input node or an output node may be fixed according to the configuration and operation of the ORC. In some instances, the role of a node being an input node or an output node may not be fixed according to the configuration and operation of the ORC. For example, a node may be an input node at one moment and may become an output node at another moment, depending on the operation of the ORC. As another example, the node may become neither an input node nor an output node at some other moments, depending on the operation of the ORC. In some instances, a node may simultaneously assume the roles of an input node and an output node, according to the configuration and operation of the ORC. Additionally, the roles of being a parent node or a child node for two adjacent nodes may be fixed according to the configuration and operation of the ORC. In some instances, the roles of being a parent node or a child node for two adjacent nodes may not be fixed according to the configuration and operation of the ORC. For example, a node may be a parent node with respect to the other node at one moment, and may become a child node with respect to the other node at another moment, depending on the operation of the ORC. As another example, each of the two adjacent nodes may simultaneously assume the roles of a parent node and a child node, according to the configuration and operation of the ORC.

As an example, due to the reversibility of light, the photonic network circuit 300 may route an optical signal in a reverse direction from one or more of the nodes 308, 309, 310, 311, 312, 313, 314, and 315 to one or more of the nodes 304, 305, 306, and 307, then to one or more of the nodes 302 and 303, and finally to the node 301. In this case, the optical output channels of the nodes 308, 309, 310, 311, 312, 313, 314, and 315 may serve as optical input channels, and the optical signal channel 331 may serve as an optical output channel with the node 301 as an output node. The nodes in the photonic network circuit 300 that were child nodes in previous examples may now serve as parent nodes.

As another example, the ORC 399 may be set to an operational state so that the optical signal 321 may be routed from the optical input channel 331 through the photonic network circuit 300 and be out-coupled from the ORC 399 through one or more optical output channels (e.g., the optical output channel 346). Due to the reversibility of light, the ORC 399 may also, simultaneously or at different times, with or without changes to the states of the nodes, route an optical signal in a reverse direction from one or more optical output channels (e.g., the optical output channel 346), through the photonic network circuit 300, and be out-coupled from the ORC 399 through the optical input channel 331. In this case, a node in the photonic network circuit 300 may assume the roles of an input node and an output node, and a node in the photonic network circuit 300 may assume the roles of a parent node and a child node, simultaneously or at different times. Accordingly, the ORC 399 may exhibit as an optical switch circuit for a photonic subsystem that may function as both a transmitter and a receiver in a photonic system.

Figure 4:
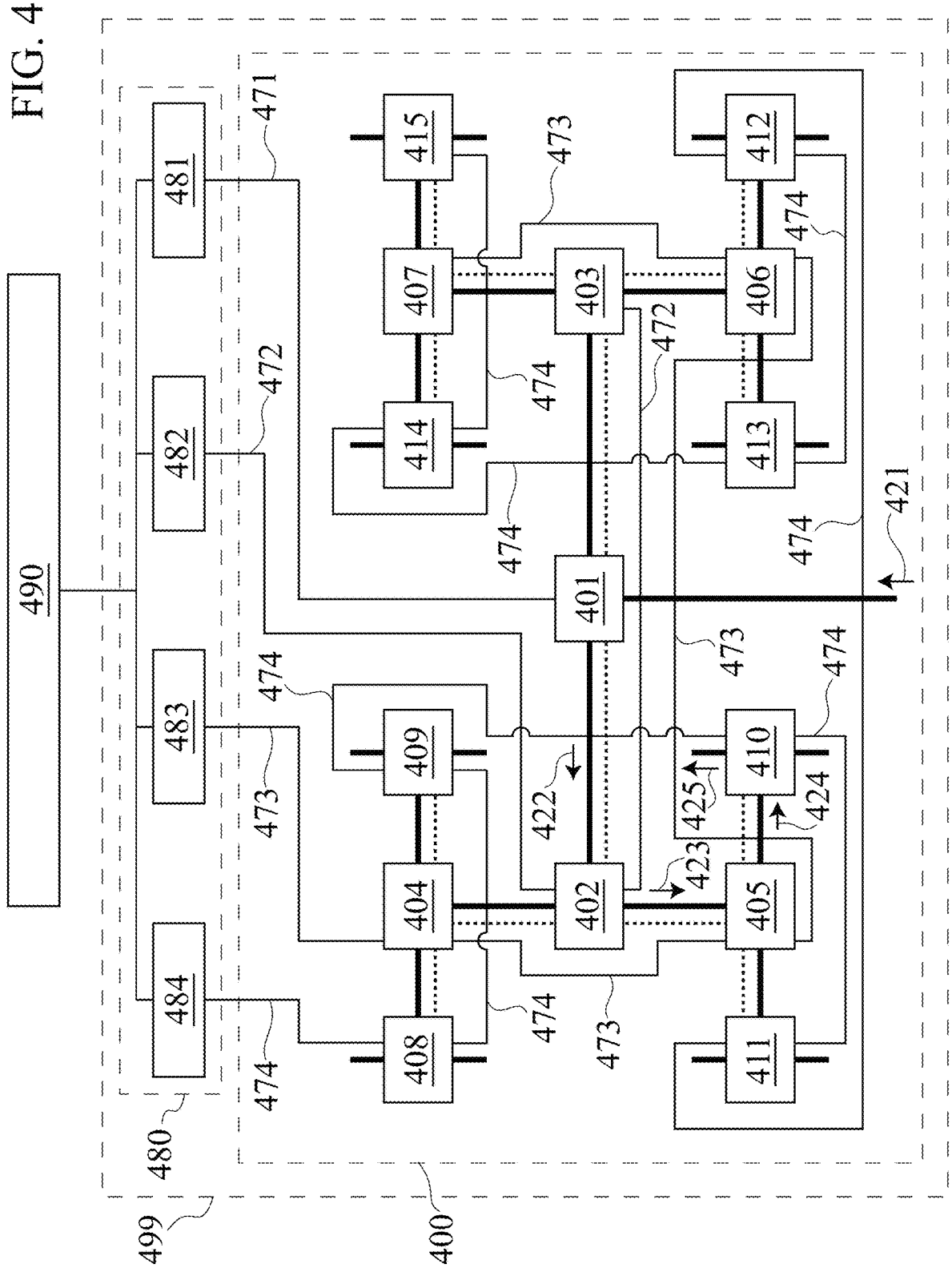
FIG. 4 illustrates an example ORC.

FIG. 4 illustrates an example ORC 499 that includes a photonic network circuit 400 as an H-tree and a node control system 480 with four node controls 481, 482, 483, and 484. The node 401 may be controlled by the node control 481 through an electrical node control channel 471. Nodes 402 and 403 may be controlled by the node control 482 through a shared electrical node control channel 472. Nodes 404, 405, 406, and 407 may be controlled by the node control 483 through a shared electrical node control channel 473. Nodes 408, 409, 410, 411, 412, 413, 414, and 415 may be controlled by the node control 484 through a shared electrical node control channel 474. An ORC controller 490 may determine the operational state of the ORC 499.

In the example of FIG. 4, the node 401 may be activated and remain activated without receiving an electrical activation signal, or may be activated by receiving an electrical activation signal from the node control 481 through the electrical node control channel 471 or from an electrical activation circuit implemented within or outside the node 401. The node 401 may send an electrical ON signal to the node 402 and an electrical OFF signal to the node 403. The node 402 may send an electrical ON signal to the node 405 and an electrical OFF signal to the node 404. The node 405 may send an electrical ON signal to the node 410 and an electrical OFF signal to the node 411. The node 403 may send electrical OFF signals to the nodes 406 and 407. The node 406 may send electrical OFF signals to the nodes 412 and 413. The node 407 may send electrical OFF signals to the nodes 414 and 415. The node 404 may send electrical OFF signals to the nodes 408 and 409. As a result, the nodes 401, 402, 405, and 410 may be activated and controlled by their respective node controls 481, 482, 483, or 484, and the nodes 403, 404, 406, 407, 408, 409, 411, 412, 413, 414, and 415 may be deactivated and not controlled by their respective node controls 482, 483, or 484. Thus, a received optical signal 421 may be routed through the nodes 401, 402, 405, and 410 as optical signals 422, 423, and 424, and be out-coupled from the ORC 499 as an optical signal 425.

Figure 5:
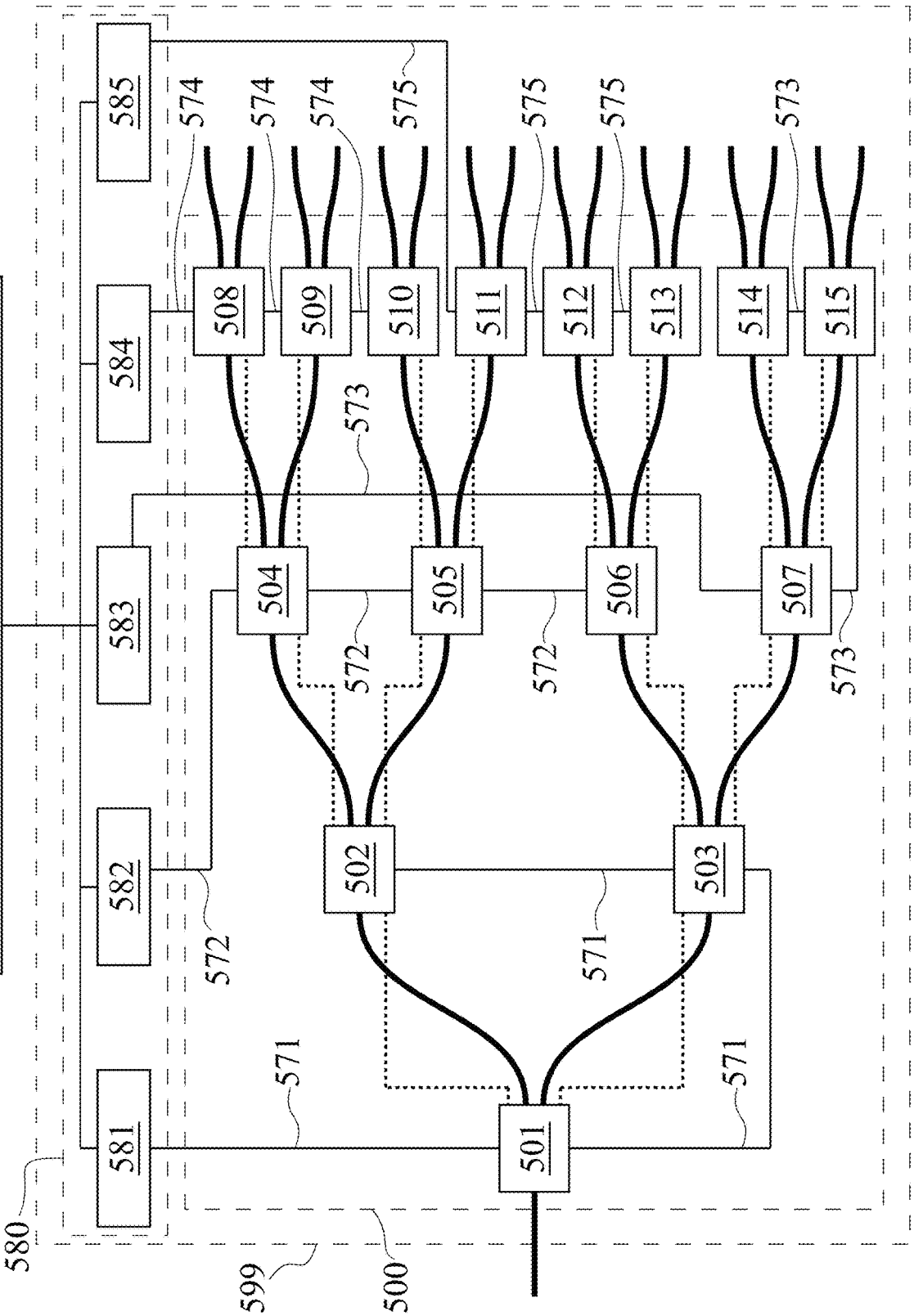
FIG. 5 illustrates an example ORC.

FIG. 5 illustrates an example ORC 599 that includes a photonic network circuit 500 and a node control system 580. The photonic network circuit 500 includes nodes 501, 502, 503, 504, 505, 506, 507, 508, 509, 510, 511, 512, 513, 514, and 515, which are arranged as a 4-level rooted binary tree. An ORC controller 590 may determine the operational state of the ORC 599.

Each subset of the nodes 501, 502, 503, 504, 505, 506, 507, 508, 509, 510, 511, 512, 513, 514, and 515 may share an electrical node control channel. As seen in FIG. 5, the nodes 501, 502 and 503 may be controlled by a node control 581 through a shared electrical node control channel 571. The nodes 504, 505, and 506 may be controlled by a node control 582 through a shared electrical node control channel 572. The nodes 507, 514, and 515 may be controlled by a node control 583 through a shared electrical node control channel 573. The nodes 508, 509, and 510 may be controlled by a node control 584 through a shared electrical node control channel 574. The nodes 511, 512, and 513 may be controlled by a node control 585 through a shared electrical node control channel 575. Thus, each node control 581, 582, 583, 584, or 585 controls a subset of the nodes 501, 502, 503, 504, 505, 506, 507, 508, 509, 510, 511, 512, 513, 514, and 515 from the same or different levels of the tree. As in previous examples, parent nodes may communicate electrical activation signals to child nodes to activate or deactivate the child nodes. For example, the node 501 may communicate electrical activation signals to the nodes 502 and 503. The node 502 may communicate electrical activation signals to the nodes 504 and 505. The node 503 may communicate electrical activation signals to the node 506 and 507. The node 504 may communicate electrical activation signals to the nodes 508 and 509. The node 505 may communicate electrical activation signals to the nodes 510 and 511. The node 506 may communicate electrical activation signals to the nodes 512 and 513. The node 507 may communicate electrical activation signals to the nodes 514 and 515. Activated nodes may be controlled by their respective node controls to route an optical signal. Deactivated nodes may not be controlled by their respective node controls to route an optical signal.

Figure 6:
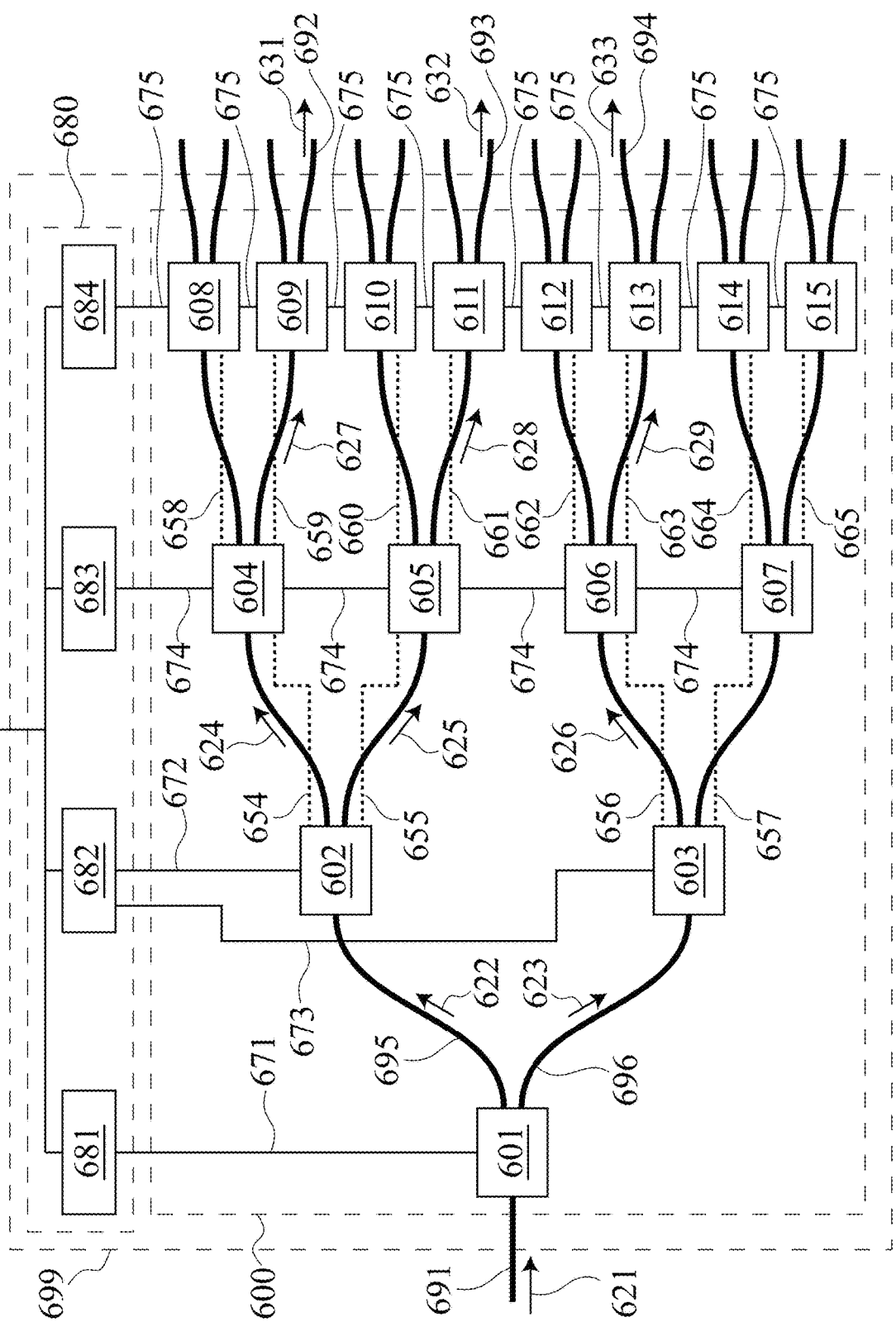
FIG. 6 illustrates an example ORC.

FIG. 6 illustrates an example ORC 699 that includes a photonic network circuit 600 and a node control system 680 with four node controls 681, 682, 683 and 684. The photonic network circuit 600 includes nodes 601, 602, 603, 604, 605, 606, 607, 608, 609, 610, 611, 612, 613, 614, and 615 that are arranged or connected as a 4-level binary tree. The example of FIG. 6 shows that an ORC may split and route an optical signal to multiple outputs. In FIG. 6, an ORC controller 690 may determine the operational state of the ORC 699.

In FIG. 6, the nodes 601, 602, and 603, each of which may form a subset, may be coupled to the node controls 681 and 682 through distinct electrical node control channels 671, 672, and 673 without sharing the electrical node control channels 671, 672, and 673. The nodes 601, 602, and 603 may be activated and remain activated without receiving electrical activation signals. In some instances, one or more of the nodes 601, 602, and 603 may be activated by receiving electrical activation signals from the node control system 680, or from an electrical activation circuit implemented within or outside one or more of the nodes 601, 602, or 603. When the node 601 is activated, the node 601 may be controlled by the node control 681 through the electrical node control channel 671. When the nodes 602 and 603 are activated, the nodes 602 and 603 may be simultaneously and individually controlled by the node control 682.

The nodes 604, 605, 606, and 607 in the second level of the photonic network circuit 600 as a subset may be controlled by the node control 683 through a shared electrical node control channel 674 and may receive electrical activation signals from their respective parent nodes through electrical signal channels 654, 655, 656, and 657. The shared electrical node control channel 674 may allow the node control 683 to simultaneously and individually control a certain number of activated nodes selected from any of the nodes 604, 605, 606, and 607 up to an MSIA group size of the nodes in the second level. Similarly, the nodes 608, 609, 610, 611, 612, 613, 614, and 615 in the third level of the photonic network circuit 600 as another subset may be controlled by the node control 684 through a shared electrical node control channel 675 and may receive electrical activation signals from their respective parent nodes through electrical signal channels 658, 659, 660, 661, 662, 663, 664, and 665. The shared electrical node control channel 675 may allow the node control 684 to simultaneously and individually control a certain number of activated nodes selected from any of the nodes 608, 609, 610, 611, 612, 613, 614, and 615 up to an MSIA group size of the nodes in the third level. The MSIA group sizes allowed by the shared electrical node control channels 674 and 675 may or may not be the same. As an illustration in choosing the MSIA group sizes, consider an example in which the ORC 699 may route an optical signal simultaneously to up to any three of the optical output channels of the ORC 699. In this circumstance, the MSIA group sizes allowed by the shared electrical node control channels 674 and 675 may each be set as three nodes. Then a group of up to three activated nodes may be simultaneously and individually controlled by the node control 683 through the shared electrical node control channel 674, and a group of up to three activated nodes may be simultaneously and individually controlled by the node control 684 through the shared electrical node control channel 675.

An operational state of the ORC 699 may be determined by optical paths chosen to route an optical signal within the photonic network circuit 600 and the fractions of optical outputs designated for each node on the optical paths in accordance with the MSIA group sizes of the subsets of the photonic network circuit 600. In the ORC 699, an optical input channel 691 is the default input channel. Thus, there may be no need to select an optical input channel in determining the operational state.

In an example operation of the ORC 699, optical output channels 692, 693, and 694 may be selected to output optical signals 631, 632, and 633 from the ORC 699. As seen in FIG. 6, three optical paths may be chosen to connect the optical input channel 691 with the optical output channels 692, 693, and 694. The nodes 601, 602, 603, 604, 605, 606, 609, 611, and 613, which are on the optical paths, may be activated and controlled by the node control system 680. The nodes 607, 608, 610, 612, 614, and 615, which are not on the optical paths, may be deactivated. Each of the nodes 601, 602, 603, 604, 605, 606, 609, 611, and 613 may be set to direct fractions of optical signals. As an example, the ORC 699 may be configured to maximize the output optical signals 631, 632, and 633 with even optical power. Thus, the node 601 may split an in-coupled optical signal 621 into optical signals 622 and 623, in which the optical powers of the optical signals 622 and 623 may be proportional to two thirds and one third, respectively, the optical power of the optical signal 621. The optical signal 622 may be out-coupled to the node 602 through an optical signal channel 695 and the optical signal 623 may be out-coupled to the node 603 through an optical signal channel 696. The node 602 may split the received optical signal 622 evenly as optical signals 624 and 625 and out-couple the optical signals 624 and 625 to the nodes 604 and 605, respectively. Each of the nodes 603, 604, 605, 606, 609, 611, and 613 may out-couple a received optical signal maximally to one of its optical out-coupling channels. As a result, an operational state of the ORC 699 may be determined by incorporating the chosen optical paths that include the nodes 601, 602, 603, 604, 605, 606, 609, 611, and 613, and the designated fractions of optical outputs for the nodes 601, 602, 603, 604, 605, 606, 609, 611, and 613 on the optical paths.

The determined operational state of the ORC 699 may be checked (e.g., by the ORC controller 690) against the MSIA group sizes of the nodes in the second and third levels of the photonic network circuit 600 allowed by the shared electrical node control channels 674 and 675 in the example of FIG. 6. If the number of nodes selected to be activated in a subset is larger than the MSIA group size of the subset, the optical paths for the determined operational state may need to be chosen differently or the ORC 699 may need to be operated differently by selecting different optical input channels and/or optical output channels. The ORC controller 690 and/or the node control system 680 may also limit the number of electrical ON signals that may be received by the nodes in a subset to be no greater than the MSIA group size of the subset.

For the example operation of the ORC 699, the determined operational state includes the nodes 604, 605, and 606 to be activated. This may be checked against the example MSIA group size of three nodes allowed by the shared electrical node control channel 674. The subset that includes the nodes 604, 605, 606, and 607 (e.g., the second level of the photonic network circuit 600) may receive up to three electrical ON signals from the parent nodes of the nodes 604, 605, 606, and 607 (e.g., three electrical ON signals from the parent nodes 602 and 603 of the nodes 604, 605, and 606). Similarly, the determined operational state includes the nodes 609, 611, and 613 to be activated. This may be checked against the example MSIA group size of three nodes allowed by the shared electrical node control channel 675. The subset that includes the nodes 608, 609, 610, 611, 612, 613, 614, and 615 (e.g., the third level of the photonic network circuit 600) may receive up to three electrical ON signals from the parent nodes of the nodes 608, 609, 610, 611, 612, 613, 614, and 615 (e.g., three electrical ON signals from the parent nodes 604, 605, and 606 of the nodes 609, 611, and 613).

The photonic network circuit 600 of the ORC 699 may be controlled by the node control system 680 according to the operational state determined by the ORC controller 690. According to the example operation of the ORC 699, the nodes 601, 602, and 603 are activated. Thus, the node control 681 may control, through the electrical node control channel 671, the node 601 to split the received optical signal 621 into the optical signals 622 and 623 according to the designated fractions of optical outputs for the node 601 and to route the optical signals 622 and 623 respectively to the nodes 602 and 603. The node control 682 may control, through the electrical node control channel 672, the node 602 to split the received optical signal 622 into the optical signals 624 and 625 according to the designated fractions of optical outputs for the node 602 and to route the optical signals 624 and 625 respectively to the nodes 604 and 605. The node control 682 may also control, through the electrical node control channel 673, the node 603 to switch the received optical signal 623 as an optical signal 626 to the node 606 and no optical signal to the node 607. In some instances, the node control 682 may also control the nodes 602 and 603 to send electrical ON signals to the nodes 604, 605, and 606 through the electrical signal channels 654, 655, and 656, and an electrical OFF signal to the node 607 through the electrical signal channel 657. In other instances, the node control 682 may send electrical ON signals to the nodes 604, 605, and 606 through the electrical signal channels 654, 655, and 656, and an electrical OFF signal to the node 607 through the electrical signal channel 657, in which the electrical signal channels 654 and 655 may be coupled to the node control 682 directly through the electrical node control channel 672 and the electrical signal channels 656 and 657 may be coupled to the node control 682 directly through the electrical node control channel 673. The ORC controller 690 and/or the node control 682 may limit the total number of electrical ON signals that may be sent by the nodes 602 and 603, and/or received by the nodes 604, 605, 606, and 607, to be no more than the MSIA group size number (e.g., three) allowed by the shared electrical node control channels 674. The nodes 604, 605, and 606 may be activated and thus be controlled by the node control 683 through the shared electrical node control channel 674. The node 607 may be deactivated and thus may not be controlled by the node control 683. The node control 683 may simultaneously and individually control the nodes 604, 605, and 606 to route optical signals 627, 628, and 629 respectively to the nodes 609, 611, and 613. The node control 683 may also control the nodes 604, 605, and 606 to send electrical ON signals to the nodes 609, 611, and 613 through the electrical signal channels 659, 661, and 663, and electrical OFF signals to the nodes 608, 610, and 612 through the electrical signal channels 658, 660, and 662. The ORC controller 690 and/or the node control 683 may limit the total number of electrical ON signals that may be sent by the nodes 604, 605, and 606 to be no more than the MSIA group size number (e.g., three) allowed by the shared electrical node control channels 675. Additionally, with the node 607 being deactivated, the node 607 may send electrical OFF signals to the nodes 614 and 615 through the electrical signal channels 664 and 665. The nodes 609, 611, and 613 may be activated and thus be controlled by the node control 684 through the shared electrical node control channel 675. The nodes 608, 610, 612, 614, and 615 may be deactivated and thus may not be controlled by the node control 684. The node control 684 may control simultaneously and individually the nodes 609, 611, and 613 to route the received optical signals 627, 628, and 629 respectively through the optical output channels 692, 693, and 694 as the optical signals 631, 632, and 633. No electrical activation signals may need to be output from the nodes 608, 609, 610, 611, 612, 613, 614, and 615.

Figure 7:
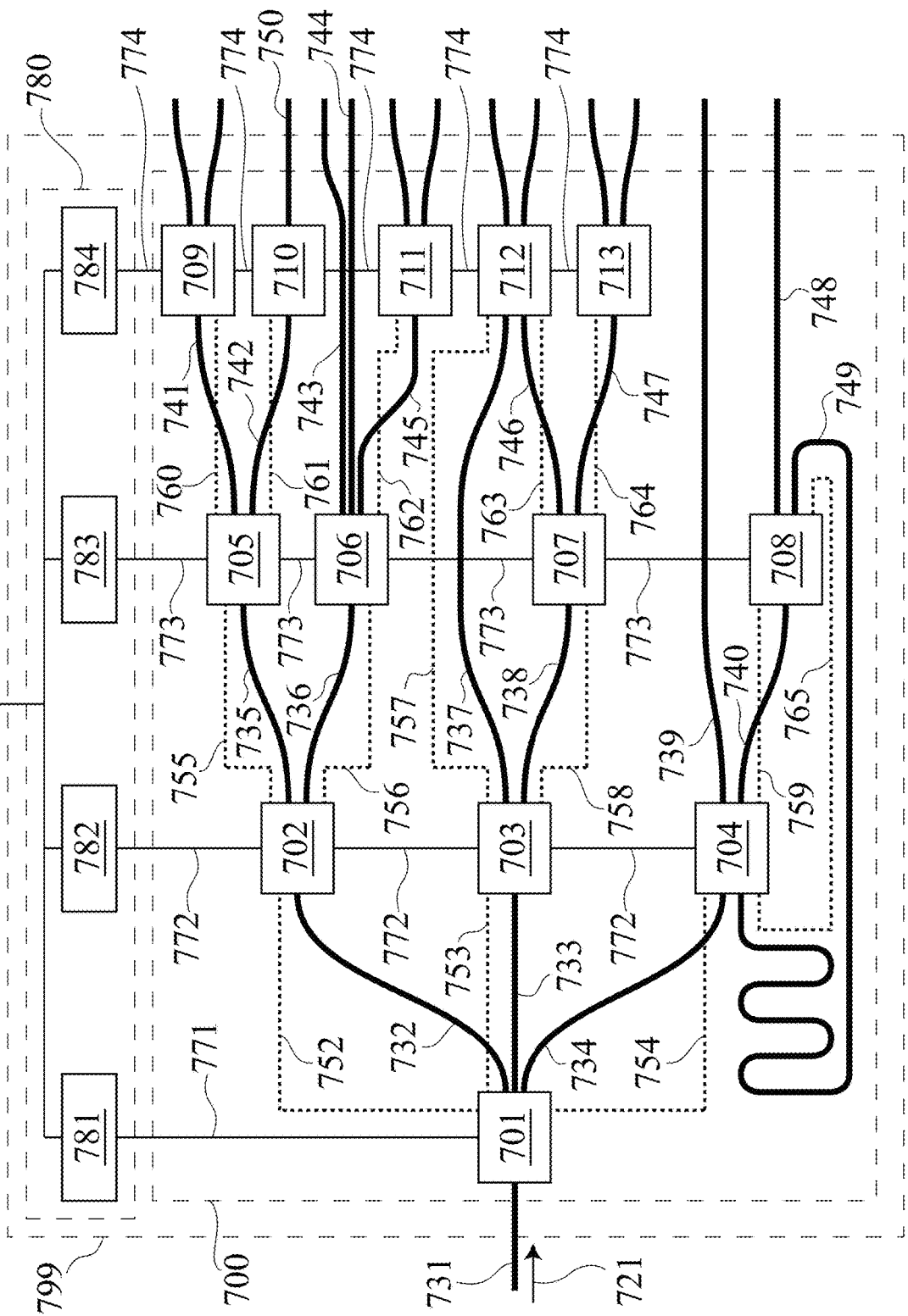
FIG. 7 illustrates an example ORC.

FIG. 7 illustrates an example ORC 799 that includes a photonic network circuit 700 and a node control system 780 with four node controls 781, 782, 783 and 784. The photonic network circuit 700 includes nodes 701, 702, 703, 704, 705, 706, 707, 708, 709, 710, 711, 712, and 713, optical signal channels 732, 733, 734, 735, 736, 737, 738, 739, 740, 741, 742, 743, 744, 745, 746, 747, and 749 that may be optically coupled to the nodes 701, 702, 703, 704, 705, 706, 707, 708, 709, 710, 711, 712, and 713, and electrical signal channels 752, 753, 754, 755, 756, 757, 758, 759, 760, 761, 762, 763, 764, and 765 that may be electrically coupled to the nodes 701, 702, 703, 704, 705, 706, 707, 708, 709, 710, 711, 712, and 713. The node 701 is an input node that is optically coupled to an optical input channel 731 for inputting an optical signal 721 to the photonic network circuit 700, and the nodes 704, 706, 709, 710, 711, 712, and 713 are output nodes, each of which is optically coupled to at least one optical output channel for out-coupling an optical signal from the photonic network circuit 700. The node 701 may be controlled by the node control 781 through an electrical node control channel 771. The nodes 702, 703, and 704 may be controlled by the node control 782 through a shared electrical node control channel 772. The nodes 705, 706, 707, and 708 may be controlled by the node control 783 through a shared electrical node control channel 773. The nodes 709, 710, 711, 712, and 713 may be controlled by the node control 784 through a shared electrical node control channel 774. An ORC controller 790 may determine the operational state of the ORC 799.

Each of the nodes 701, 702, 703, 705, 706, 707, 708, 709, 710, 711, and 713 is optically coupled to an optical in-coupling channel, and each of the nodes 704 and 712 is optically coupled to two optical in-coupling channels. For example, the node 701 is an input node which may receive the optical signal 721 through the optical input channel 731. The node 702 may receive an optical signal from the node 701 through the optical signal channel 732. The node 704 may receive an optical signal from either or both of the nodes 701 and 708 through the optical signal channels 734 and 749.

The node 710 is optically coupled to one optical out-coupling channel. Each of the nodes 702, 703, 704, 705, 707, 708, 709, 711, 712, and 713 is optically coupled to two optical out-coupling channels, and each of the nodes 701 and 706 is optically coupled to three optical out-coupling channels. For example, the node 710 is optically coupled to an optical output channel 750 for out-coupling an optical signal from the photonic network circuit 700. The node 703 may route an optical signal to any of the nodes 707 and 712 through the optical signal channels 738 and 737. The node 708 may out-couple an optical signal from the photonic network circuit 700 through an optical output channel 748 and/or route an optical signal to the node 704 through the optical signal channel 749. The node 701 may route an optical signal to any of the nodes 702, 703, and 704 through the optical signal channels 732, 733 and 734. The node 706 may out-couple an optical signal from the photonic network circuit 700 through any of optical output channels 743 and 744 and/or route an optical signal to the node 711 through the optical signal channel 745.

A node in the photonic network circuit 700 which has a parent node may receive an electrical activation signal from its parent node through an electrical signal channel. For example, the node 702 may receive an electrical activation signal from the node 701 through the electrical signal channel 752. The node 704 may receive an electrical activation signal from the nodes 701 and 708 through the electrical signal channels 754 and 765. The node 708 may receive an electrical activation signal from the node 704 through the electrical signal channel 759. The node 712 may receive an electrical activation signal from the nodes 703 and 707 through the electrical signal channels 757 and 763. The nodes 704 and 708 may be a parent node and a child node of each other, simultaneously or at different times, depending on the operation of the ORC 799.

In some embodiments, the photonic network circuit may include components that may have a function other than routing optical signals. For example, in the photonic network circuit 700, the optical signal channel 749 may function as an optical delay line in addition to coupling an optical signal between the nodes 708 and 704.

Figure 8:
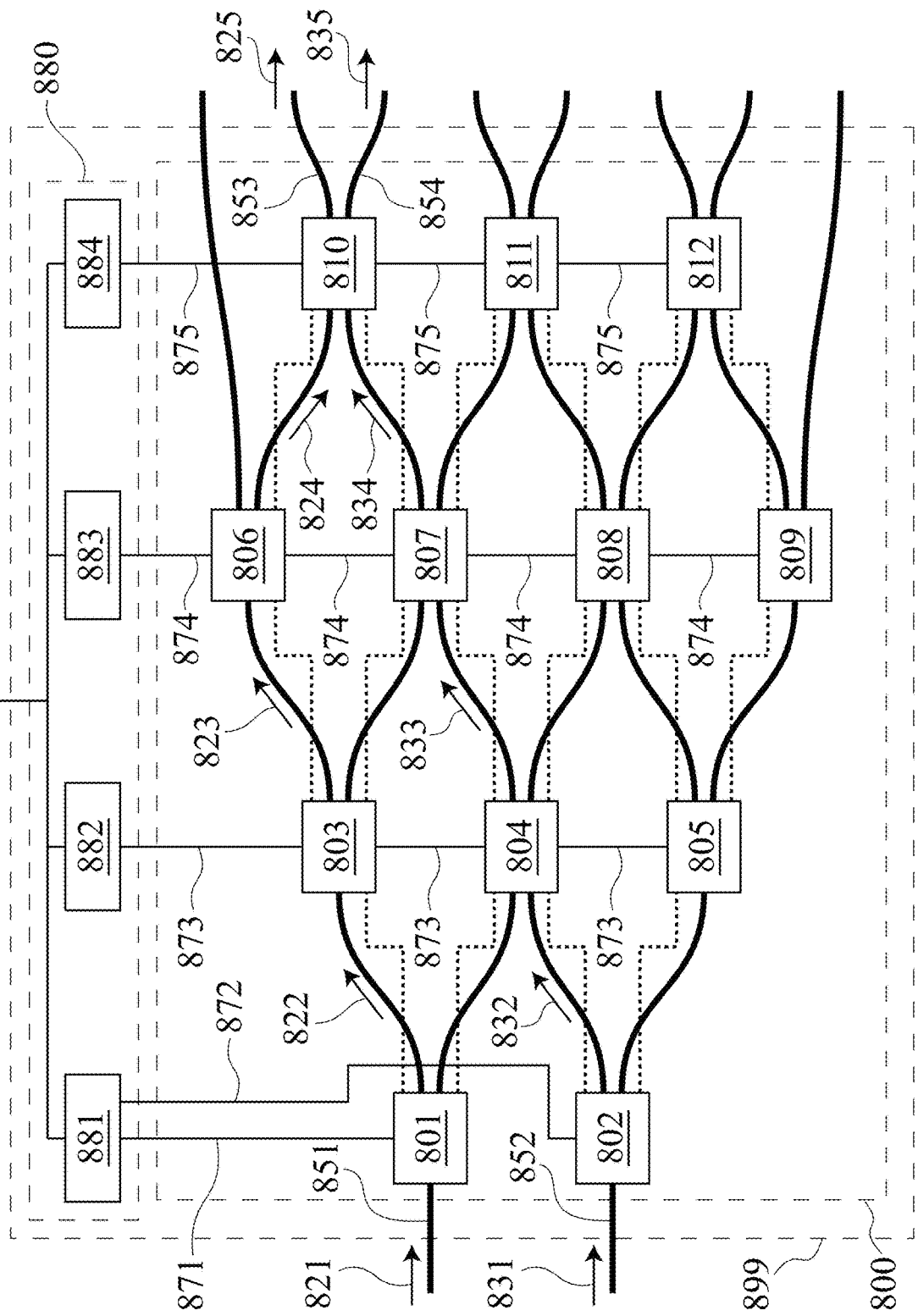
FIG. 8 illustrates an example ORC.

FIG. 8 illustrates an example ORC 899 that includes a photonic network circuit 800 and a node control system 880 with four node controls 881, 882, 883, and 884. An optical signal 821 may be input to a node 801, and an optical signal 831 may be input to a node 802. In the photonic network circuit 800, a node that has a parent node may receive an electrical activation signal from the parent node through an electrical signal channel. The nodes 801 and 802 may be activated and remain activated without receiving an electrical activation signal. In some instances, the nodes 801 and/or 802 may be activated by receiving an electrical activation signal from the node control system 880, or from an electrical activation circuit implement within or outside the nodes 801 and/or 802. When the node 801 is activated, the node 801 may be controlled by the node control 881 through an electrical node control channel 871. When the node 802 is activated, the node 802 may be controlled by the node control 881 through an electrical node control channel 872. Thus, the node control 881 may simultaneously and individually control the nodes 801 and 802 through the two distinct electrical node control channels 871 and 872. Nodes 803, 804, and 805 may be controlled by the node control 882 through a shared electrical node control channel 873. Nodes 806, 807, 808, and 809 may be controlled by the node control 883 through a shared electrical node control channel 874. Nodes 810, 811, and 812 may be controlled by the node control 884 through a shared electrical node control channel 875. An ORC controller 890 may determine the operational state of the ORC 899.

The shared electrical node control channel 873 may allow the node control 882 to simultaneously and individually control a certain number of activated nodes selected from any of the nodes 803, 804, and 805 up to an MSIA group size. The shared electrical node control channel 874 may allow the node control 883 to simultaneously and individually control a certain number of activated nodes selected from any of the nodes 806, 807, 808, and 809 up to another MSIA group size. The shared electrical node control channel 875 may allow the node control 884 to simultaneously and individually control a certain number of activated nodes selected from any of the nodes 810, 811, and 812 up to a further MSIA group size. The MSIA group sizes of activated nodes allowed by the shared electrical node control channels 873, 874, and 875 may or may not be the same. For example, the MSIA group sizes allowed by the shared electrical node control channels 873, 874, and 875 may each be set as two nodes. Then a group of up to two activated nodes may be simultaneously and individually controlled by the node control 882 through the shared electrical node control channel 873, a group of up to two activated nodes may be simultaneously and individually controlled by the node control 883 through the shared electrical node control channel 874, and a group of up to two activated nodes may be simultaneously and individually controlled by the node control 884 through the shared electrical node control channel 875.

In an example operation of the ORC 899, optical output channels 853 and 854 may be selected to output optical signals 825 and 835 from the ORC 899. Additionally, optical input channels 851 and 852 may be selected to input the optical signals 821 and 831 to the ORC 899. Similar to the ORC 699, based on the selected optical input and output channels, an operational state of the ORC 899 may be determined by choosing optical paths in the photonic network circuit 800 that, according to the example of FIG. 8, includes the nodes 801, 802, 803, 804, 806, 807, and 810, and designating fractions of optical outputs for the nodes 801, 802, 803, 804, 806, 807, and 810 on the optical paths. The operational state may additionally be checked against the MSIA group sizes of the subsets in the photonic network circuit 800.

The photonic network circuit 800 may be configured by the node control system 880 according to the operational state by activating and controlling the nodes on the optical paths and deactivating the nodes not on the optical paths. According to the example operation, the nodes 801 and 802 may be simultaneously and individually controlled by the node control 881 through the electrical node control channels 871 and 872. The nodes 803 and 804 may be activated by receiving electrical ON signals from their respective parent nodes and thus be controlled by the node control 882 through the shared electrical node control channel 873. The nodes 806 and 807 may be activated by receiving electrical ON signals from their respective parent nodes and thus be controlled by the node control 883 through the shared electrical node control channel 874. The node 810 may be activated by receiving electrical ON signals from its parent nodes and thus be controlled by the node control 884 through the shared electrical node control channel 875. The nodes 805, 808, 809, 811, and 812 may be deactivated by receiving electrical OFF signals from their respective parent nodes. The optical signal 821 may be routed, as optical signals 822, 823, and 824, through an optical path joining the nodes 801, 803, 806, and 810. The optical signal 831 may be routed, as optical signals 832, 833, and 834, through an optical path joining the nodes 802, 804, 807, and 810. The node 810 may receive the optical signals 824 and 834 and out-couple the received optical signals as the optical signals 825 and 835 from the ORC 899.

Figure 9:
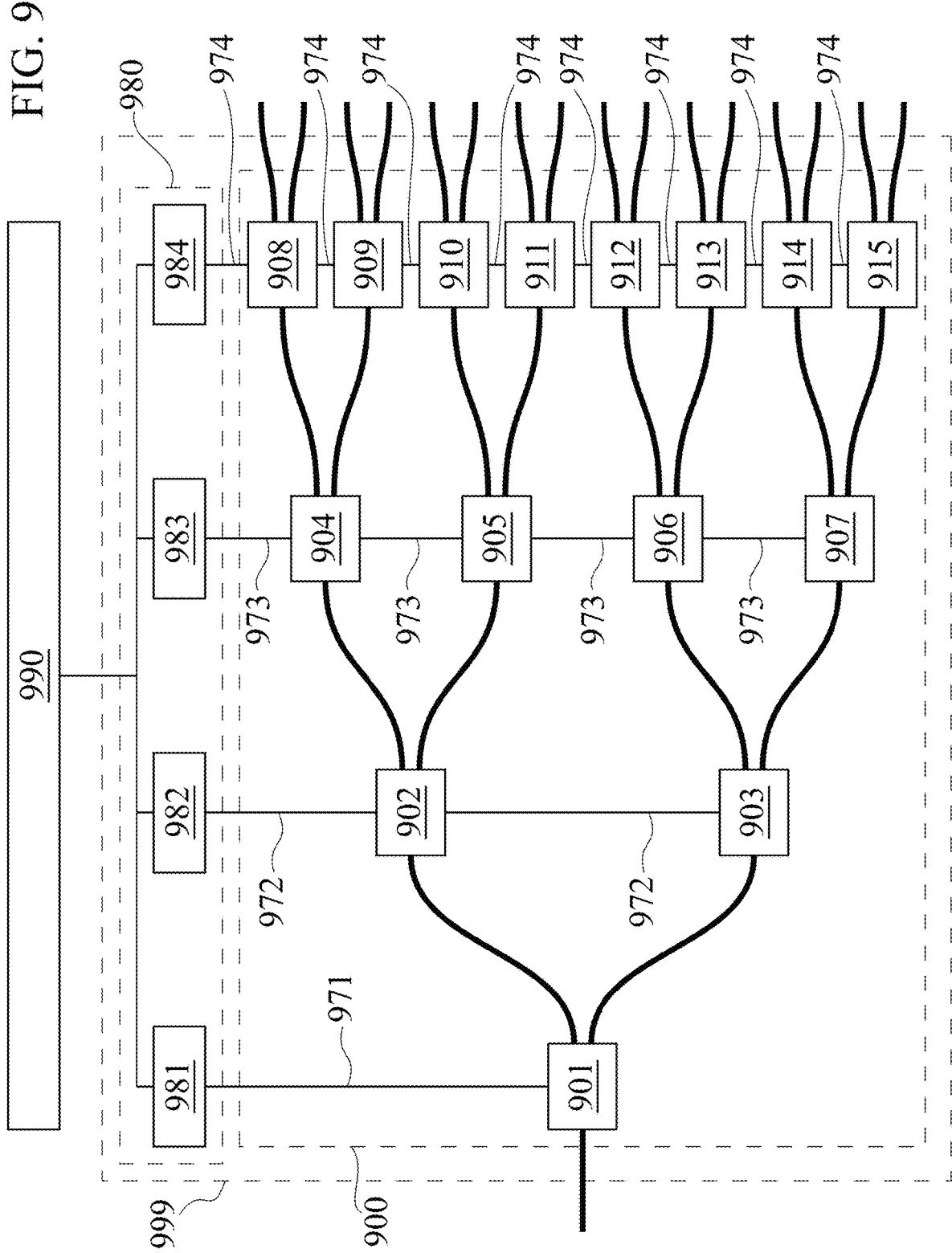
FIG. 9 illustrates an example ORC.

FIGS. 3, 4, 5, 6, 7, and 8 illustrate example ORCs in which nodes may be controlled using shared electrical node control channels. The nodes may be activated (allowing control by node controls through the shared electrical node control channels) or deactivated (disabling control by node controls through the shared electrical node control channels) through electrical activation signals received from parent nodes. In some instances, a node may instead be directly activated by receiving an electrical activation signal from a node control system of the ORC. FIG. 9 illustrates an example ORC 999 in which the activation of a node may be accomplished by directly receiving an electrical activation signal from a node control. The ORC 999 includes a photonic network circuit 900 in the form of a 4-level binary tree and a node control system 980 with four node controls 981, 982, 983, and 984. An ORC controller 990 may determine the operational state of the ORC 999. A node 901 is electrically coupled to the node control 981 through an electrical node control channel 971. Nodes 902 and 903 are electrically coupled to a node control 982 through a shared electrical node control channel 972. Nodes 904, 905, 906, and 907 are electrically coupled to the node control 983 through a shared electrical node control channel 973. Nodes 908, 909, 910, 911, 912, 913, 914, and 915 are electrically coupled to the node control 984 through a shared electrical node control channel 974. Each of the nodes 902, 903, 904, 905, 906, 907, 908, 909, 910, 911, 912, 913, 914, and 915 may be activated by receiving an electrical activation signal from a respective node control through a respective shared electrical node control channel. The node 901 may be activated and remain activated without receiving an electrical activation signal, or be activated by receiving an electrical activation signal from the node control 981. Additionally, a node in the photonic network circuit 900 may not need to send an electrical activation signal to a child node of the node.

The ORC 999 may achieve a simpler interface between the photonic network circuit 900 and the node control system 980 by sharing electrical node control channels among more than one node in the photonic network circuit 900. Each of the shared electrical node control channels 972, 973, and 974 may allow a node control to simultaneously and individually control a certain number of activated nodes up to an MSIA group size. FIG. 16A illustrates an example node 1610 that may receive an electrical activation signal from a node control for the activation of the node through a shared electrical node control channel, in which the shared electrical node control channel may allow an MSIA group size of three nodes. The node 1610 may be used in the ORC 999 and is described later in this disclosure.

According to some embodiments, a clock signal may be used to synchronize the operations of the ORC. A node of a photonic network circuit of the ORC may receive a clock signal from a node control system of the ORC.

FIGS. 10A-D illustrate block diagrams of four nodes which may be used to construct the ORC of the present disclosure. FIGS. 11A-E, 12, 13A, and 16A illustrate embodiments of implementations of the four nodes.

Figure 10A:
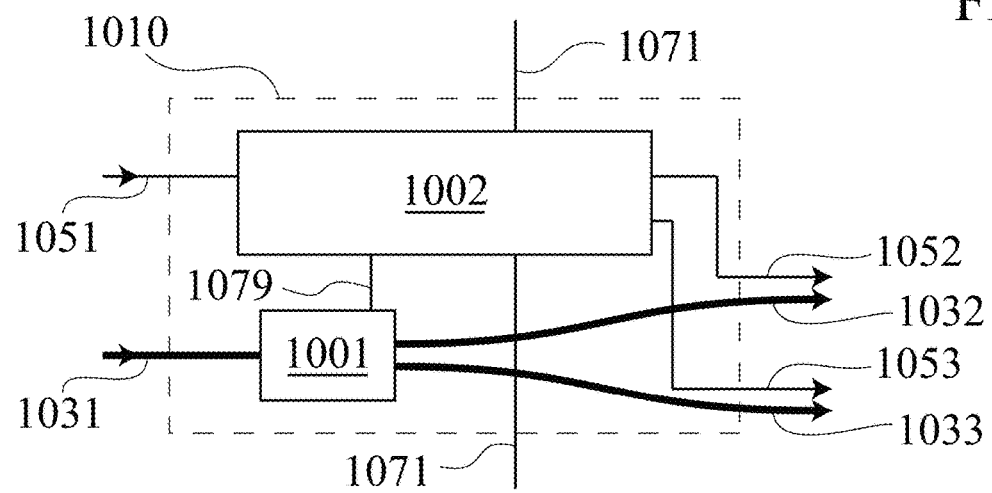
FIGS. 10A, 10B, 10C, and 10D illustrate example nodes.

FIG. 10A illustrates a block diagram of a node 1010 that may be included in an ORC of the present disclosure. The node 1010 includes a node optical unit 1001 and a node electronic unit 1002. The node optical unit 1001 is optically coupled to an optical in-coupling channel 1031 and optical out-coupling channels 1032 and 1033. The node electronic unit 1002 is electrically coupled to an electrical signal channel 1051 for receiving an electrical activation signal and electrical signal channels 1052 and 1053 for sending out electrical activation signals. The node 1010 may be coupled to other numbers of optical in-coupling and out-coupling channels and other numbers of electrical signal channels for receiving and sending out electrical activation signals. The node 1010 may be controlled by a node control through an electrical node control channel 1071 when the node 1010 is activated. The node 1010 may be activated or deactivated by receiving an electrical activation signal over the electrical signal channel 1051. The node 1010 may route an optical signal received over the optical in-coupling channel 1031 to the optical out-coupling channels 1032 and/or 1033. The node 1010 may send electrical activation signals over the electrical signal channels 1052 and/or 1053. The node 1010 or a modified node 1010 coupled to other numbers of optical and electrical signal channels may be used as the node 302, 303, 304, 305, 306, or 307 in FIG. 3, the node 402, 403, 404, 405, 406, or 407 in FIG. 4, the node 502, 503, 504, 505, 506, or 507 in FIG. 5, the node 604, 605, 606, or 607 in FIG. 6, the node 702, 703, 704, 705, 706, 707, or 708 in FIG. 7, or the node 803, 804, 805, 806, 807, 808, or 809 in FIG. 8.

Figure 10B:
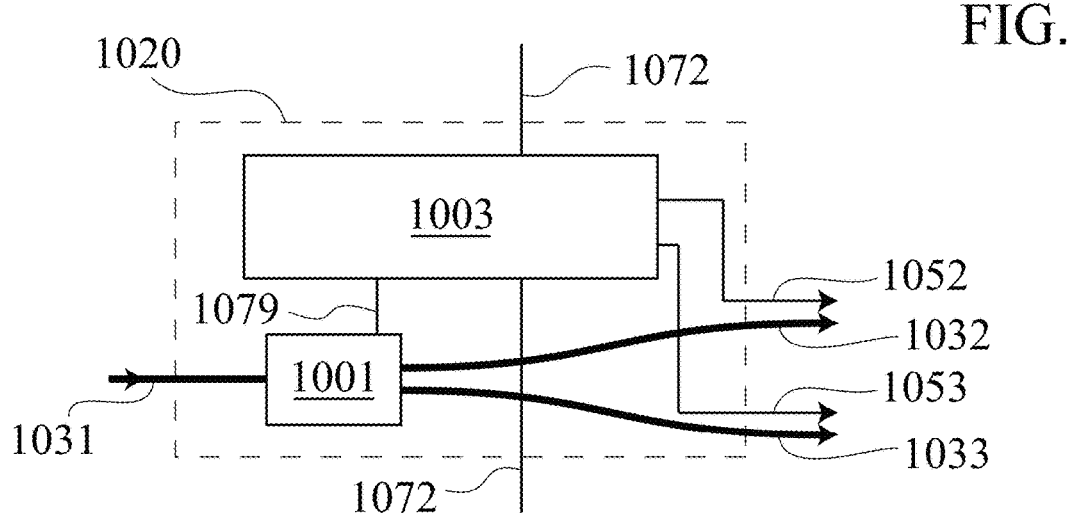

FIG. 10B illustrates a block diagram of a node 1020 that may be included in an ORC of the present disclosure. The node 1020 includes the node optical unit 1001 and a node electronic unit 1003. The node optical unit 1001 is optically coupled to the optical in-coupling channel 1031 and the optical out-coupling channels 1032 and 1033. The node electronic unit 1003 is electrically coupled to the electrical signal channels 1052 and 1053 for sending out electrical activation signals. The node 1020 may be coupled to other numbers of optical in-coupling and out-coupling channels and other numbers of electrical signal channels for sending out electrical activation signals. The node 1020 may be controlled by a node control through an electrical node control channel 1072 when the node 1020 is activated. In some instances, the node 1020 may be implemented to be activated and remain activated without receiving an electrical activation signal. In other instances, the node 1020 may be implemented to be activated or deactivated by receiving an electrical activation signal from the node control system, and the node 1020 may receive the electrical activation signal through the electrical node control channel 1072. In further instances, the node 1020 may be implemented to be activated or deactivated by receiving an electrical activation signal from an electrical activation circuit that may be implemented within or outside the node 1020. The node 1020 may route an optical signal received over the optical in-coupling channel 1031 to the optical out-coupling channels 1032 and/or 1033. The node 1020 may send electrical activation signals over the electrical signal channels 1052 and/or 1053. The node 1020 or a modified node 1020 coupled to other numbers of optical and electrical signal channels may be used as the node 301 in FIG. 3, the node 401 in FIG. 4, the node 501 in FIG. 5, the node 602 or 603 in FIG. 6, the node 701 in FIG. 7, or the node 801 or 802 in FIG. 8.

Figure 10C:
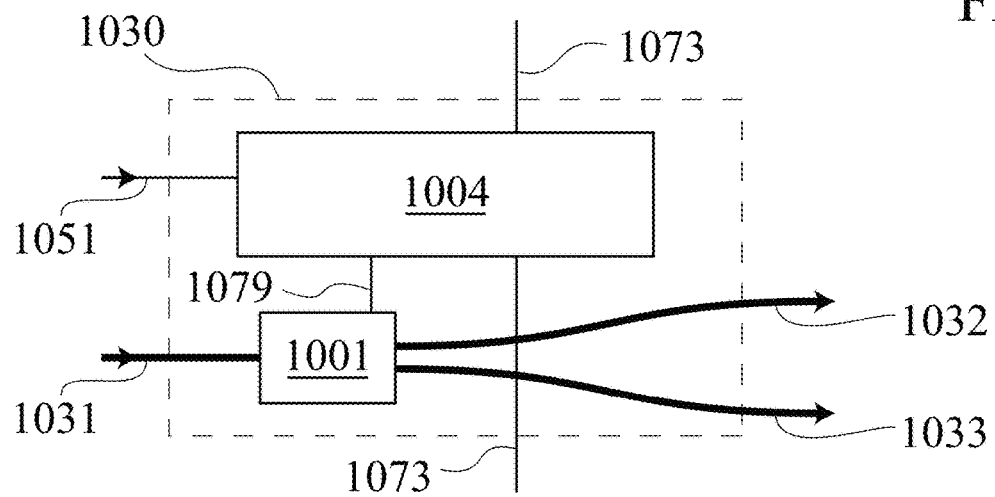

FIG. 10C illustrates a block diagram of a node 1030 that may be included in an ORC of the present disclosure. The node 1030 includes the node optical unit 1001 and a node electronic unit 1004. The node optical unit 1001 is optically coupled to the optical in-coupling channel 1031 and the optical out-coupling channels 1032 and 1033. The node electronic unit 1004 is electrically coupled to the electrical signal channel 1051 for receiving an electrical activation signal. The node 1030 may be coupled to other numbers of optical in-coupling and out-coupling channels and other number of electrical signal channels for receiving electrical activation signals. The node 1030 may be controlled by a node control through an electrical node control channel 1073 when the node 1030 is activated. The node 1030 may be activated or deactivated by receiving an electrical activation signal over the electrical signal channel 1051. The node 1030 may route an optical signal received over the optical in-coupling channel 1031 to the optical out-coupling channels 1032 and/or 1033. The node 1030 may not send out an electrical activation signal. The node 1030 or a modified node 1030 coupled to other numbers of optical and electrical signal channels may be used as the node 308, 309, 310, 311, 312, 313, 314, or 315 in FIG. 3, the node 408, 409, 410, 411, 412, 413, 414, or 415 in FIG. 4, the node 508, 509, 510, 511, 512, 513, 514, or 515 in FIG. 5, the node 608, 609, 610, 611, 612, 613, 614, or 615 in FIG. 6, the node 709, 710, 711, 712, or 713 in FIG. 7, or the node 810, 811, or 812 in FIG. 8.

Figure 10D:
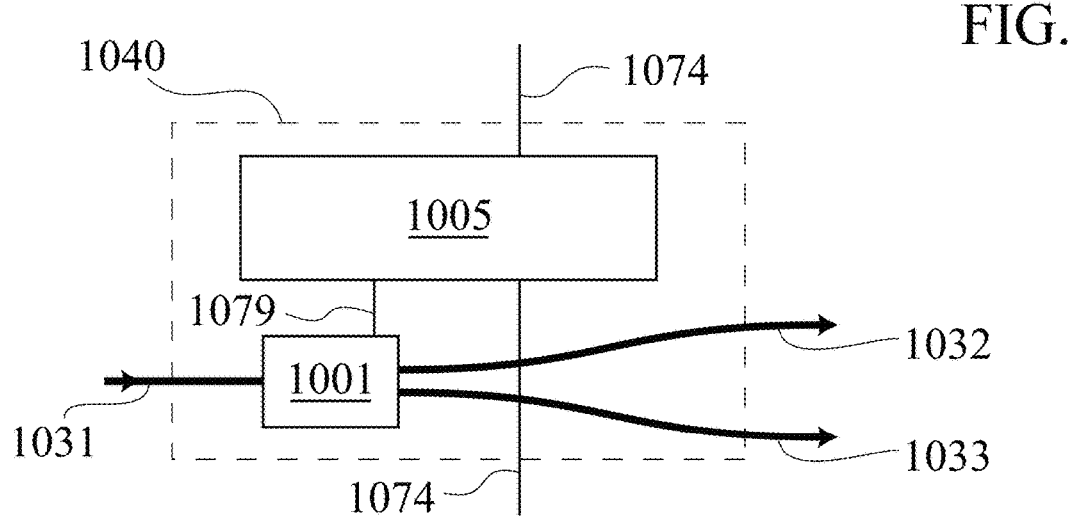

FIG. 10D illustrates a block diagram of a node 1040 that may be included in an ORC of the present disclosure. The node 1040 includes the node optical unit 1001 and a node electronic unit 1005. The node optical unit 1001 is optically coupled to the optical in-coupling channel 1031 and the optical out-coupling channels 1032 and 1033. The node 1040 may be coupled to other numbers of optical in-coupling and out-coupling channels. The node 1040 may be controlled by a node control through an electrical node control channel 1074 when the node 1040 is activated. In some instances, the node 1040 may be implemented to be activated and remain activated without receiving an electrical activation signal. In other instances, the node 1040 may be implemented to be activated or deactivated by receiving an electrical activation signal from the node control system, and the node 1040 may receive the electrical activation signal through the electrical node control channel 1074. In further instances, the node 1040 may be implemented to be activated or deactivated by receiving an electrical activation signal from an electrical activation circuit that may be implemented within or outside the node 1040. The node

1040 may route an optical signal received over the optical in-coupling channel 1031 to the optical out-coupling channels 1032 and/or 1033. The node 1040 may not send out an electrical activation signal. The node 1040 or a modified node 1040 coupled to other numbers of optical signal channels may be used as the node 201, 202, 203, 204, 205, 206, 207, 208, 209, 210, 211, 212, 213, 214, or 215 in FIG. 2, the node 601 in FIG. 6, or the node 901, 902, 903, 904, 905, 906, 907, 908, 909, 910, 911, 912, 913, 914, or 915 in FIG. 9.

The node optical unit 1001 may carry out tasks related to the photonic aspects of a node, such as but not limited to the routing of optical signals. The node electronic unit 1002, 1003, 1004, or 1005 may carry out tasks related to the electrical aspects of a node, such as but not limited to the activation of the node. The electrical node control channels 1071, 1072, 1073, and 1074 to which the node electronic units 1002, 1003, 1004, and 1005 couple may or may not be the same. The node optical unit and the node electronic unit of a node may be implemented on the same platform (e.g., a monolithic EPIC chip) or on distinct platforms (e.g., a configuration in which the node optical unit may be implemented on a PIC chip and the node electronic unit may be implemented on an EIC chip, with the PIC chip and EIC chip coupled to each other by means of 2.5D or 3D electronic-photonic integration).

Figure 14A:
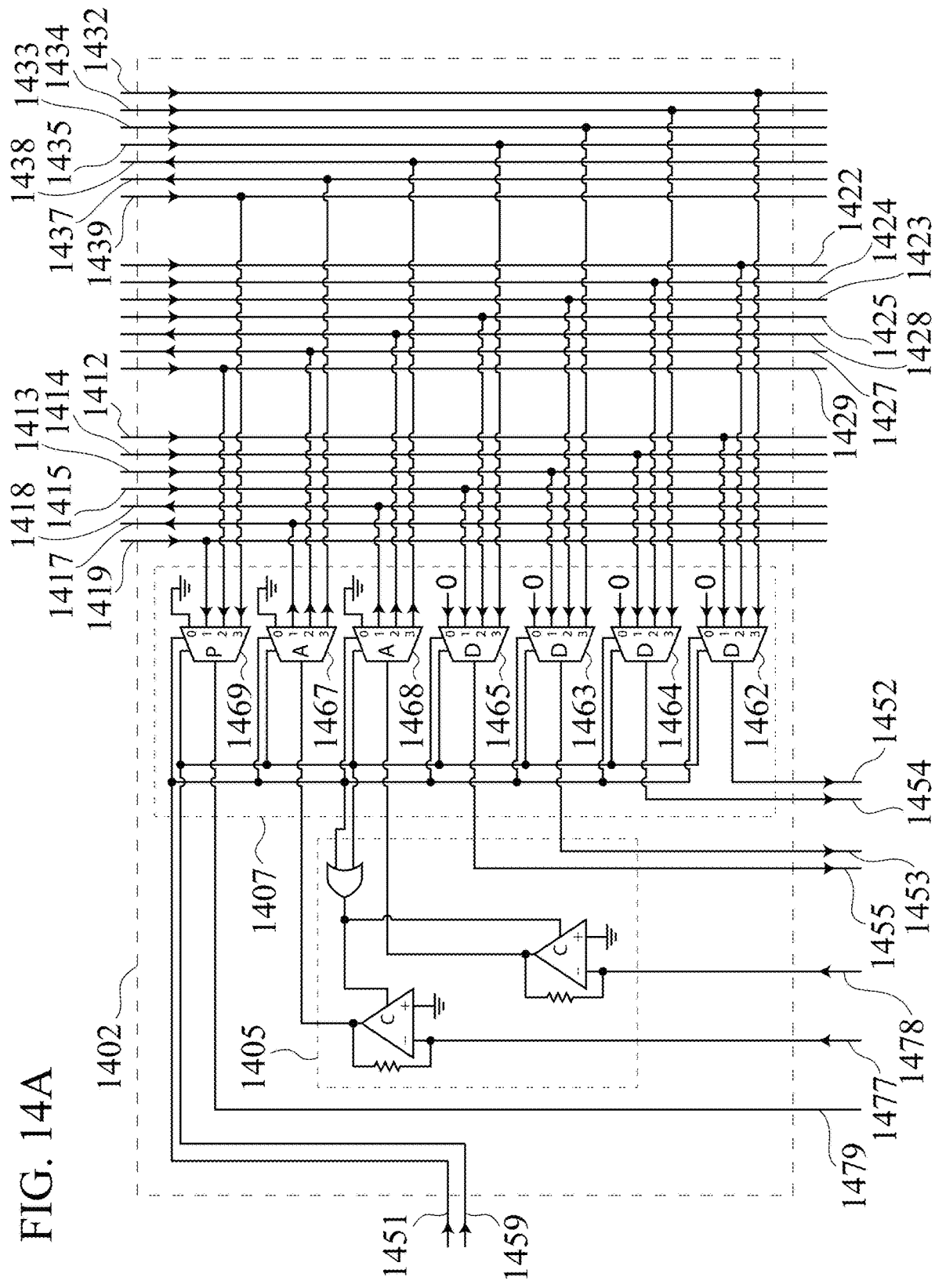
FIGS. 14A, 14B, and 14C illustrate example node electronic units.

The activation of a node may be carried out with an electrical activation signal represented by a logic signal. An ON state of an electrical activation signal may be represented by a logical HIGH that may exceed a certain voltage (e.g., 2.5V). An OFF state of an electrical activation signal may be represented by a logical LOW that may be below a certain voltage (e.g., 0.5V). An example node 1110 in which the activation may be carried out with a logic signal is illustrated in FIG. 11A. In other instances, the activation of a node may be carried out with an electrical activation signal represented by a signal other than a logic signal. Examples of such an electrical activation signal may include, but are not limited to, an encoded signal with some encodings representing ON states and other encodings representing OFF states. An example node electronic unit 1402 for a node in which the activation may be carried out with an encoded signal is illustrated in FIG. 14A.

As exemplified by the node 1010 in FIG. 10A and the node 1030 in FIG. 10C, the node electronic unit of a node may be coupled to one or more electrical signal channels for receiving electrical activation signals. A node may be activated when the node electronic unit of the node receives an electrical ON signal over any of the electrical signal channels. The node may be deactivated when the node electronic unit receives an electrical OFF signal over each of the electrical signal channels. The electrical activation signal received by the node may be sent from a parent node of the node. In some instances, the electrical activation signal received by the node may be sent directly from a node control system.

As exemplified by the node 1020 in FIG. 10B and the node 1040 in FIG. 10D, the node electronic unit of a node may receive an electrical activation signal from a node control system of the ORC, and the electrical activation signal may be received by the node through an electrical node control channel. In some instances, the node electronic unit may receive an electrical activation signal from an electrical activation circuit implemented within or outside the node. In some instances, a node may be activated and remain activated without receiving an electrical activation signal, which may be accomplished through a configuration of the node electronic unit in the node.

In some instances, a node may be deactivated and remain deactivated by default until the node electronic unit of the node receives an electrical ON signal that activates the node.

When a node is activated, the node electronic unit of the activated node may allow a node control to control the node optical unit of the node. When a node is deactivated, the node electronic unit of the deactivated node may disable the control of the node optical unit by the node control. As exemplified by the node 1010 in FIG. 10A and the node 1020 in FIG. 10B, the node electronic unit may additionally send out electrical activation signals. The states of the electrical activation signals sent out may be controlled or determined by the node control when the node is activated. The states of the electrical activation signals sent out may be determined, either entirely or partially, by an electrical control signal sent by the node control and received by the activated node. The electrical control signal may be transmitted from the node control to the activated node through an electrical node control channel. Each of the electrical activation signals sent out may be an OFF state when the node is deactivated. The node electronic unit of a node of the ORC may be coupled to one or more electrical signal channels for sending out electrical activation signals from the node. The electrical activation signal sent out by the node may be received by a child node of the node. As exemplified by the node 1030 in FIG. 10C and the node 1040 in FIG. 10D, the node electronic unit of a node may not send out an electrical activation signal, whether the node is activated or deactivated.

The node electronic unit of a node may perform additional tasks such as, but not limited to, sending out an electrical feedback signal. Examples of an electrical feedback signal may include, but are not limited to, an electrical monitoring signal output from a photodetector of the node optical unit of the node and an acknowledgment (ACK) signal. A node control may receive an electrical feedback signal from the node electronic unit of a node through an electrical node control channel.

Figure 12:
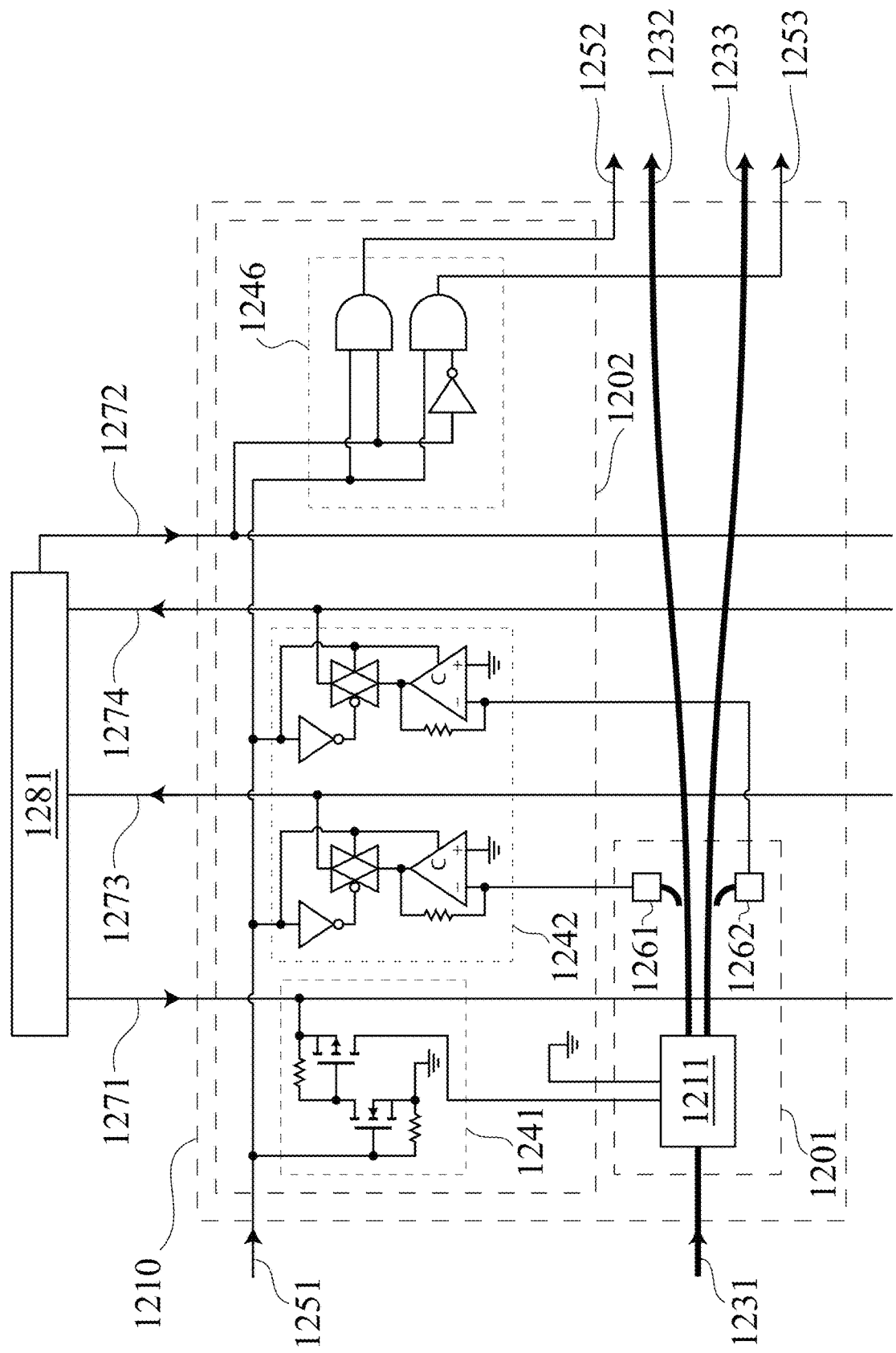
FIG. 12 illustrates an example node.

The node optical unit of a node may include an optical switch and may be coupled to one or more optical in-coupling channels and one or more optical out-coupling channels. The optical switch may route one or more optical signals that may be received over the optical in-coupling channels to any of the optical out-coupling channels. In some instances, the optical switch may route an optical signal to none of the optical out-coupling channels. Examples of an optical switch may include, but are not limited to, an MZ switch, a ring switch, a MEMS switch, and any other electro-optical, thermo-optical, acousto-optical, opto-mechanical, and linear or nonlinear optical switch known to those skilled in the art. In addition to an optical switch, the node optical unit may include any other opto-electronic, electro-optical, thermo-optical, acousto-optical, opto-mechanical, and linear or nonlinear photonic components, such as but not limited to a photodetector and an optical amplifier. An example node 1210 in which the node optical unit includes a photodetector is illustrated in FIG. 12.

In FIG. 10A, the node electronic unit 1002 in the node 1010 is coupled to the electrical signal channel 1051 for receiving an electrical activation signal and to the electrical signal channels 1052 and 1053 for sending out electrical activation signals. The electrical activation signal received over the electrical signal channel 1051 may be sent by a parent node of the node 1010. The electrical activation signals sent over the electrical signal channels 1052 and 1053 may be received by child nodes of the node 1010. The node 1010 may be activated by receiving an electrical ON signal over the electrical signal channel 1051. When the node 1010 is activated, the node 1010 may be controlled by a node control through the electrical node control channel 1071. The node electronic unit 1002 may allow the node control to control the node optical unit 1001 through the electrical node control channel 1071 and an electrical channel 1079. The node electronic unit 1002 may additionally send electrical activation signals over the electrical signal channels 1052 and 1053. The states of the electrical activation signals sent may be controlled or determined by the node control when the node 1010 is activated. The node optical unit 1001 in the node 1010 is coupled to the optical in-coupling channel 1031 and the optical out-coupling channels 1032 and 1033. When the node 1010 is activated, the optical switch in the node optical unit 1001 may be controlled by the node control to route an optical signal received over the optical in-coupling channel 1031 to any of the optical out-coupling channels 1032 and 1033. The node 1010 may be deactivated by default or by receiving an electrical OFF signal over the electrical signal channel 1051. When the node 1010 is deactivated, the node electronic unit 1002 may disable the control of the node optical unit 1001 by the node control. The node electronic unit 1002 of the deactivated node 1010 may additionally send an electrical OFF signal over each of the electrical signal channels 1052 and 1053.

In FIG. 10B, the node electronic unit 1003 in the node 1020 is coupled to the electrical signal channels 1052 and 1053 for sending out electrical activation signals. The electrical activation signals sent over the electrical signal channels 1052 and 1053 may be received by child nodes of the node 1020. The activation of the node 1020 may be accomplished by an implementation of the node electronic unit 1003 which, according to some embodiments of the node 1020, may set and continue to set the node 1020 in an activated state, or, according to other embodiments of the node 1020, may receive an electrical activation signal from the node control system of the ORC through the electrical node control channel 1072 or from an electrical activation circuit implemented within or outside the node 1020. When the node 1020 is activated, the node 1020 may be controlled by a node control through the electrical node control channel 1072. The node electronic unit 1003 may allow the node control to control the node optical unit 1001 through the electrical node control channel 1072 and the electrical channel 1079. The node electronic unit 1003 may additionally send electrical activation signals over the electrical signal channels 1052 and 1053. The states of the electrical activation signals sent may be controlled or determined by the node control when the node 1020 is activated. The node optical unit 1001 in the node 1020 is coupled to the optical in-coupling channel 1031 and the optical out-coupling channels 1032 and 1033. When the node 1020 is activated, the optical switch in the node optical unit 1001 may be controlled by the node control to route an optical signal received over the optical in-coupling channel 1031 to any of the optical out-coupling channels 1032 and 1033. In some embodiments, the node 1020 may be deactivated by default or by receiving an electrical OFF signal from the node control system or an electrical activation circuit. When the node 1020 is deactivated, the node electronic unit 1003 may disable the control of the node optical unit 1001 by the node control. The node electronic unit 1003 of the deactivated node 1020 may additionally send an electrical OFF signal over each of the electrical signal channels 1052 and 1053.

In FIG. 10C, the node electronic unit 1004 in the node 1030 is coupled to the electrical signal channel 1051 for receiving an electrical activation signal. The electrical activation signal received over the electrical signal channel 1051 may be sent by a parent node of the node 1030. The node 1030 may be activated by receiving an electrical ON signal over the electrical signal channel 1051. When the node 1030 is activated, the node 1030 may be controlled by a node control through the electrical node control channel 1073. The node electronic unit 1004 may allow the node control to control the node optical unit 1001 through the electrical node control channel 1073 and the electrical channel 1079. The node optical unit 1001 in the node 1030 is coupled to the optical in-coupling channel 1031 and the optical out-coupling channels 1032 and 1033. When the node 1030 is activated, the optical switch in the node optical unit 1001 may be controlled by the node control to route an optical signal received over the optical in-coupling channel 1031 to any of the optical out-coupling channels 1032 and 1033. The node 1030 may be deactivated by default or by receiving an electrical OFF signal over the electrical signal channel 1051. When the node 1030 is deactivated, the node electronic unit 1004 may disable the control of the node optical unit 1001 by the node control. The node electronic unit 1004 may not send out an electrical activation signal, whether the node 1030 is activated or deactivated.

In FIG. 10D, the node 1040 may be activated and remain activated, or the node 1040 may be activated or deactivated by receiving an electrical activation signal from the node control system of the ORC through the electrical node control channel 1074 or from an electrical activation circuit implemented within or outside the node 1040. When the node 1040 is activated, the node 1040 may be controlled by a node control through the electrical node control channel 1074. The node electronic unit 1005 may allow the node control to control the node optical unit 1001 through the electrical node control channel 1074 and the electrical channel 1079. The node optical unit 1001 in the node 1040 is coupled to the optical in-coupling channel 1031 and the optical out-coupling channels 1032 and 1033. When the node 1040 is activated, the optical switch in the node optical unit 1001 may be controlled by the node control to route an optical signal received over the optical in-coupling channel 1031 to any of the optical out-coupling channels 1032 and 1033. In some embodiments, the node 1040 may be deactivated by default or by receiving an electrical OFF signal from the node control system or an electrical activation circuit. When the node 1040 is deactivated, the node electronic unit 1005 may disable the control of the node optical unit 1001 by the node control. The node electronic unit 1005 may not send out an electrical activation signal, whether the node 1040 is activated or deactivated.

In FIGS. 10A-D, each of the electrical channels 1051, 1052, 1053, 1071, 1072, 1073, 1074, and 1079 may include one or more physical electrical connection paths.

A node control may control an activated node through an electrical node control channel. In some embodiments, the electrical node control channel may be a shared electrical node control channel that is shared by more than one node. For example, in FIGS. 10A-D, each of the electrical node control channels 1071, 1072, 1073 and 1074 may be a shared electrical node control channel that is shared by more than one node. The nodes that may share an electrical node control channel may or may not have the same design as each other. A shared electrical node control channel may allow a node control to simultaneously control a group of activated nodes, in which the group is a subset of a plurality of nodes coupled to the node control through the shared electrical node control channel. The shared electrical node control channel may additionally allow the node control to individually control each of the activated nodes in the group. The maximum number of activated nodes in the group that may be simultaneously and individually controlled by the node control is the MSIA group size of the plurality of nodes.

FIG. 11A illustrates an example node 1110, which may be the node 1010 in FIG. 10A. The node 1110 may be used as the node 302, 303, 304, 305, 306, or 307 in FIG. 3, the node 402, 403, 404, 405, 406, or 407 in FIG. 4, the node 504, 505, or 506 in FIG. 5, or the node 702, 703, 705, or 707 in FIG. 7.

The node 1110 may be electrically coupled to a node control through an electrical node control channel that includes electrical node control sub-channels 1171 and 1172. An electrical node control signal that may be sent by the node control and received by the node 1110 may include an electrical voltage signal (or an electrical current signal) transmitted over the electrical node control sub-channel 1171 and an electrical control signal transmitted over the electrical node control sub-channel 1172. The node 1110 includes a node optical unit 1101 and a node electronic unit 1102. The node optical unit 1101 includes an optical switch 1111 that is coupled to an optical in-coupling channel 1131 and optical out-coupling channels 1132 and 1133. The node electronic unit 1102 includes sub-units 1141 and 1146. The node electronic sub-unit 1141 may allow or disable a control of the optical switch 1111 by the node control depending on the state of an electrical activation signal received over an electrical signal channel 1151. The node electronic sub-unit 1146 may control an electrical activation signal to be sent over each of electrical signal channels 1152 and 1153. The states of the electrical activation signals sent over the electrical signal channels 1152 and 1153 may depend on the electrical activation signal received over the electrical signal channel 1151 and the electrical control signal received from the node control over the electrical node control sub-channel 1172.

The electrical activation signal received over the electrical signal channel 1151 and/or the electrical control signal received over the electrical node control sub-channel 1172 may be logic signals. An electrical ON signal may be represented by a logical HIGH, and an electrical OFF signal may be represented by a logical LOW. The node electronic sub-unit 1141 may include electronic components (e.g., a MOSFET switch) that may be switched on by receiving an electrical ON signal or switched off by receiving an electrical OFF signal over the electrical signal channel 1151. When switched on, the node electronic sub-unit 1141 may establish an electrical connection between the node control and the optical switch 1111 through the electrical node control sub-channel 1171 and an electrical channel 1179, so that the node control may control the optical switch 1111 by supplying an electrical voltage to the optical switch 1111 through the electrical node control sub-channel 1171 and the electrical channel 1179. When switched off, the node electronic sub-unit 1141 may cut off the electrical connection between the node control and the optical switch 1111 through the electrical node control sub-channel 1171 and the electrical channel 1179 so that the node control may not control the optical switch 1111 through the electrical node control sub-channel 1171.

The node electronic sub-unit 1146 may include electronic components (e.g., logic gates) that may control the state of an electrical activation signal that is sent over each of the electrical signal channels 1152 and 1153. When an electrical ON signal is received over the electrical signal channel 1151, the states of the electrical activation signals sent over the electrical signal channels 1152 and 1153 may be determined by the node electronic sub-unit 1146 and based on the electrical control signal received over the electrical node control sub-channel 1172. In the example of FIG. 11A, when an electrical ON signal is received over the electrical signal channel 1151, the node electronic sub-unit 1146 may send an electrical ON signal to one of the electrical signal channels 1152 and 1153 and an electrical OFF signal to the other electrical signal channel 1153 or 1152. The electrical signal channel 1152 or 1153 that receives the electrical ON signal may be determined using the electrical control signal received over the electrical node control sub-channel 1172. When an electrical OFF signal is received over the electrical signal channel 1151, the node electronic sub-unit 1146 may disregard the electrical control signal received over the electrical node control sub-channel 1172 and send an electrical OFF signal to each of the electrical signal channels 1152 and 1153. In other embodiments, the node electronic sub-unit 1146 may be configured to send electrical activation signals with states according to other rules to the electrical signal channels 1152 and 1153.

Figure 11B:
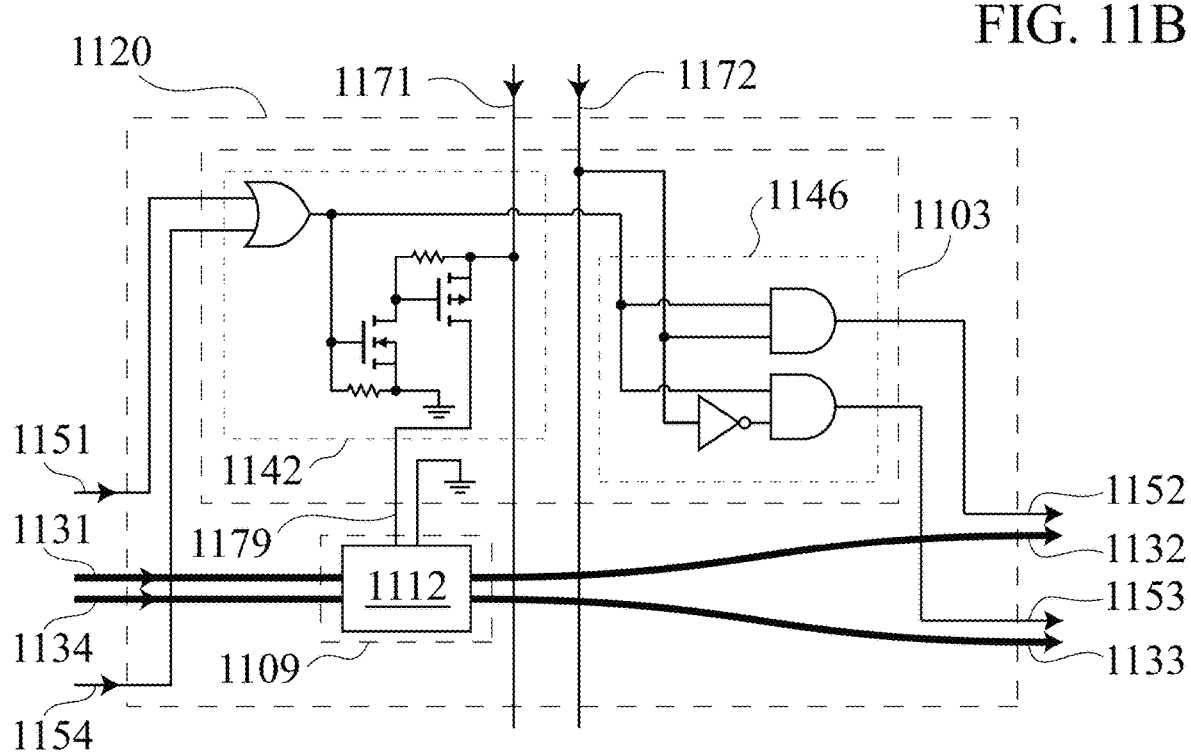

FIG. 11B illustrates an example node 1120, which may be the node 1010 in FIG. 10A. The node 1120 may be used, according to some embodiments, as the node 804, 807, or 808 in FIG. 8. The node 1120 includes a node optical unit 1109 and a node electronic unit 1103. The node 1120 is similar to the node 1110 in FIG. 11A, except that the node optical unit 1109 in the node 1120 includes an optical switch 1112 that is coupled to optical in-coupling channels 1131 and 1134 and the optical out-coupling channels 1132 and 1133. Any of the optical in-coupling channels 1131 and 1134 may be used to in-couple an optical signal to the node 1120. Any of the optical out-coupling channels 1132 and 1133 may be used to out-couple an optical signal from the node 1120. The node electronic unit 1103 includes sub-units 1142 and 1146. The node electronic sub-unit 1142 may allow the node 1120 to be activated by receiving an electrical ON signal over either or both electrical signal channels 1151 and 1154, or to be deactivated by receiving an electrical OFF signal over each of the electrical signal channels 1151 and 1154. The node electronic sub-unit 1146 of the node 1120 is similar to the sub-unit 1146 of the node 1110 in FIG. 11A.

Figure 11C:
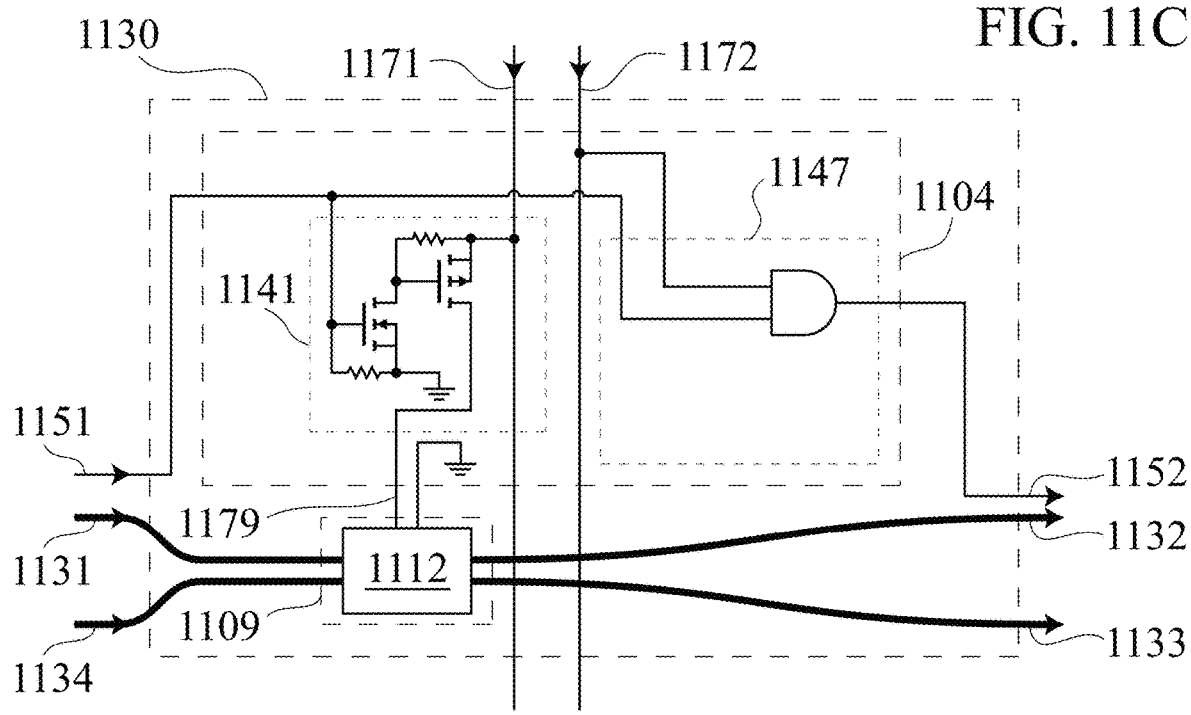
Figure 11D:
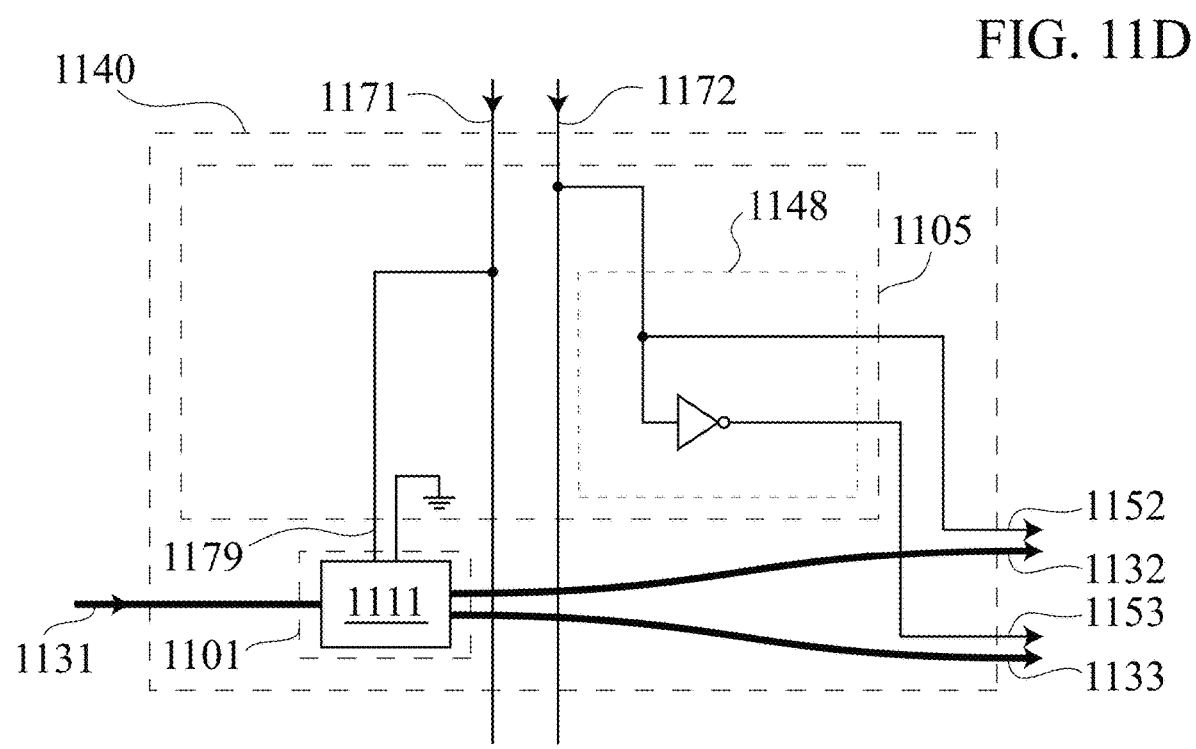

FIG. 11C illustrates an example node 1130, which may be the node 1010 in FIG. 10A. The node 1130 includes the node optical unit 1109 and a node electronic unit 1104. The node optical unit 1109 of the node 1130 is similar to the node optical unit 1109 of the node 1120 in FIG. 11B. The node electronic unit 1104 includes sub-units 1141 and 1147. The node electronic sub-unit 1141 of the node 1130 is similar to the sub-unit 1141 of the node 1110 in FIG. 11A. In the example of FIG. 11C, the node electronic sub-unit 1147 may, depending on the electrical activation signal received over the electrical signal channel 1151, pass an electrical control signal received over the electrical node control sub-channel 1172 as an electrical activation signal to the electrical signal channel 1152, or send an electrical OFF signal to the electrical signal channel 1152. In other embodiments, the node electronic sub-unit 1147 may be configured to send an electrical activation signal with a state according to other rules to the electrical signal channel 1152.

FIG. 11D illustrates an example node 1140, which may be the node 1020 in FIG. 10B. The node 1140 may be used as the node 301 in FIG. 3, the node 401 in FIG. 4, or, according to some embodiments, the node 801 or 802 in FIG. 8. The node 1140 includes the node optical unit 1101 and a node electronic unit 1105. The node 1140 may be activated and remain activated to be controlled by a node control without receiving an electrical activation signal. An electrical connection may be established between the node control and the optical switch 1111 in the node optical unit 1101 through the electrical node control sub-channel 1171 and the electrical channel 1179. The node electronic unit 1105 includes a sub-unit 1148. In the example of FIG. 11D, the node electronic sub-unit 1148 may send and continue to send an electrical ON signal to one of the electrical signal channels 1152 and 1153, and an electrical OFF signal to the other electrical signal channel 1153 or 1152. The electrical signal channel 1152 or 1153 that receives the electrical ON signal may be determined by an electrical control signal received over the electrical node control sub-channel 1172. In other embodiments, the node electronic sub-unit 1148 may be configured to send electrical activation signals with states according to other rules to the electrical signal channels 1152 and 1153. The node 1140 with the node electronic sub-unit 1148 and the electrical signal channels 1152 and 1153 removed may be the node 1040 in FIG. 10D that may be used as the nodes in FIG. 2, the node 601 in FIG. 6, or the node 901 in FIG. 9.

Figure 11E:
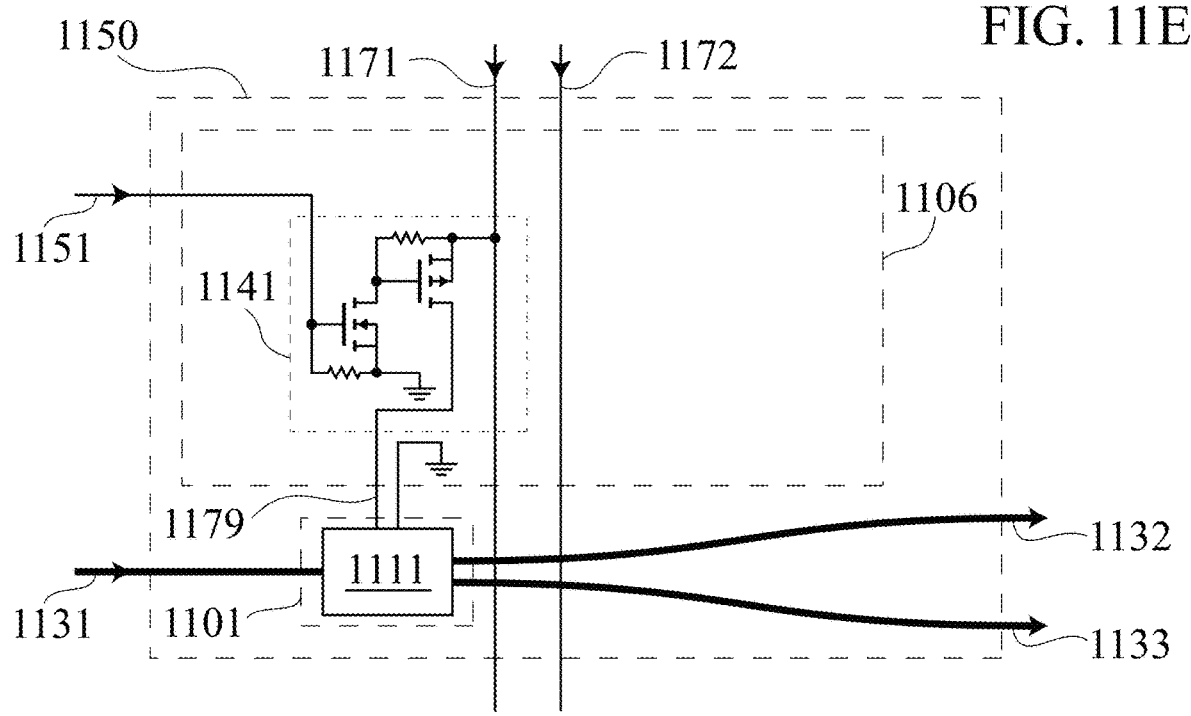

FIG. 11E illustrates an example node 1150, which may be the node 1030 in FIG. 10C. The node 1150 may be used as the node 308, 309, 310, 311, 312, 313, 314, or 315 in FIG. 3, the node 408, 409, 410, 411, 412, 413, 414, or 415 in FIG. 4, or the node 709, 711, or 713 in FIG. 7. The node 1150 includes the node optical unit 1101 and a node electronic unit 1106. The node 1150 may not send out an electrical activation signal. The node electronic unit 1106 in the node 1150 includes the node electronic sub-unit 1141 that is similar to the node electronic sub-unit 1141 in the node 1110 for the control of the electrical connection between a node control and the optical switch 1111 in the node optical unit 1101 through the electrical node control sub-channel 1171. The node electronic unit 1106 may disregard any electrical control signal that may be received from the node control through the electrical node control sub-channel 1172. The electrical node control sub-channel 1172 is optional for the node 1150.

The nodes 1110, 1120, 1130, 1140, and 1150 may be modified to result in other implementations of one or more of the node 1010 in FIG. 10A, the node 1020 in FIG. 10B, the node 1030 in FIG. 10C, or the node 1040 in FIG. 10D. Examples of modified nodes 1110, 1120, 1130, 1140, and 1150 may include, but are not limited to, nodes that may correspond to the nodes of the ORC 799 in FIG. 7.

Figure 11F:
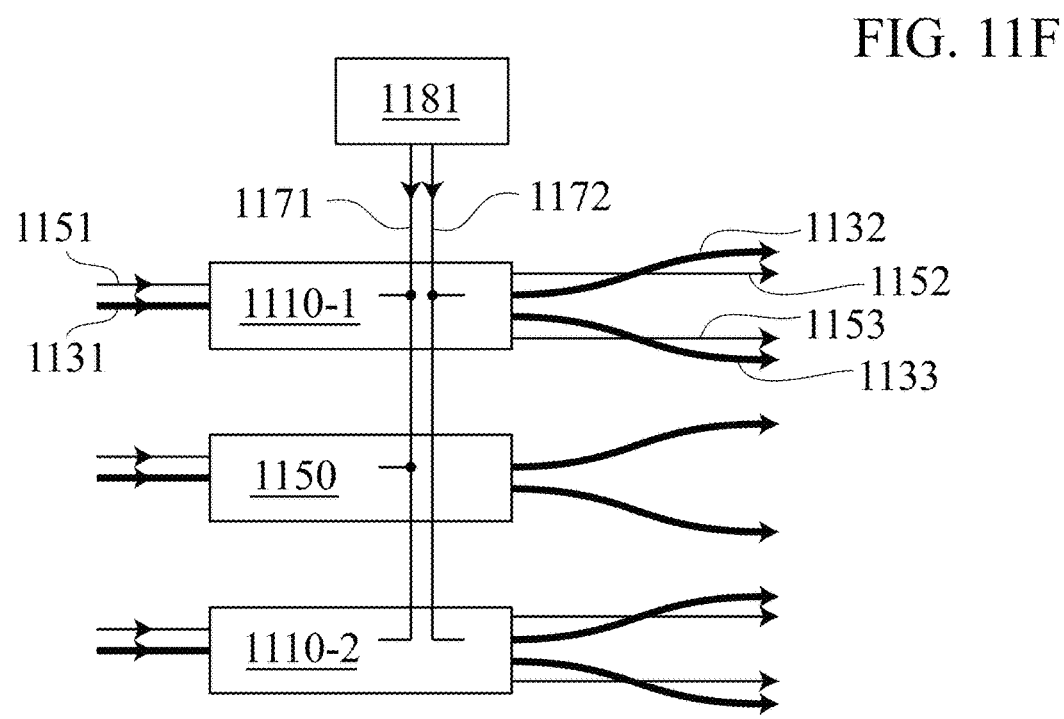

In some instances, the electrical node control channel that includes the sub-channels 1171 and 1172 may be a shared electrical node control channel for coupling multiple nodes 1110, 1120, 1130, 1140, and/or 1150 to a node control. The nodes that are coupled to the shared electrical node control channel may be the same or different from each other. FIG. 11F illustrates an example of a plurality of nodes, including nodes 1110-1, 1110-2, and 1150, that may be coupled to a node control 1181 by sharing the electrical node control channel that includes the sub-channels 1171 and 1172. Each of the nodes 1110-1 and 1110-2 is a node 1110 in FIG. 11A. In the example of FIG. 11F, the nodes 1110-1, 1110-2, and 1150 may be coupled to the shared electrical node control channel in parallel.

Each of the nodes 1110-1, 1110-2, and 1150 may be activated by receiving an electrical ON signal or deactivated by receiving an electrical OFF signal over a respective electrical signal channel 1151. Electrical connections between the node control 1181 and the optical switches in the nodes 1110-1, 1110-2, and 1150 may be established through the electrical node control sub-channel 1171 only for those of the nodes 1110-1, 1110-2, and 1150 that are activated. The node control 1181 may simultaneously control, through the electrical node control sub-channel 1171, the optical switches in those nodes 1110-1, 1110-2, and 1150 that are activated. Both the nodes 1110-1 and 1110-2 may receive the same electrical control signal from the node control 1181 through the electrical node control sub-channel 1172. For each of the nodes 1110-1 and 1110-2, the electrical activation signals sent by the node to its respective electrical signal channels 1152 and 1153 may depend on the electrical activation signal received over its electrical signal channel 1151 and the electrical control signal received from the node control 1181 through the electrical node control sub-channel 1172.

For a plurality of any of the nodes 1110, 1120, 1130, 1140, and 1150 that may be coupled to a node control through a shared electrical node control channel that includes the sub-channels 1171 and 1172, the embodiments in FIGS. 11A-E may allow a group of up to one activated node selected from the plurality of the nodes to be simultaneously and individually controlled by the node control, e.g., an MSIA group size of one node for the plurality of the nodes.

In some embodiments, a node control system of the ORC may operate an optical switch in a node based on an electrical feedback signal received by the node control system. Such embodiments may include, but are not limited to, an ORC in which optical switches of the nodes of the ORC may be MZ switches. Due to fabrication artifacts, performance of an MZ switch may depart from its specifications. Additionally, properties of an MZ switch may be affected by ambient temperature. In some embodiments, operations of an optical switch of a node due to practical issues, such as but not limited to fabrication artifacts and temperature-dependent effects, may be compensated by controlling the optical switch based on electrical monitoring signals that monitor the optical signals output from optical out-coupling channels of the node.

FIG. 12 illustrates an example node 1210, which may be the node 1010 in FIG. 10A. The node 1210 may be similar to the node 1110 in FIG. 11A, except that the node 1210 may additionally include photodetectors and electronic components associated with the photodetectors, and be coupled to a node control through additional electrical node control sub-channels. The node 1210 includes a node optical unit 1201 and a node electronic unit 1202. The node optical unit 1201 includes photodetectors 1261 and 1262, in addition to an optical switch 1211. The node electronic unit 1202 includes a photodetector control sub-unit 1242 in addition to node electronic sub-units 1241 and 1246. The node 1210 may be coupled to a node control 1281 through an electrical node control channel that includes electrical node control sub-channels 1271, 1272, 1273, and 1274.

Depending on the state of an electrical activation signal that may be received over an electrical signal channel 1251, the node electronic sub-unit 1241 may allow or disable a control of the optical switch 1211 by the node control 1281 through the electrical node control sub-channel 1271. The node electronic sub-unit 1246 may control an electrical activation signal to be sent over each of the electrical signal channels 1252 and 1253, in which the states of the electrical activation signals to be sent may depend on the state of the electrical activation signal received over the electrical signal channel 1251 and the state of an electrical control signal received from the node control 1281 through the electrical node control sub-channel 1272.

The node optical unit 1201 of the node 1210 may split a small fraction (e.g., 5% or less) of optical signals from optical out-coupling channels 1232 and/or 1233. The fractions of the optical signals to be split from the optical out-coupling channels 1232 and 1233 may or may not be the same. The splitting may be accomplished by optical splitters, including but not limited to optical directional couplers, that may be coupled to the optical out-coupling channels 1232 and/or 1233. The fractions of the optical signals split from the optical out-coupling channels 1232 and 1233 may respectively be coupled to and detected by the photodetectors 1261 and 1262. The photodetectors 1261 and 1262 may produce electrical monitoring signals, which may be received by the photodetector control sub-unit 1242. Each of the photodetectors 1261 and 1262 may output an electrical monitoring signal that may be proportional to the optical power of the fraction of the optical signal coupled to the photodetector 1261 or 1262. The photodetector control sub-unit 1242 may include electronic components, such as but not limited to transmission gates, which may pass the electrical monitoring signals received from the photodetectors 1261 and 1262 as electrical feedback signals to the node control 1281 through the electrical node control sub-channels 1273 and 1274 when an electrical ON signal is received over the electrical signal channel 1251. The photodetector control sub-unit 1242 may block the electrical feedback signals from coupling to the electrical node control sub-channels 1273 and 1274 when an electrical OFF signal is received over the electrical signal channel 1251. The photodetector control sub-unit 1242 may include pre-amplifiers that amplify the electrical monitoring signals received from the photodetectors 1261 and 1262. Examples of a pre-amplifier in the photodetector control sub-unit 1242 may include, but are not limited to, a transimpedance amplifier (TIA).

The electrical power consumed by some components of the node 1210, including but not limited to the optical switch 1211, the photodetectors 1261 and 1262, and the pre-amplifiers in the photodetector control sub-unit 1242, may be minimized when the node 1210 is deactivated by receiving an electrical OFF signal over the electrical signal channel 1251. This may be accomplished by configurations in which the components may be disconnected from their respective power supplies when the node 1210 is deactivated. For example, the photodetector control sub-unit 1242 may connect the photodetectors 1261 and 1262 to a biasing-voltage power supply when an electrical ON signal is received over the electrical signal channel 1251. The photodetector control sub-unit 1242 may disconnect the photodetectors 1261 and 1262 from the power supply when an electrical OFF signal is received over the electrical signal channel 1251. As another example, a pre-amplifier in the photodetector control sub-unit 1242 may be enabled when an electrical ON signal is received over the electrical signal channel 1251 and may be disabled when an electrical OFF signal is received over the electrical signal channel 1251. A TIA in the photodetector control sub-unit 1242, as illustrated in FIG. 12, includes a control input labeled with a "C" that may enable or disable the TIA depending on the state of the electrical signal received by the control input.

The photodetector control sub-unit 1242 may transmit electrical feedback signals to the note control 1281 over the electrical node control sub-channels 1273 and 1274, in which the electrical feedback signals may respectively be proportional to the electrical monitoring signals received from the photodetectors 1261 and 1262. In some instances, the photodetector control sub-unit 1242 may output an electrical feedback signal that may be proportional to the difference between the electrical monitoring signals received from the photodetectors 1261 and 1262. In other instances, the photodetector control sub-unit 1242 may output an electrical feedback signal that may be related to the electrical monitoring signals received from the photodetectors 1261 and 1262 after some signal processing, which may include but is not limited to filtering. The number of electrical node control sub-channels for transmitting electrical feedback signals from the photodetector control sub-unit 1242 to the node control 1281 may depend on the number of electrical signals output from the photodetector control sub-unit 1242.

The node control 1281 may include an electrical feedback circuit that may adjust the voltage applied to the optical switch 1211 through the electrical node control sub-channel 1271, in which the adjustment may be made based on the electrical feedback signals received from the photodetector control sub-unit 1242.

In FIG. 12, the optical out-coupling channels 1232 and 1233 are illustrated to be coupled to the photodetectors 1261 and 1262, respectively. The node 1210 may include any number of photodetectors that may be coupled to one or more optical out-coupling channels of the node 1210. A modified node 1210 that includes other numbers of photodetectors may include a modified photodetector control sub-unit 1242 with other numbers of electrical node control sub-channels that are coupled to the modified photodetector control sub-unit 1242.

The node 1210 may be modified to result in other implementations of the node 1010 in FIG. 10A or implementations of the node 1020 in FIG. 10B, the node 1030 in FIG. 10C, or the node 1040 in FIG. 10D. Examples of such a modified node 1210 may include, but are not limited to, nodes that are counterparts to the node 1120 in FIG. 11B, the node 1130 in FIG. 11C, the node 1140 in FIG. 11D, and the node 1150 in FIG. 11E. A plurality of any of these nodes may be coupled to a node control through a shared electrical node control channel that includes the sub-channels 1271, 1272, 1273 and 1274, in a configuration similar to the example in FIG. 11F.

For a plurality of the nodes 1210 and/or the modified nodes 1210 that may be coupled to a node control through a shared electrical node control channel that includes the sub-channels 1271, 1272, 1273, and 1274, the example in FIG. 12 may allow a group of up to one activated node selected from the plurality of the nodes to be simultaneously and individually controlled by the node control, e.g., an MSIA group size of one node for the plurality of the nodes.

Figure 13A:
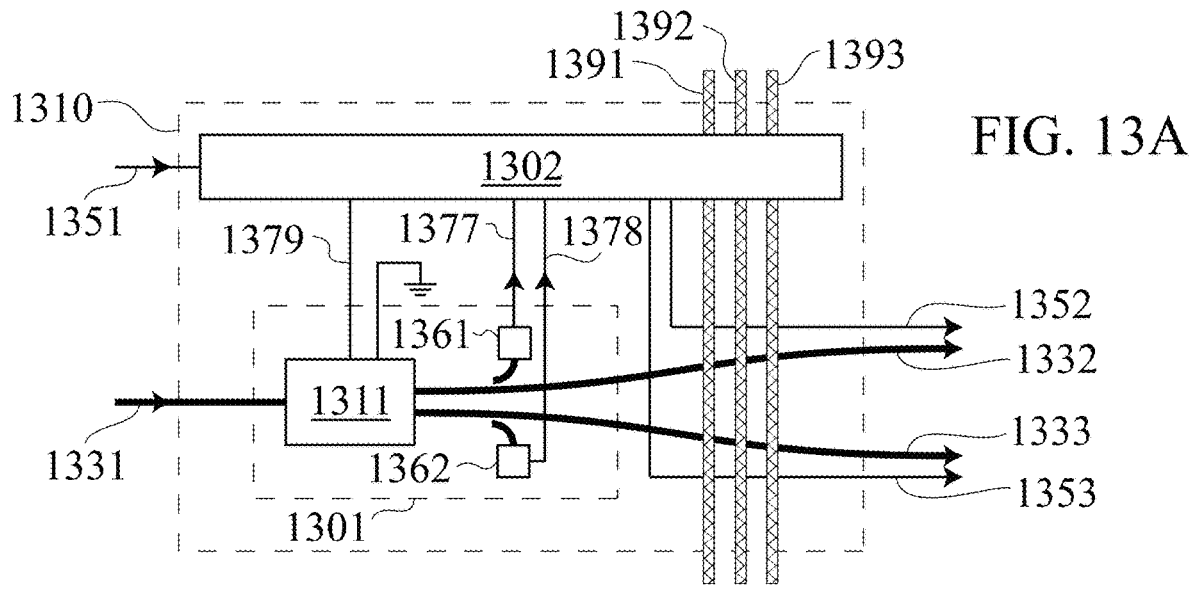
FIGS. 13A and 13B illustrate example nodes.

FIG. 13A illustrates an example node 1310, which may be the node 1010 in FIG. 10A. The node 1310 is similar to the node 1110 in FIG. 11A and the node 1210 in FIG. 12, except that for a plurality of the nodes 1310 that may be coupled to a node control through a shared electrical node control channel (see FIG. 13B), the node 1310 may enable a maximum of more than one activated node selected from the plurality of the nodes 1310 to be simultaneously and individually controlled by the node control, e.g., an MSIA group size of more than one node.

In the example of FIG. 13A, the node 1310, with a shared electrical node control channel that includes electrical node control sub-channel groups 1391, 1392, and 1393, may allow a group of up to three activated nodes 1310 to be simultaneously and individually controlled by a node control through the shared electrical node control channel. That is, the node 1310 and the shared electrical node control channel may enable an MSIA group size of three nodes. The number of electrical node control sub-channel groups in the shared electrical node control channel may correspond to the MSIA group size allowed by the shared electrical node control channel. Each of the electrical node control sub-channel groups 1391, 1392, and 1393 may include a plurality of electrical node control sub-channels, in which an electrical node control sub-channel of the electrical node control sub-channel group may be used to couple to one of electrical channels 1352, 1353, 1377, 1378, and 1379. Comparing the node 1210 in FIG. 12 to the node 1310, the electrical node control channel that includes the electrical node control sub-channels 1271, 1272, 1273, and 1274 may be considered as a single electrical node control sub-channel group.

The node 1310 in FIG. 13A includes a node optical unit 1301 and a node electronic unit 1302. The node optical unit 1301 includes an optical switch 1311 and photodetectors 1361 and 1362. When the node 1310 is activated, the optical switch 1311 may be controlled by a node control to route an optical signal, which may be received over an optical in-coupling channel 1331, to optical out-coupling channels 1332 and/or 1333. The photodetectors 1361 and 1362 that are coupled to the optical out-coupling channels 1332 and 1333 may produce electrical monitoring signals and output the monitoring signals to the node electronic unit 1302 through the electrical channels 1377 and 1378. The node electronic unit 1302 may receive an electrical activation signal over an electrical signal channel 1351 and send electrical activation signals over the electrical signal channels 1352 and 1353.

When the node 1310 is activated, the node control may control the node 1310 through an electrical node control sub-channel group 1391, 1392, or 1393 determined by the node electronic unit 1302 and based on the electrical activation signal received over the electrical signal channel 1351. FIG. 14A illustrates an example of the node electronic unit 1302, which is described later in this disclosure. In some embodiments, in addition to ON or OFF information that may respectively activate or deactivate the node 1310, the electrical activation signal received over the electrical signal channel 1351 may include sub-channel group selection information for the selection of the electrical node control sub-channel group. Similarly, the electrical activation signals to be sent over the electrical signal channels 1352 and 1353 may include sub-channel group selection information, in addition to ON/OFF information for activation.

When the electrical activation signal received over the electrical signal channel 1351 is in an ON state, the node electronic unit 1302 may use the sub-channel group selection information in the electrical activation signal to select (or pick) one of the electrical node control sub-channel groups 1391, 1392, and 1393. Then the node electronic unit 1302 may establish an electrical connection between the node control and the node 1310 through the electrical node control sub-channel group selected, and the node control may control the node 1310. The operation of the activated node 1310 may be similar to that of an activated node 1210 in FIG. 12, except that electrical signals received by the node 1310 from the node control through the selected electrical node control sub-channel group may include information that may determine the sub-channel group selection information of the electrical activation signals to be sent over the electrical signal channels 1352 and 1353. When the electrical activation signal received over the electrical signal channel 1351 is in an OFF state, the node electronic unit 1302 may cut off electrical connections between the node control and the node 1310 through the electrical node control sub-channel groups 1391, 1392, and 1393 so that the node control may not control the node 1310. The operation of the deactivated node 1310 may be similar to that of a deactivated node 1210 in FIG. 12.

Figure 13B:
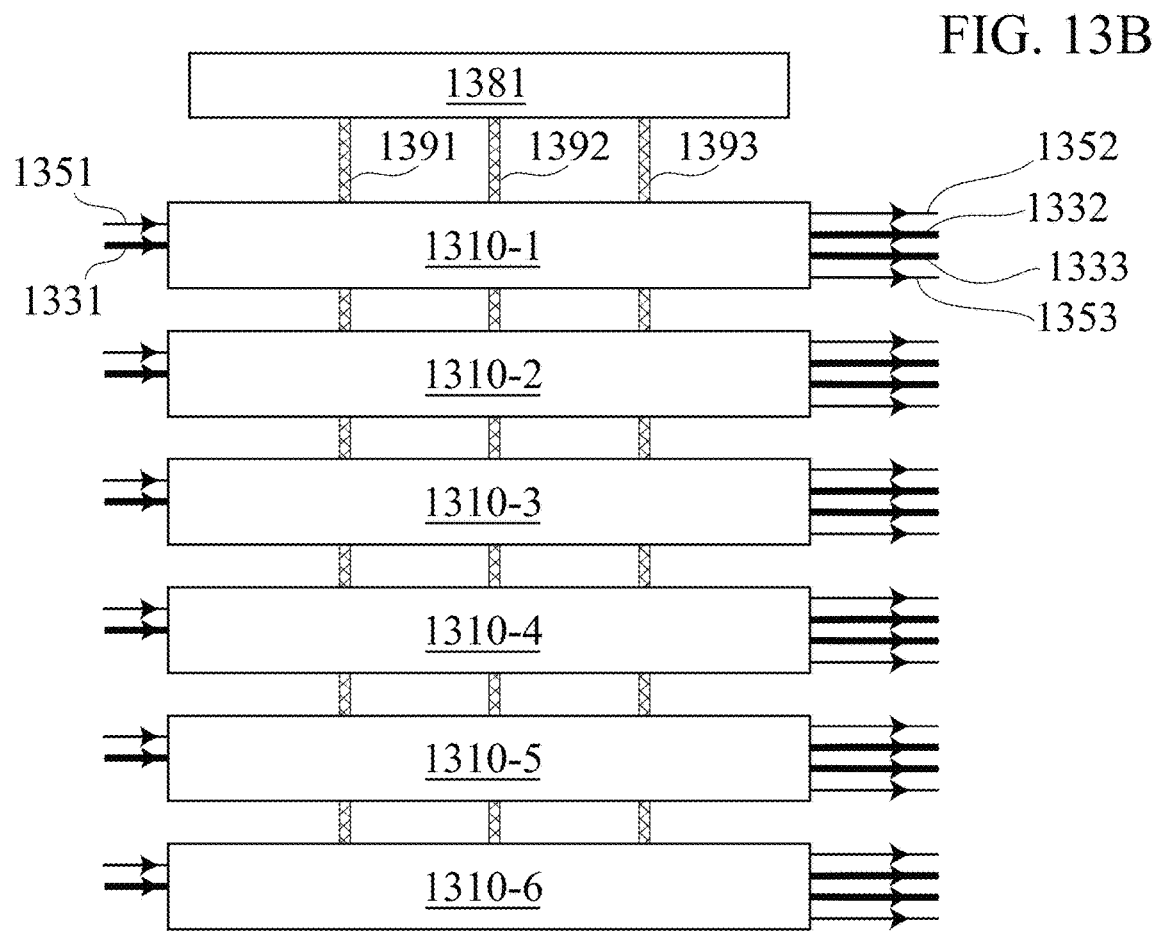

FIG. 13B illustrates an example of a plurality of nodes, including nodes 1310-1, 1310-2, 1310-3, 1310-4, 1310-5, and 1310-6, that may be coupled to a node control 1381 by sharing an electrical node control channel that includes the sub-channel groups 1391, 1392, and 1393. Each of the nodes 1310-1, 1310-2, 1310-3, 1310-4, 1310-5, and 1310-6 is a node 1310 in FIG. 13A. The example in FIG. 13B may allow a group of up to three activated nodes selected from any of the nodes 1310-1, 1310-2, 1310-3, 1310-4, 1310-5, and 1310-6 to be simultaneously and individually controlled by the node control 1381. To be consistent with the MSIA group size of three nodes allowed by the shared electrical node control channel, a maximum of three nodes selected from the nodes 1310-1, 1310-2, 1310-3, 1310-4, 1310-5, and 1310-6 may receive an electrical activation signal in an ON state, while the other nodes may receive an electrical activation signal in an OFF state, over their respective electrical signal channels 1351. Additionally, the electrical activation signal received by each of the activated ones of the nodes 1310-1, 1310-2, 1310-3, 1310-4, 1310-5, and 1310-6 over its electrical signal channel 1351 may include sub-channel group selection information that may be used by the node electronic unit 1302 of the activated node to pick one of the electrical node control sub-channel groups 1391, 1392, and 1393. The electrical activation signals received by the activated nodes may include such sub-channel group selection information that may cause an electrical node control sub-channel group to be selected by no more than one activated node.

The node 1310 in FIG. 13A may be modified to result in other implementations of the node 1010 in FIG. 10A or implementations of the node 1020 in FIG. 10B, the node 1030 in FIG. 10C, or the node 1040 in FIG. 10D. Examples of such a modified node 1310 may include, but are not limited to, nodes that are counterparts to the node 1120 in FIG. 11B, the node 1130 in FIG. 11C, the node 1140 in FIG. 11D, and the node 1150 in FIG. 11E. A plurality of any of these nodes may be coupled to a node control through a shared electrical node control channel that includes the sub-channel groups 1391, 1392, and 1393 in a configuration similar to the example in FIG. 13B.

FIG. 14A illustrates an example node electronic unit 1402, which may be the node electronic unit 1302 of the node 1310 in FIG. 13A. The node electronic unit 1402 in FIG. 14A may allow a group of up to three activated nodes selected from a plurality of the nodes 1310 to be simultaneously and individually controlled by a node control through a shared electrical node control channel, e.g., an MSIA group size of three nodes. An electrical channel 1479 may correspond to the electrical channel 1379 for coupling to the optical switch 1311. An electrical channel 1477 may correspond to the electrical channel 1377 for coupling to the photodetector 1361. An electrical channel 1478 may correspond to the electrical channel 1378 for coupling to the photodetector 1362.

Additionally, a first electrical signal channel that includes electrical signal sub-channels 1451 and 1459 may correspond to the electrical signal channel 1351 in FIG. 13A, in which the electrical signal sub-channels 1451 and 1459 may form a 2-bit electrical channel that may allow the node 1310 to receive an electrical activation signal as an encoded 2-bit logic signal. In the node electronic unit 1402, an electrical activation signal in an OFF state may be represented by logical LOW in both the electrical signal sub-channels 1451 and 1459, and an electrical activation signal in an ON state may be represented by logical HIGH in either or both of the electrical signal sub-channels 1451 and 1459. The sub-channel group selection information in the electrical activation signal may be encoded as a 2-bit binary number according to the electrical signals in the electrical signal sub-channels 1451 and 1459, in which logical LOW may represent ZERO (0) and logical HIGH may represent ONE (1). Similarly, a second electrical signal channel that includes electrical signal sub-channels 1452 and 1454 may correspond to the electrical signal channel 1352 in FIG. 13A, so that the electrical signal sub-channels 1452 and 1454 may enable the node electronic unit 1402 to send out an electrical activation signal as an encoded 2-bit logic signal. Similar to the second electrical signal channel, a third electrical signal channel that includes electrical signal sub-channels 1453 and 1455 may correspond to the electrical signal channel 1353 in FIG. 13A. Depending on the MSIA group sizes allowed by the node 1310 and the child nodes of the node 1310, the number of electrical signal sub-channels in the first electrical signal channel may or may not be the same as the number of electrical signal sub-channels in the second or third electrical signal channel. Additionally, the encoding format of the electrical activation signal received over the first electrical signal channel may or may not be the same as the encoding formats of the electrical activation signals sent over the second and third electrical signal channels.

Furthermore, a first electrical node control sub-channel group that includes electrical node control sub-channels 1412, 1413, 1414, 1415, 1417, 1418, and 1419 may correspond to the electrical node control sub-channel group 1391 in FIG. 13A. A second electrical node control sub-channel group that includes electrical node control sub-channels 1422, 1423, 1424, 1425, 1427, 1428, and 1429 may correspond to the electrical node control sub-channel group 1392 in FIG. 13A. A third electrical node control sub-channel group that includes electrical node control sub-channels 1432, 1433, 1434, 1435, 1437, 1438, and 1439 may correspond to the electrical node control sub-channel group 1393 in FIG. 13A. The number of electrical node control sub-channels in the first, second, and third electrical node control sub-channel groups may depend on the MSIA group sizes allowed by the child nodes of the node 1310.

The node electronic unit 1402 may include an electrical selection sub-unit 1407, which includes power multiplexer 1469, analog demultiplexers 1467 and 1468, and digital multiplexers 1462, 1463, 1464, and 1465. The operations of the power multiplexer 1469, analog demultiplexers 1467 and 1468, and digital multiplexers 1462, 1463, 1464, and 1465 may be determined by the electrical activation signal received over the electrical signal sub-channels 1451 and 1459. The power multiplexer 1469 in the node electronic unit 1402 may correspond to the node electronic sub-unit 1241 in the node 1210. The analog demultiplexers 1467 and 1468 together with a node electronic sub-unit 1405 may correspond to the photodetector control sub-unit 1242. The digital multiplexers 1462, 1463, 1464, and 1465 may correspond to the node electronic sub-unit 1246.

When an electrical activation signal in an OFF state (e.g., the number zero encoded as a 2-bit binary number) is received over the first electrical signal channel that includes the sub-channels 1451 and 1459, the power multiplexer 1469 may connect the electrical channel 1479 to input port 0 of the multiplexer 1469, so that no electrical connection may be established between the electrical channel 1479 and any of the electrical node control sub-channels 1419, 1429, and 1439. When an electrical activation signal in an ON state (e.g., a number other than zero encoded as a 2-bit binary number) is received over the first electrical signal channel, the power multiplexer 1469 may connect the electrical channel 1479 to the input port of the multiplexer 1469 corresponding to the 2-bit binary number. For example, when the number one encoded as a 2-bit binary number is received over the electrical signal sub-channels 1451 and 1459, the power multiplexer 1469 may connect the electrical channel 1479 to input port 1 of the multiplexer 1469, so that an electrical connection may be established between the electrical channel 1479 and the electrical node control sub-channel 1419 of the first electrical node control sub-channel group.

The analog demultiplexers 1467 and 1468 may operate similarly to the power multiplexer 1469, except that the analog demultiplexers 1467 and 1468 may handle electrical signals respectively received over the electrical channels 1477 and 1478. For example, an electrical monitoring signal may be received over the electrical channel 1477. The electrical monitoring signal may be transmitted through the node electronic sub-unit 1405 and be coupled to the input port of the analog demultiplexer 1467 for output as an electrical feedback signal. When an electrical activation signal in an ON state is received over the first electrical signal channel that includes the sub-channels 1451 and 1459, the analog demultiplexer 1467 may route the electrical feedback signal to one of output ports 1, 2, and 3 of the demultiplexer 1467, which may respectively be coupled to the electrical node control sub-channels 1417, 1427, and 1437. When an electrical activation signal in an OFF state is received over the first electrical signal channel, the analog demultiplexer 1467 may route the electrical feedback signal to output port 0 of the demultiplexer 1467, so that the electrical channel 1477 may be decoupled from the electrical node control sub-channels 1417, 1427, and 1437, and hence no electrical feedback signal may be transmitted to any of the first, second, and third electrical node control sub-channel groups.

The digital multiplexers 1462, 1463, 1464, and 1465 may operate similarly to the power multiplexer 1469, except that the digital multiplexers 1462, 1463, 1464, and 1465 may handle electrical control signals that may be received by the node electronic unit 1402 from a node control through one of the first, second, and third electrical node control sub-channel groups. When an electrical activation signal in an ON state is received over the first electrical signal channel that includes the sub-channels 1451 and 1459, the digital multiplexers 1462, 1463, 1464, and 1465 may respectively connect the electrical signal sub-channels 1452, 1453, 1454, and 1455 to the input ports of the digital multiplexers 1462, 1463, 1464, and 1465 that correspond to the 2-bit binary number represented by the electrical activation signal. For example, when logical HIGHs are both received over the electrical signal sub-channels 1451 and 1459, the digital multiplexers 1462, 1463, 1464, and 1465 may respectively connect the electrical signal sub-channels 1452, 1453, 1454, and 1455 to input ports 3 of the digital multiplexers 1462, 1463, 1464, and 1465. In this case, electrical connections may be established respectively between the electrical signal sub-channel 1452 and the electrical node control sub-channel 1432, between the electrical signal sub-channel 1453 and the electrical node control sub-channel 1433, between the electrical signal sub-channel 1454 and the electrical node control sub-channel 1434, and between the electrical signal sub-channel 1455 and the electrical node control sub-channel 1435. Thus, an electrical control signal encoded as a 2-bit logic signal may be passed from the electrical node control sub-channels 1432 and 1434 of the third electrical node control sub-channel group to the second electrical signal channel that includes the sub-channels 1452 and 1454, and another electrical control signal encoded as a 2-bit logic signal may be passed from the electrical node control sub-channels 1433 and 1435 of the third electrical node control sub-channel group to the third electrical signal channel that includes the sub-channels 1453 and 1455. In this case, the electrical control signals received over the third electrical node control sub-channel group may be passed to the second and third electrical signal channels as electrical activation signals. When an electrical activation signal in an OFF state is received over the electrical signal sub-channels 1451 and 1459, the digital multiplexers 1462, 1463, 1464, and 1465 may respectively connect the electrical signal sub-channels 1452, 1453, 1454, and 1455 to input ports 0 of the digital multiplexers 1462, 1463, 1464, and 1465. In this case, the input ports 0 of the digital multiplexers 1462, 1463, 1464, and 1465 may be set to logical LOW (0), so that an electrical activation signal in an OFF state may be sent over each of the second and third electrical signal channels.

The node electronic unit 1402 may allow a group of up to three activated nodes 1310 to be simultaneously and individually controlled by a node control through a shared electrical node control channel that includes the first, second, and third electrical node control sub-channel groups. The node electronic unit 1402 may be modified to allow a group of up to any number of activated nodes 1310 to be simultaneously and individually controlled by a node control through a shared electrical node control channel, by including appropriate numbers of electrical signal sub-channels and electrical node control sub-channels in the modified node electronic unit 1402, and using the power multiplexer 1469, analog demultiplexers 1467 and 1468, and digital multiplexers 1462, 1463, 1464, and 1465 with appropriate numbers of input and output ports. The node electronic unit 1402 may be implemented to couple to any number of photodetectors to output electrical feedback signals, by including appropriate numbers of electrical node control sub-channels and analog demultiplexers, and modifying the node electronic sub-unit 1405 accordingly. The node electronic unit 1402 may also use electrical activation signals and/or electrical control signals encoded in other formats by incorporating corresponding electrical selection circuits and/or electrical channels.

Figure 14B:
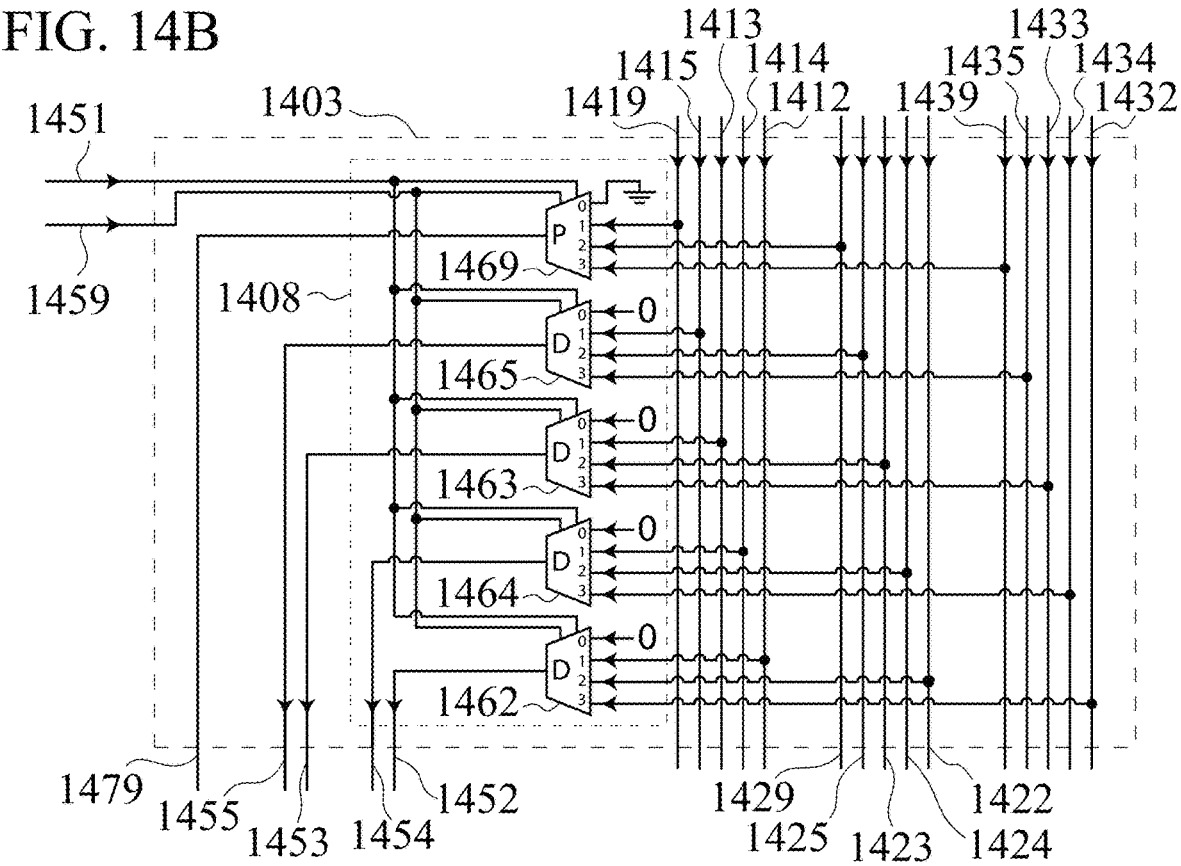
Figure 14C:
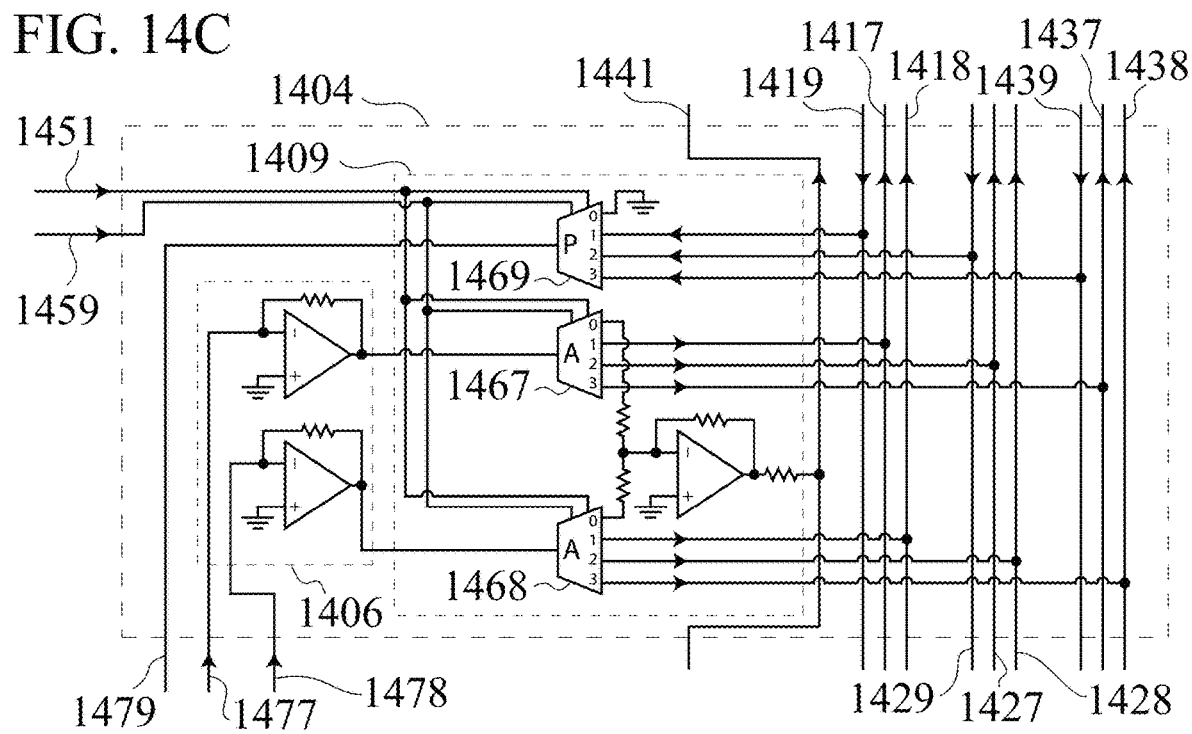

The node electronic unit 1402 may be modified to be used in a modified node 1310, which may be another implementation of the node 1010 in FIG. 10A or an implementation of the node 1020 in FIG. 10B, the node 1030 in FIG. 10C, or the node 1040 in FIG. 10D. As an example, FIG. 14B illustrates another example node electronic unit 1403 modified from the node electronic unit 1402. The node electronic unit 1403 may be used in a modified node 1310 with the photodetectors 1361 and 1362 removed. An electrical selection sub-unit 1408 in the node electronic unit 1403 is similar to the electrical selection sub-unit 1407 in the node electronic unit 1402 except that the electrical selection sub-unit 1408 may not include analog demultiplexers for handling electrical signals output from photodetectors. FIG. 14C illustrates another example node electronic unit 1404 modified from the node electronic unit 1402. The node electronic unit 1404 may be used in a modified node 1310 as an implementation of the node 1030 in FIG. 10C, which may not send out an electrical activation signal. An electrical selection sub-unit 1409 in the node electronic unit 1404 is similar to the electrical selection sub-unit 1407 in the node electronic unit 1402 except that the electrical selection sub-unit 1409 may not include digital multiplexers for sending out electrical activation signals. Additionally, the node electronic unit 1404 may couple to an electrical node control sub-channel 1441. When the node electronic unit 1404 receives an electrical activation signal in an OFF state over the electrical signal sub-channels 1451 and 1459, the node electronic unit 1404 may transmit an electrical feedback signal over the electrical node control sub-channel 1441. The electrical feedback signal may be related to a sum of electrical monitoring signals received over the electrical channels 1477 and 1478. The electrical feedback signal may be used to monitor optical signals received by the modified node 1310 in a deactivated state.

In the examples of FIGS. 14A and 14B, the electrical activation signals sent over the second electrical signal channel (including the sub-channels 1452 and 1454) and the third electrical signal channel (including the sub-channels 1453 and 1455) by the node electronic unit 1402 or 1403 are directly associated with the electrical control signals received over the first, second, or third electrical node control sub-channel groups. In some instances, the electrical activation signals sent over the second and third electrical signal channels may be based on encoded electrical control signals received over the first, second, or third electrical node control sub-channel groups, and after some signal processing by the node electronic unit 1402 or 1403. In other instances, the electrical activation signals sent over the second and third electrical signal channels may be based on encoded electrical control signals received over electrical node control sub-channels that may be separate from the first, second, and third electrical node control sub-channel groups. The electrical node control sub-channels may not be attributed to a particular one of the first, second, and third electrical node control sub-channel groups.

Figure 15:
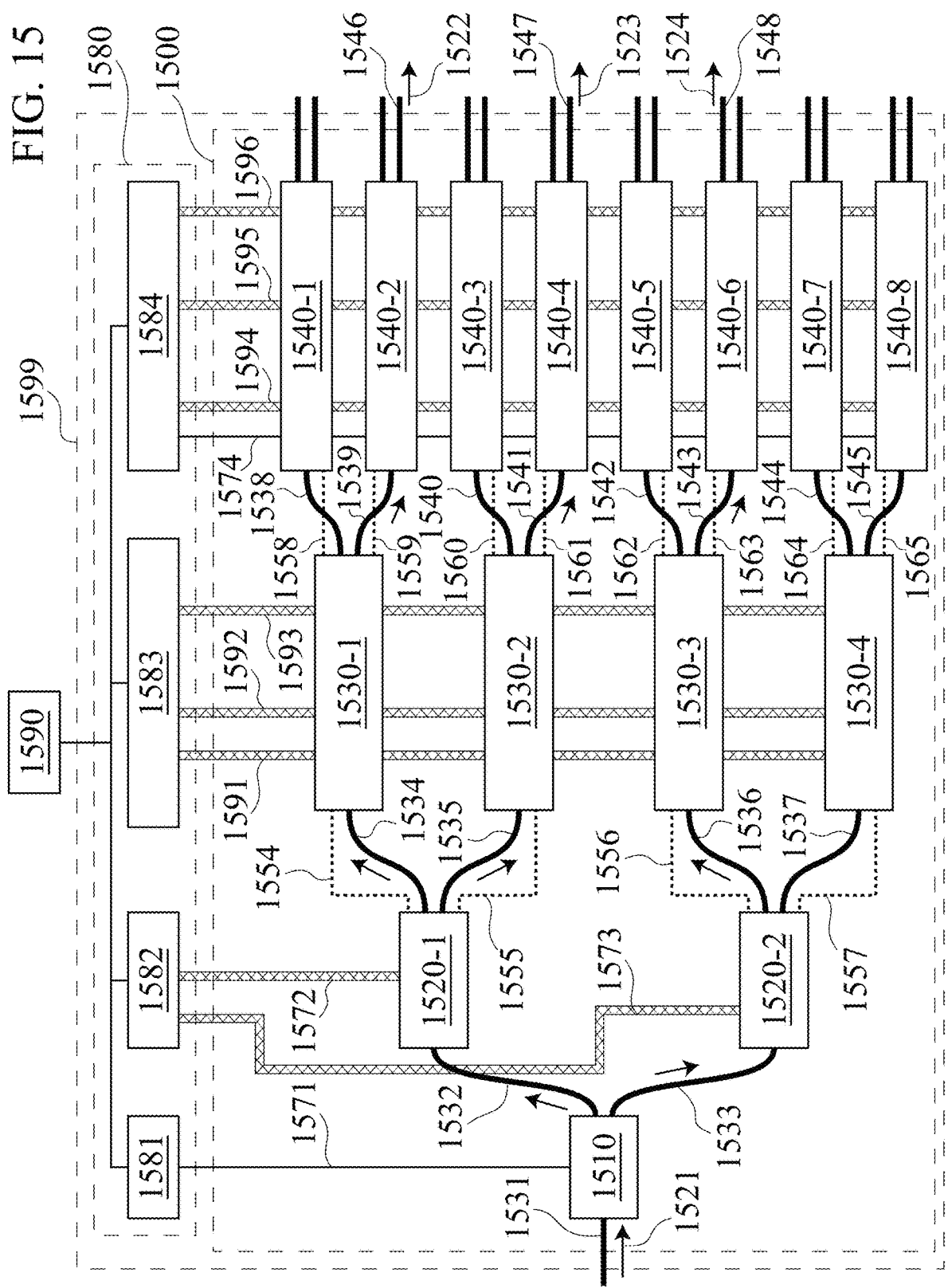
FIG. 15 illustrates an example ORC.

FIG. 15 illustrates an example ORC 1599. The ORC 1599 demonstrates that utilizing electrical feedback signals output from both an activated node and a deactivated node may reduce optical power consumption for an input optical signal to be routed through the photonic network circuit of the ORC 1599. The consumption may be due to splitting the input optical signal within the photonic network circuit to produce electrical feedback signals for controlling the activated nodes in the photonic network circuit. The ORC 1599 may utilize a node employing the node electronic unit 1404 in FIG. 14C, which may send electrical feedback signals when the node is activated or deactivated.

The ORC 1599 includes a photonic network circuit 1500 in a form of a 4-level binary tree and a node control system 1580 with four node controls 1581, 1582, 1583, and 1584. An ORC controller 1590 may determine the operational state of the ORC 1599. Similar to the ORC 699 in FIG. 6, the ORC 1599 may route an optical signal simultaneously to up to any three of the optical output channels of the ORC 1599.

In the ORC 1599, only nodes in selected subsets of the photonic network circuit 1500 may include photodetectors to transmit electrical feedback signals to the node control system 1580. In the example of FIG. 15, only nodes in the last level of the photonic network circuit 1500 as a subset, which includes nodes 1540-1, 1540-2, 1540-3, 1540-4, 1540-5, 1540-6, 1540-7, and 1540-8, may include photodetectors and transmit electrical feedback signals to the node control system 1580. In some instances, nodes in a subset other than the last level, or nodes in one or more subsets, may include photodetectors and transmit electrical feedback signals to the node control system 1580.

In the photonic network circuit 1500, a node 1510 may be activated, remain activated, and be controlled by the node control 1581 through an electrical node control channel 1571. The node 1510 may include an optical switch only. For example, the node 1510 may be implemented similarly to the node 1140 in FIG. 11D but with the node electronic unit 1105 removed. Similar to the node 1510, nodes 1520-1 and 1520-2 may be activated, remain activated, and be controlled by the node control 1582 through electrical node control channels 1572 and 1573. The nodes 1520-1 and 1520-2 may be implemented similarly to the node 1140 in FIG. 11D, except that the nodes 1520-1 and 1520-2 may pass electrical control signals received from the node control 1582 through sub-channels of the electrical node control channels 1572 and 1573 directly as electrical activation signals over electrical signal channels 1554, 1555, 1556, and 1557 to nodes 1530-1, 1530-2, 1530-3, and 1530-4 (e.g., without passing through a node electronic sub-unit that corresponds to the node electronic sub-unit 1148 in FIG. 11D). Each of the electrical signal channels 1554, 1555, 1556, and 1557 may include sub-channels to transmit electrical activation signals that may be 2-bit logic signals to carry both ON/OFF information and sub-channel group selection information. Each of the nodes 1530-1, 1530-2, 1530-3, and 1530-4 may be implemented as a modified node 1310 with the node electronic unit 1403 in FIG. 14B, and each of the nodes 1540-1, 1540-2, 1540-3, 1540-4, 1540-5, 1540-6, 1540-7, and 1540-8 may be implemented as a modified node 1310 with the node electronic unit 1404 in FIG. 14C. The nodes 1530-1, 1530-2, 1530-3, and 1530-4 as a subset may be electrically coupled to the node control 1583 by sharing an electrical node control channel that includes electrical node control sub-channel groups 1591, 1592, and 1593. Comparing FIG. 15 to FIG. 14B, the electrical node control sub-channel group 1591 may correspond to a first sub-channel group that includes the sub-channels 1412, 1413, 1414, 1415, and 1419. The electrical node control sub-channel group 1592 may correspond to a second sub-channel group that includes the sub-channels 1422, 1423, 1424, 1425, and 1429. The electrical node control sub-channel group 1593 may correspond to a third sub-channel group that includes the sub-channels 1432, 1433, 1434, 1435, and 1439. The nodes 1540-1, 1540-2, 1540-3, 1540-4, 1540-5, 1540-6, 1540-7, and 1540-8 as a subset may be electrically coupled to the node control 1584 by sharing an electrical node control channel that includes an electrical node control sub-channel 1574 and sub-channel groups 1594, 1595, and 1596. Comparing FIG. 15 to FIG. 14C, the electrical node control sub-channel 1574 may correspond to the sub-channel 1441. The electrical node control sub-channel group 1594 may correspond to a fourth sub-channel group that includes the sub-channels 1417, 1418 and 1419. The electrical node control sub-channel group 1595 may correspond to a fifth sub-channel group that includes the sub-channels 1427, 1428 and 1429. The electrical node control sub-channel group 1596 may correspond to a sixth sub-channel group that includes the sub-channels 1437, 1438 and 1439.

In the example of FIG. 15, the node control 1584 may simultaneously and individually control up to three activated ones of the nodes 1540-1, 1540-2, 1540-3, 1540-4, 1540-5, 1540-6, 1540-7, and 1540-8 through one or more of the electrical node control sub-channel groups 1594, 1595, and 1596. Each of the activated nodes may send a first electrical feedback signal to the node control 1584 through one of the electrical node control sub-channels 1594, 1595, and 1596. Also, each of deactivated ones of the nodes 1540-1, 1540-2, 1540-3, 1540-4, 1540-5, 1540-6, 1540-7, and 1540-8 may output an electrical feedback signal. The electrical feedback signals output from the deactivated nodes may be summed and transmitted to the node control 1584 as a combined second electrical feedback signal through the electrical node control sub-channel 1574. The second electrical feedback signal may be used to monitor collectively optical signals being received by the deactivated nodes. The optical signals received by the deactivated nodes may be considered as residual optical signals being routed in the photonic network circuit 1500.

In an example operation of the ORC 1599, optical output channels 1546, 1547, and 1548 may be selected to output optical signals from the ORC 1599. An operational state of the ORC 1599 may be determined based on the selected optical output channels. The photonic network circuit 1500 may be configured according to the operational state. The nodes 1510, 1520-1, and 1520-2 may be activated and remain activated. The nodes 1530-1, 1530-2, 1530-3, 1540-2, 1540-4, and 1540-6 may be activated by receiving electrical ON signals from their respective parent nodes. The nodes 1530-4, 1540-1, 1540-3, 1540-5, 1540-7, and 1540-8 may be deactivated by receiving electrical OFF signals from their respective parent nodes. Each of the activated nodes 1540-2, 1540-4, and 1540-6 may transmit a first electrical feedback signal to the node control 1584. Each of the deactivated nodes 1540-1, 1540-3, 1540-5, 1540-7, and 1540-8 may output an electrical feedback signal that may be proportional to the optical power of a residual optical signal received by the deactivated node. The electrical feedback signals may be summed and transmitted as a second electrical feedback signal to the node control 1584 through the electrical node control sub-channel 1574. The node control system 1580 may control, in accordance with the operational state, the activated nodes 1510, 1520-1, 1520-2, 1530-1, 1530-2, 1530-3, 1540-2, 1540-4, and 1540-6 by minimizing the second electrical feedback signal and monitoring the first electrical feedback signals to attain designated fractions of optical outputs for the activated nodes 1510, 1520-1, 1520-2, 1530-1, 1530-2, 1530-3, 1540-2, 1540-4, and 1540-6.

For instance, the node control 1584 may control each of the activated nodes 1540-2, 1540-4, and 1540-6 to attain the designated fractions of optical outputs (e.g., maximally to each of the optical output channels 1546, 1547, and 1548) for the activated nodes 1540-2, 1540-4, and 1540-6 based on the first electrical feedback signals received from the activated nodes 1540-2, 1540-4, and 1540-6. When the designated fractions for the nodes 1540-2, 1540-4, and 1540-6 are attained, the node control 1583 may control each of the activated nodes 1530-1, 1530-2, and 1530-3 to minimize optical signals that may be coupled to the deactivated nodes 1540-1, 1540-3, and 1540-5 by minimizing the second electrical feedback signal sent by the deactivated nodes 1540-1, 1540-3, 1540-5, 1540-7, and 1540-8 while maximizing the first electrical feedback signals sent by the activated nodes 1540-2, 1540-4, and 1540-6. In this process, the designated fractions of optical outputs (e.g., maximally to each of the optical out-coupling channels 1539, 1541, and 1543) for the nodes 1530-1, 1530-2, and 1530-3 may be attained. When the designated fractions for the nodes 1530-1, 1530-2, and 1530-3 are attained, the node control 1582 may control each of the activated nodes 1520-1 and 1520-2 to minimize optical signals that may be coupled to the deactivated node 1530-4, and hence the deactivated nodes 1540-7 and 1540-8, by minimizing the second electrical feedback signal while maximizing the first electrical feedback signal sent by the node 1540-6 and attaining a target ratio (e.g., 1:1) between the first electrical feedback signals respectively sent by the nodes 1540-2 and 1540-4. In this process, the designated fractions of optical outputs for the nodes 1520-1 and 1520-2 may be attained. When the designated fractions for the nodes 1520-1 and 1520-2 are attained, the node control 1581 may control the activated node 1510 to attain target ratios (e.g., 1:1:1) among the first electrical feedback signals respectively sent by the nodes 1540-2, 1540-4, and 1540-6. In this process, the designated fractions of optical outputs for the node 1510 may be attained.

Controlling the activated nodes based on the first and second electrical feedback signals may be performed at a calibration stage of the ORC. The calibration may also be performed when a change of an operating temperature and/or other conditions of the ORC may occur. In some embodiments, photodetectors may be used in a subset or group of nodes of a photonic network circuit to provide electrical feedback signals for optical signal monitoring. In other embodiments, photodetectors may be used in more than one subset or group of nodes of the photonic network circuit for optical signal monitoring. In further embodiments, photodetectors may be used in all nodes of the photonic network circuit for optical signal monitoring. Optical signal monitoring requires consumption of optical power to produce the electrical feedback signals. In the example of FIG. 15, photodetectors are used in the last level (e.g., the nodes 1540-1, 1540-2, 1540-3, 1540-4, 1540-5, 1540-6, 1540-7, and 1540-8) of the photonic network circuit 1500 to produce electrical feedback signals from both activated and deactivated nodes. This may result in reduced optical power consumption as compared to embodiments in which photodetectors are used in all nodes or in more than one subset or group of nodes.

In some embodiments, the operation and/or calibration of the ORC may be performed by using the first electrical feedback signals produced by the activated nodes but not the second electrical feedback signal produced by the deactivated nodes. For instance, the node control system 1580 may control the activated nodes 1540-2, 1540-4, and 1540-6 based on the first electrical feedback signals received from the activated nodes 1540-2, 1540-4, and 1540-6 (e.g., maximizing the first electrical feedback signals sent by the activated nodes 1540-2, 1540-4, and 1540-6), and then the activated nodes 1530-1, 1530-2, and 1530-3 based on the first electrical feedback signals received from the activated nodes 1540-2, 1540-4, and 1540-6 (e.g., maximizing the first electrical feedback signals sent by the activated nodes 1540-2, 1540-4, and 1540-6), and then the activated nodes 1520-1 and 1520-2 based on the first electrical feedback signals received from the activated nodes 1540-2, 1540-4, and 1540-6 (e.g., maximizing the first electrical feedback signal sent by the node 1540-6 and attaining a target ratio (e.g., 1:1) between the first electrical feedback signals respectively sent by the nodes 1540-2 and 1540-4), and finally the activated node 1510 based on the first electrical feedback signals received from the activated nodes 1540-2, 1540-4, and 1540-6 (e.g., attaining target ratios (e.g., 1:1:1) among the first electrical feedback signals respectively sent by the nodes 1540-2, 1540-4, and 1540-6). In such circumstances, the electrical node control sub-channel 1574 and the corresponding electronic components and/or circuits may be optional. For instance, the nodes 1540-1, 1540-2, 1540-3, 1540-4, 1540-5, 1540-6, 1540-7, and 1540-8 in FIG. 15 may include node electronic units with the ports 0 of the analog demultiplexers of the node electronic units not coupled to the electrical node control sub-channel 1574 (e.g., each of the node electronic units may be a modified node electronic unit 1404 in FIG. 14C with the ports 0 of the analog demultiplexers 1467 and 1468 coupled to ground, instead of the electrical node control sub-channel 1441, as in the node electronic unit 1401 in FIG. 14A).

In some instances, using photodetectors in more than one subset of nodes to produce electrical feedback signals from both activated and deactivated nodes may allow a photonic network circuit to attain the operational state of the ORC in a shorter time at the expense of an increase in the optical power consumption to produce the electrical feedback signals. For example, according to the number of subsets of nodes that may produce electrical feedback signals, a photonic network circuit may be treated separately as a plurality of photonic network sub-circuits in which nodes in a last level, layer, group, or subset of each photonic network sub-circuit may include photodetectors to produce electrical feedback signals from both activated and deactivated nodes. The photonic network sub-circuits may then be individually and concurrently configured by the node control system of the ORC, which may allow the photonic network circuit to attain the operational state of the ORC in a shorter time.

FIG. 16A illustrates an example node 1610, which may be the node 1040 in FIG. 10D. The activation of the node 1610 may be determined by an electrical activation signal sent from a node control, and the electrical activation signal may be received by the node 1610 directly from the node control through a shared electrical node control channel. Similar to the node 1310 in FIG. 13A, the example in FIG. 16A may allow the node control to simultaneously and individually control a group of up to three activated nodes 1610 through the shared electrical node control channel. The shared electrical node control channel includes electrical node control sub-channel 1641 and electrical node control sub-channel groups 1691, 1692, and 1693. The electrical node control sub-channel 1641 may correspond to the electrical node control sub-channel 1441 in FIG. 14C or the electrical node control sub-channel 1574 in FIG. 15 for transmitting a second electrical feedback signal. The number of electrical node control sub-channel groups in the shared electrical node control channel may correspond to the maximum number of activated nodes that may be simultaneously and individually controlled by the node control. The node 1610 may be used, for example, as the node 902, 903, 904, 905, 906, 906, 908, 909, 910, 911, 912, 913, 914, or 915 in FIG. 9.

The node 1610 includes a node optical unit 1601 and a node electronic unit 1602. The node 1610 may be activated by receiving an electrical activation signal from a node control through any of the electrical node control sub-channel groups 1691, 1692, and 1693, instead of from a parent node through an electrical signal channel. In addition to ON or OFF information that may respectively activate or deactivate the node 1610, the electrical activation signal received by the node 1610 from the node control may include sub-channel group selection information, which may be used for the selection of an electrical node control sub-channel group for the control of the node 1610 by the node control. A plurality of the nodes 1610 may be coupled to a node control through a shared electrical node control channel that includes the sub-channel 1641 and the sub-channel groups 1691, 1692, and 1693 in a configuration similar to the example in FIG. 13B. The nodes in the plurality may receive the same electrical activation signal sent from the node control. The electrical activation signal may be considered as an electrical control signal sent by the node control and received by the nodes in the plurality.

Figure 16B:
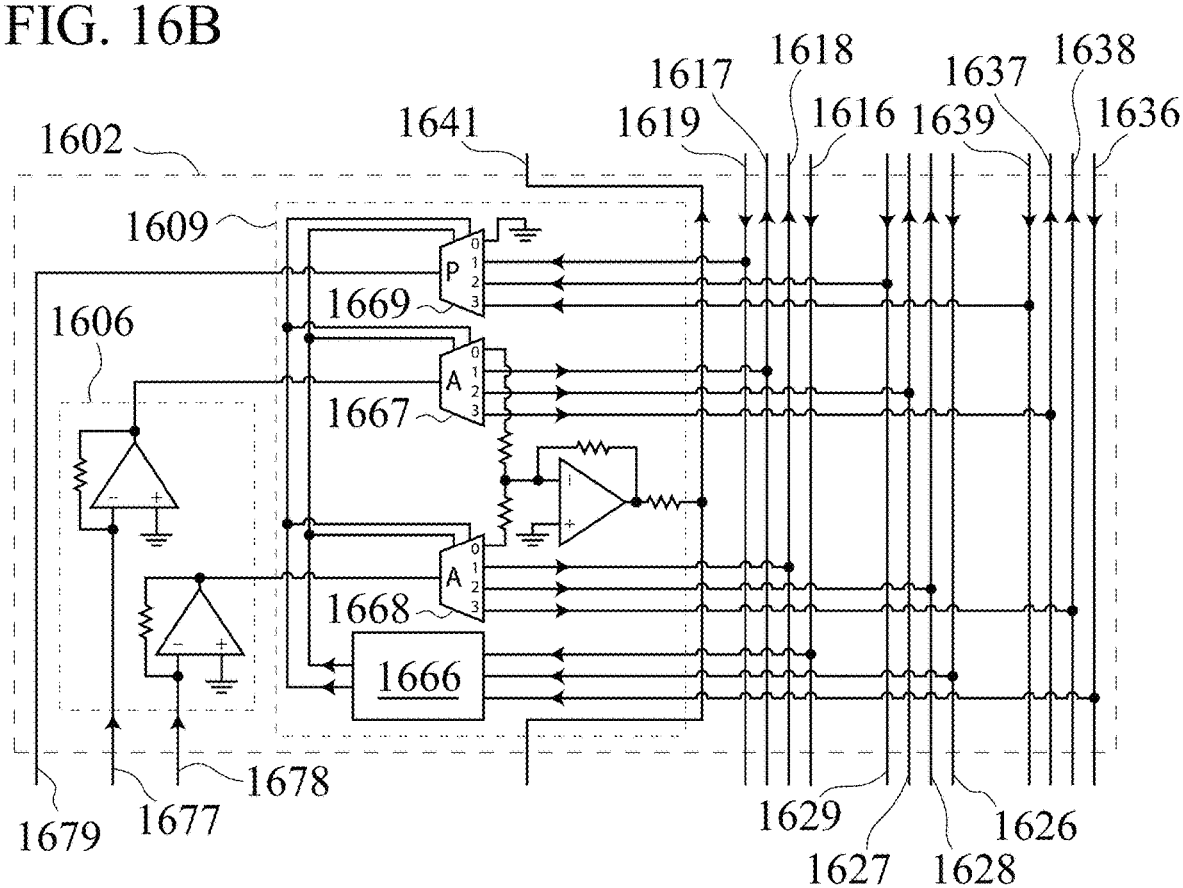
FIG. 16B illustrates an example node electronic unit.

FIG. 16B illustrates an example node electronic unit 1602 of the node 1610 in FIG. 16A. The electrical node control sub-channel group 1691 includes sub-channels 1616, 1617, 1618, and 1619, the electrical node control sub-channel group 1692 includes sub-channels 1626, 1627, 1628, and 1629, and the electrical node control sub-channel group 1693 includes sub-channels 1636, 1637, 1638, and 1639. A power multiplexer 1669 and analog demultiplexers 1667 and 1668 in an electrical selection sub-unit 1609 may respectively correspond to the power multiplexer 1469 and analog demultiplexers 1467 and 1468 in the electrical selection sub-unit 1409 of the node electronic unit 1404 in FIG. 14C. Similarly, a node electronic sub-unit 1606 in the node electronic unit 1602 may correspond to the node electronic sub-unit 1406 in the node electronic unit 1404. Furthermore, the electrical node control sub-channels 1617, 1618, 1619, 1627, 1628, 1629, 1637, 1638, and 1639 may respectively correspond to the electrical node control sub-channels 1417, 1418, 1419, 1427, 1428, 1429, 1437, 1438, and 1439 in FIG. 14C.

The node electronic unit 1602 includes a sub-channel group selection unit 1666, which may select the electrical node control sub-channel groups 1691, 1692, and/or 1693 for the control of the node 1610 by a node control. For a plurality of the nodes 1610 that may share an electrical node control channel for the control of the nodes by a node control, a node identifier may be assigned to each node in the plurality. The node identifier of a node in the plurality may uniquely distinguish the node from the other nodes in the plurality. The node identifier may be registered in the node 1610 in such a way that it may be accessed by the sub-channel group selection unit 1666. The node identifier may be registered in the sub-channel group selection circuit 1666 in the node electronic unit 1602.

The sub-channel group selection unit 1666 may receive an electrical activation signal sent from a node control through one of the electrical node control sub-channels 1616, 1626, and 1636. In some instances, the sub-channel group selection unit 1666 may receive electrical activation signals through more than one of the electrical node control sub-channels 1616, 1626, and 1636. In further instances, the sub-channel group selection unit 1666 may not receive an electrical activation signal through the electrical node control sub-channel 1616, 1626, or 1636.

An electrical activation signal sent over the electrical node control sub-channel 1616, 1626, or 1636 may be an encoded signal that may include node identification information related to a node identifier. The node identification information may be used as the sub-channel group selection information of the electrical activation signal. An ON state of the electrical activation signal with respect to the node electronic unit 1602 may correspond to the node identification information of the electrical activation signal that matches the node identifier registered in the node 1610. The electrical node control sub-channel group 1691 may be selected for the control of the node 1610 by the node control when an electrical ON signal is received through the electrical node control sub-channel 1616. The electrical node control sub-channel group 1692 may be selected for the control of the node 1610 by the node control when an electrical ON signal is received through the electrical node control sub-channel 1626. The electrical node control sub-channel group 1693 may be selected for the control of the node 1610 by the node control when an electrical ON signal is received through the electrical node control sub-channel 1636. The node identification information of the electrical activation signals sent over the electrical node control sub-channels 1616, 1626, and 1636 may or may not be the same. An OFF state of the electrical activation signal with respect to the node electronic unit 1602 may correspond to the node identification information that does not match the node identifier registered in the node 1610. The node 1610 may be set to be deactivated by default when an electrical activation signal in an ON state is not received by the node electronic unit 1602. The sub-channel group selection unit 1666 may include electronic components that may be used to decode the node identification information in the electrical activation signal.

The sub-channel group selection unit 1666 may also output a sub-channel group selection signal to the power multiplexer 1669 and the analog demultiplexers 1667 and 1668. The sub-channel group selection signal may be used for the selection of an input port of the power multiplexer 1669 and an output port of each of the analog demultiplexers 1667 and 1668. As in the example of FIG. 16B, the sub-channel group selection signal may be a 2-bit logic signal that may be transmitted in two electrical channels for the port selections of the power multiplexer 1669 and the analog demultiplexers 1667 and 1668.

In an example operation, the sub-channel group selection unit 1666 may compare the node identification information of a received electrical activation signal with the node identifier registered in the node 1610. When the node identification information, with or without being decoded, matches the node identifier, the sub-channel group selection unit 1666 may activate the node 1610 by outputting a sub-channel group selection signal to the power multiplexer 1669 and the analog demultiplexers 1667 and 1668, so that the sub-channel group selection signal may be used to select those ports of the multiplexer 1669 and the demultiplexers 1667 and 1668 that allow electrical connections to be established between a group including the electrical channels 1677, 1678, and 1679 and the electrical node control sub-channel group over which the electrical activation signal was received. For example, the sub-channel group selection unit 1666 receives an electrical activation signal over the sub-channel 1626 of the electrical node control sub-channel group 1692. The node identification information of the electrical activation signal may match the node identifier registered in the node 1610. The sub-channel group selection unit 1666 may output a sub-channel group selection signal encoded as the 2-bit binary number for number two to the power multiplexer 1669 and the analog demultiplexers 1667 and 1668. As a result, the ports 2 of the power multiplexer 1669 and the analog demultiplexers 1667 and 1668 may be selected so that electrical connections may be established respectively between the electrical channel 1677 and the sub-channel 1627 of the electrical node control sub-channel group 1692, between the electrical channel 1678 and the sub-channel 1628 of the electrical node control sub-channel group 1692, and between the electrical channel 1679 and the sub-channel 1629 of the electrical node control sub-channel group 1692.

In other instances, the sub-channel group selection unit 1666 may not receive an electrical activation signal over the electrical node control sub-channel 1616, 1626, or 1636 in which the node identification information of the electrical activation signal, with or without being decoded, matches the node identifier registered in the node 1610. The sub-channel group selection unit 1666 may deactivate the node 1610 by outputting a sub-channel group selection signal to the power multiplexer 1669 and the analog demultiplexers 1667 and 1668, so that no electrical connection may be established between the electrical channels 1677, 1678, and 1679 and the electrical node control sub-channel groups 1691, 1692, and 1693. Additionally, when the node 1610 is deactivated, the electrical selection sub-unit 1609 may establish electrical connections between the electrical node control sub-channel 1641 and the electrical channels 1677 and 1678, so that electrical monitoring signals from the electrical channels 1677 and 1678 may be transmitted to the node control through the electrical node control sub-channel 1641 as electrical feedback signals. The sub-channel group selection signal may be used to select ports 0 of the power multiplexer 1669 and the analog demultiplexers 1667 and 1668, and ports 0 of the analog demultiplexers 1667 and 1668 may be electrically coupled to the electrical node control sub-channel 1641. The electrical feedback signals output from ports 0 of the analog demultiplexers 1667 and 1668 may be summed before it may be transmitted to the electrical node control sub-channel 1641. The summed electrical feedback signals, which may be transmitted through the electrical node control sub-channel 1641, may be an electrical feedback signal for monitoring optical signals that may be received by the deactivated node 1610.

In some embodiments, the node 1610 and the node electronic unit 1602 may be modified to operate without outputting an electrical feedback signal through the electrical node control sub-channel 1641 when the node 1610 is deactivated.

An electrical activation signal, which may be received by the sub-channel group selection unit 1666 over the electrical node control sub-channel 1616, 1626, or 1636, may be a sequence of digitally encoded signals that may be transmitted in a serial communication channel, and the electrical node control sub-channels 1616, 1626 and/or 1636 may be a serial communication channel. In some embodiments, the electrical activation signal may be a sequence of digitally encoded signals that may be transmitted in a parallel communication channel, and the electrical node control sub-channels 1616, 1626 and/or 1636 may be a parallel communication channel that may include more than one physical electrical connection paths.

The node electronic unit 1602 may allow a group of up to three activated nodes 1610 to be simultaneously and individually controlled by a node control, e.g., an MSIA group size of three nodes, through a shared electrical node control channel that includes the sub-channel groups 1692, 1692 and 1693. The node electronic unit 1602 may be modified to allow a group of up to any number of activated nodes 1610 to be simultaneously and individually controlled by a node control through a shared electrical node control channel.

According to some embodiments of a node of the present disclosure, the node may receive a clock signal from a node control.

Figure 17:
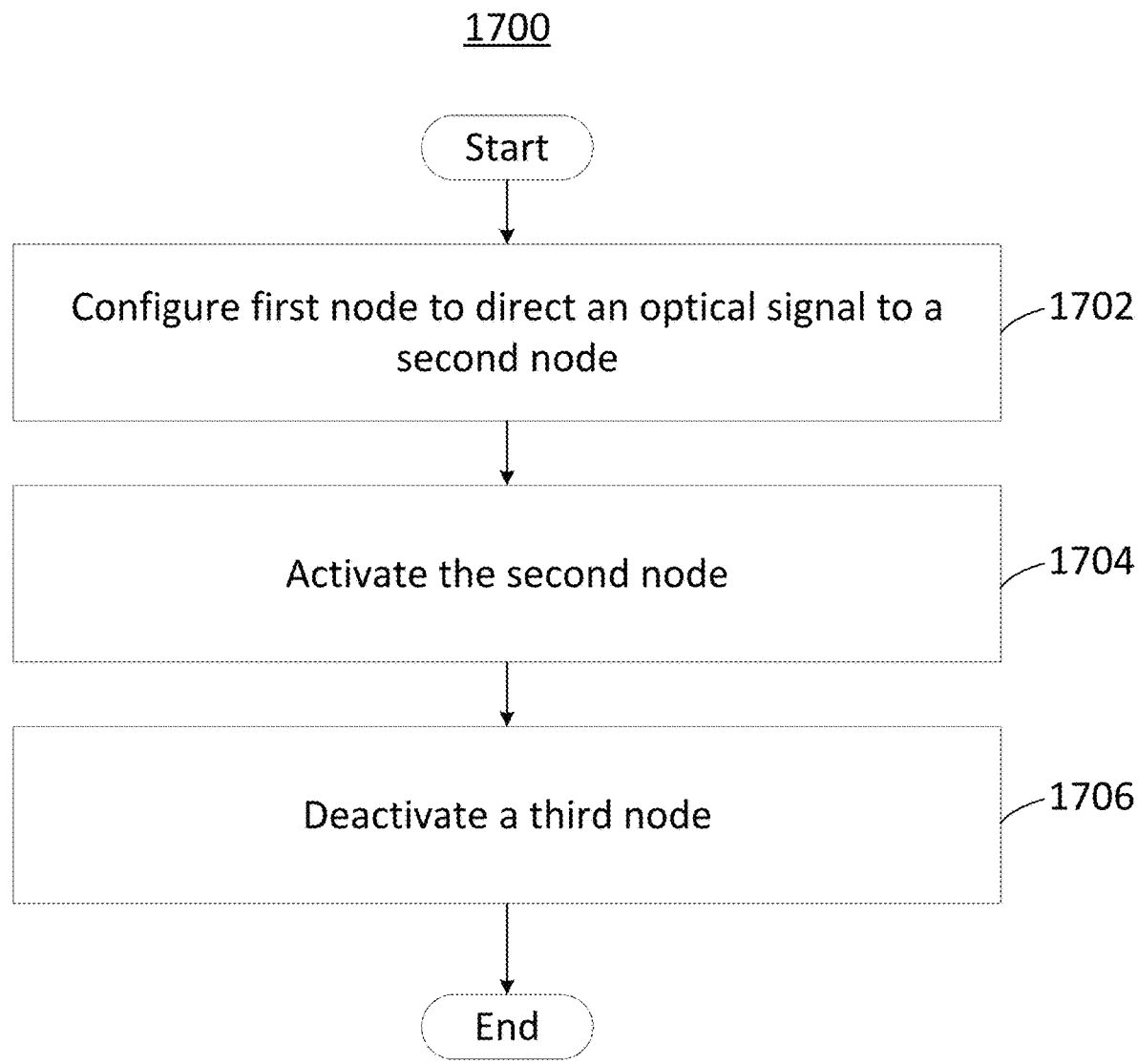
FIG. 17 is a flowchart of an example method performed in an ORC.

FIG. 17 is a flowchart of an example method 1700 performed in an ORC (e.g., any of the example ORCs previously described). In certain embodiments, components of the ORC perform the steps of the method 1700. By performing the method 1700, the ORC routes optical signals with a reduced or simplified control interface between a node control system of the ORC and a photonic network circuit of the ORC.

In block 1702, the node control system configures a first node of the photonic network circuit to direct an optical signal to a second node. The node control system may be electrically coupled to the first node by a first node control channel. The node control system may configure the first node through the first node control channel. The second node may be optically coupled to the first node by a first optical signal channel. The first node may direct the optical signal to the second node through the first optical signal channel. The first node may also be optically coupled to a third node through a second optical signal channel. Due to the configuration by the node control system, the first node may not direct the optical signal to the third node through the second optical signal channel.

The node control system may be electrically coupled to the second node and the third node through a second node control channel. The second node control channel may be shared by the second node and the third node. The second node and the third node may receive the same electrical signal over the second node control channel. The node control system may configure the second node and the third node through the second node control channel. The node control system may instruct the second node or the third node how to route or direct optical signals.

In block 1704, the node control system activates the second node. The first node may be electrically coupled to the second node by a first electrical signal channel. The first node may communicate an electrical activation signal to the second node to activate the second node. For example, the electrical activation signal may be a logical signal in an ON state. When the second node receives the electrical activation signal, the second node activates. In some instances, the first node generates the electrical activation signal to the second node based on control signals from the node control system over the first node control channel. In some instances, the second node may be activated by receiving the electrical activation signal directly from the node control system through the second node control channel, in which the electrical activation signal includes information that is recognized by the second node for the activation.

When the second node is activated, the second node is allowed to be configured or controlled by the node control system through the second node control channel. For example, the second node may be controlled by the node control system through the second node control channel to direct the optical signal to a child node of the second node.

In block 1706, the node control system deactivates the third node. The first node may be electrically connected to the third node by a second electrical signal channel. The first node may communicate an electrical activation signal to the third node to deactivate the third node. For example, the electrical activation signal may be a logical signal in an OFF state. When the third node receives the electrical activation signal, the third node deactivates. In some instances, the first node generates the electrical activation signal to the third node based on control signals from the node control system over the first node control channel. In some instances, the third node may be deactivated by receiving the electrical activation signal directly from the node control system through the second node control channel, in which the electrical activation signal includes information that is recognized by the third node for the deactivation. In some cases, the third node may be deactivated by default, and the node control system may "deactivate" the third node by not sending the third node an electrical activation signal in an ON state.

When the third node is deactivated, the third node is not configured or controlled by the node control system through the second node control channel. As a result, the second node control channel may be shared by the second node and the third node while being used to control only the second node. The shared second node control channel reduces or simplifies the connection interface between the node control system and the photonic network circuit.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed modified by a term of degree (e.g., "about"), thereby reflecting its intrinsic uncertainty.

Although various embodiments of the present disclosure have been described in detailed herein, one of ordinary skill in the art would readily appreciate modifications and other embodiments without departing from the spirit and scope of the present disclosure as stated in the appended claims.

What is claimed is:

1. An optical routing circuit comprising:
   a first node;
   a second node; and
   a third node, wherein a first optical signal channel optically couples the first node to the second node, wherein a second optical signal channel optically couples the first node to the third node; and
   a node control system, wherein a first node control channel electrically couples the first node to the node control system, and wherein a second node control channel electrically couples both the second node and the third node to the node control system, wherein when the second node is activated and the third node is deactivated:
      control of the second node by the node control system through the second node control channel is enabled;
      control of the third node by the node control system through the second node control channel is disabled; and
      control of the first node by the node control system through the first node control channel is enabled such that the first node directs an optical signal to the second node through the first optical signal channel rather than to the third node through the second optical signal channel; and
   wherein when the second node is activated and the third node is activated:
      control of the second node and the third node by the node control system through the second node control channel is enabled; and
      control of the first node by the node control system through the first node control channel is enabled such that the first node is arranged to direct an optical signal to the second node through the first optical signal channel and an optical signal to the third node through the second optical signal channel.

2. The optical routing circuit of claim 1, wherein the first node is electrically coupled to the second node by a first electrical signal channel, and wherein the first node is arranged to activate or deactivate the second node by directing a first electrical activation signal to the second node through the first electrical signal channel.

3. The optical routing circuit of claim 2, wherein the first node is electrically coupled to the third node by a second electrical signal channel, and wherein the first node is arranged to activate or deactivate the third node by directing a second electrical activation signal to the third node through the second electrical signal channel.

4. The optical routing circuit of claim 2, wherein the node control system is arranged to direct the first electrical activation signal to the first node through the first node control channel.

5. The optical routing circuit of claim 2, wherein:
   the second node control channel comprises a plurality of sub-channel groups;
   the first electrical activation signal comprises sub-channel group selection information; and
   the second node is arranged to select, based on the sub-channel group selection information, a sub-channel group of the plurality of sub-channel groups for control of the second node by the node control system.

6. The optical routing circuit of claim 1, wherein activating the second node is based on a node identifier in an electrical signal to the second node matching a node identifier of the second node.

7. The optical routing circuit of claim 1, wherein the first node comprises an optical switch controlled by the node control system to direct the optical signal to the second node or the third node.

8. The optical routing circuit of claim 1, wherein the second node is arranged to direct an electrical feedback signal to the node control system through the second node control channel.

9. The optical routing circuit of claim 8, wherein:
   the second node comprises a photodetector;
   the electrical feedback signal is based on an electrical monitoring signal output by the photodetector; and
   the node control system is arranged to control at least one of the first node, the second node, or the third node based on the electrical feedback signal.

10. A node of an optical routing circuit, the node comprising a node optical unit and a node electronic unit, wherein:
    the node optical unit comprises an optical switch;
    the node optical unit is electrically coupled to the node electronic unit;
    the node electronic unit is electrically coupled to a node control channel;
    when the node is activated, the node electronic unit enables control of the node optical unit by a node control system through the node control channel such that the optical switch directs an optical signal at the node optical unit to at least one of a first optical signal channel coupled to the node optical unit or a second optical signal channel coupled to the node optical unit;
    when the node is deactivated, the node electronic unit disables control of the node optical unit by the node control system through the node control channel; and
    the node electronic unit is arranged to direct an electrical feedback signal to the node control system through the node control channel.

11. The node of claim 10, wherein enabling control of the node optical unit by the node control system comprises establishing an electrical connection between the node optical unit and the node control channel, whereas when the node is deactivated, the control of the node optical unit by the node control system is disabled by cutting off the electrical connection between the node optical unit and the node control channel.

12. The node of claim 10, wherein the node electronic unit is arranged to receive an electrical activation signal, and wherein the node is activated or deactivated based on the electrical activation signal.

13. The node of claim 12, wherein the node electronic unit is arranged to receive the electrical activation signal from the node control system through the node control channel.

14. The node of claim 12, wherein the node electronic unit is further electrically coupled to an electrical signal channel, and wherein the node electronic unit is arranged to receive the electrical activation signal from the electrical signal channel.

15. The node of claim 12, wherein
the node control channel comprises a plurality of sub-channel groups;
the electrical activation signal comprises sub-channel group selection information; and
the node electronic unit is arranged to select, based on the sub-channel group selection information, a sub-channel group of the plurality of sub-channel groups for control of the node optical unit by the node control system.

16. The node of claim 12, wherein:
the electrical activation signal further comprises a node identifier; and
the node is arranged to activate when the node identifier in the electrical activation signal matches a node identifier of the node.

17. The node of claim 10, wherein
the node optical unit comprises a photodetector; and
the electrical feedback signal is based on an electrical monitoring signal output from the photodetector.

18. The node of claim 10, wherein, when the node is deactivated, the node electronic unit cuts off a power supply to the optical switch.

19. A method for routing an optical signal, the method comprising:
configuring, through a first node control channel electrically coupled to a first node of an optical routing circuit (ORC) and a node control system, the first node to direct, through a first optical signal channel optically coupled to the first node and a second node of the ORC, an optical signal to the second node rather than to a third node of the ORC through a second optical signal channel optically coupled to the first node and the third node when the second node is activated and the third node is deactivated;
controlling, through a second node control channel electrically coupled to the second node, the third node, and the node control system, the second node when the second node is activated and the third node is deactivated;
controlling, through the second node control channel, the third node when the third node is activated and the second node is deactivated; and
directing, by the second node, an electrical feedback signal to the node control system through the second node control channel.

20. The method of claim 19, further comprising:
activating, through the second node control channel, the third node; and
configuring the first node through the first node control channel such that the first node directs an optical signal to the third node through the second optical signal channel.

21. The method of claim 19, further comprising communicating, from the first node and through a first electrical signal channel electrically coupled to the first node and the second node, a first electrical activation signal to the second node to activate the second node.

22. The method of claim 19, further comprising communicating, from the first node and through a second electrical signal channel electrically coupled to the first node and the third node, a second electrical activation signal to the third node to activate the third node.

23. The method of claim 19, wherein the first node comprises an optical switch, wherein the optical switch directs the optical signal to the second node.

24. The method of claim 19, further comprising:
producing, by a photodetector in the second node, an electrical monitoring signal, wherein the electrical feedback signal is based on the electrical monitoring signal; and
controlling, by the node control system, at least one of the first node, the second node, or the third node based on the electrical feedback signal.

\* \* \* \* \*